US012790729B2

(12) United States Patent
Khokar

(10) Patent No.: US 12,790,729 B2
(45) Date of Patent: Nov. 10, 2026

(54) TEXTILE MATERIALS COMPRISING TAPES IN TWO OBLIQUE ORIENTATIONS AND ITS METHOD AND MEANS FOR PRODUCTION

(71) Applicant: TAPE WEAVING SWEDEN AB, Boras (SE)

(72) Inventor: Nandan Khokar, Gothenburg (SE)

(73) Assignee: TAPE WEAVING SWEDEN AB, Boras (SE)

( * ) Notice: Subject to any disclaimer, the term of this patent is extended or adjusted under 35 U.S.C. 154(b) by 251 days.

(21) Appl. No.: 17/509,658

(22) Filed: Oct. 25, 2021

(65) Prior Publication Data

US 2022/0042220 A1 Feb. 10, 2022

Related U.S. Application Data

(63) Continuation of application No. 13/979,738, filed as application No. PCT/EP2012/050820 on Jan. 20, 2012, now abandoned.

(30) Foreign Application Priority Data

Jan. 20, 2011 (EP) .................................... 11151534

(51) Int. Cl.
*D03D 13/00* (2006.01)
*B29C 70/22* (2006.01)
(Continued)

(52) U.S. Cl.
CPC ................ *D04C 1/02* (2013.01); *B29C 70/22* (2013.01); *D03D 13/002* (2013.01); *D03D 41/00* (2013.01);
(Continued)

(58) Field of Classification Search
CPC ....... Y10T 428/24215; Y10T 428/2405; Y10T 428/2481; Y10T 442/3033–3041;
(Continued)

(56) References Cited

U.S. PATENT DOCUMENTS 2,022,350 A 11/1935 Huber
2,126,711 A 8/1938 Atwood
(Continued)

FOREIGN PATENT DOCUMENTS

DE 680 624 C 9/1939
EP 0 743 386 A1 11/1996
(Continued)

OTHER PUBLICATIONS

First Office Action for Chinese Patent Document No. 201280005372.2. dated Jun. 27, 2014.
(Continued)

*Primary Examiner* — Marla D Mcconnell
*Assistant Examiner* — Kevin Worrell
(74) *Attorney, Agent, or Firm* — Harness, Dickey & Pierce, P.L.C.

(57) ABSTRACT

A variety of textile materials comprising tapes oriented in two oblique orientations relative to the textile's length and width directions, called OFT for Oblique Fibre Textiles, are disclosed. Such OFTs are provided with secondary structural integrity/stability, in addition to primary structural integrity/stability, for improved resistance to formation of openings/gaps. OFTs comprising tapes, particularly Spread Fibre and Highly Drawn Polymeric types, are needed in a number of applications such as ballistic mitigation, composite materials, safety products etc. because they provide improved performance, material properties/functions and aesthetics. Such OFTs can be used either independently or in combination with other textile materials. Different types of OFTs are producible by a novel OFT forming process which is technically unlike weaving and braiding processes.

23 Claims, 41 Drawing Sheets

(51) Int. Cl.

| | |
|---|---|
| ***D03D 41/00*** | (2006.01) |
| ***D04C 1/02*** | (2006.01) |
| ***D04C 3/00*** | (2006.01) |
| ***D04C 3/48*** | (2006.01) |

(52) U.S. Cl.

CPC ............. *D03D 41/008* (2013.01); *D04C 3/00* (2013.01); *D04C 3/48* (2013.01); *Y10T 428/2405* (2015.01); *Y10T 428/24215* (2015.01); *Y10T 428/2481* (2015.01); *Y10T 442/2738* (2015.04); *Y10T 442/3041* (2015.04)

(58) Field of Classification Search

CPC ......... Y10T 442/10–198; Y10S 139/01; D04C 1/10; D04C 1/02; D06N 2201/01; D03D 25/005; D03D 2700/00–90; D02J 1/18; B29C 70/06–24; D01D 5/42–426

USPC ......... 428/104, 124, 196; 442/112, 185–186, 442/181–303, 1–58; 28/157; 87/10, 8–9

See application file for complete search history.

(56) References Cited

U.S. PATENT DOCUMENTS

| | | | | |
|---|---|---|---|---|
| 2,876,671 | A | 3/1959 | Hale | |
| 3,426,804 | A | 2/1969 | Bluck et al. | |
| 3,663,330 | A | 5/1972 | Sager | |
| 3,795,944 | A | 3/1974 | Daniels | |
| 4,351,889 | A | 9/1982 | Sundberg | |
| 4,786,541 | A | 11/1988 | Nishimura et al. | |
| 4,994,303 | A | 2/1991 | Calkins | |
| 5,042,122 | A | 8/1991 | Iyer et al. | |
| 5,057,338 | A | 10/1991 | Baucom et al. | |
| 5,094,883 | A | 3/1992 | Muzzy et al. | |
| 5,101,542 | A | 4/1992 | Nakagawa et al. | |
| 5,173,358 | A | 12/1992 | Anahara et al. | |
| 5,200,620 | A | 4/1993 | Peritt et al. | |
| 5,238,995 | A * | 8/1993 | Fukunishi | D01F 6/14 525/60 |
| 5,695,008 | A | 12/1997 | Bertet et al. | |
| 5,783,278 | A | 7/1998 | Nishimura et al. | |
| 6,032,342 | A | 3/2000 | Kawabe et al. | |
| 6,049,956 | A | 4/2000 | Lifke et al. | |
| 6,450,208 | B1 | 9/2002 | Khokar | |
| 6,494,235 | B1 | 12/2002 | Bruyere et al. | |
| 6,585,842 | B1 | 7/2003 | Bompard et al. | |
| 2004/0013870 | A1 | 1/2004 | Sheldon et al. | |
| 2004/0237760 | A1 | 12/2004 | Shimizu | |
| 2005/0186069 | A1 | 8/2005 | Subramanian et al. | |
| 2005/0274426 | A1 | 12/2005 | Nayfeh et al. | |
| 2006/0124490 | A1 | 6/2006 | Dufresne | |
| 2009/0120270 | A1 | 5/2009 | Welch et al. | |

FOREIGN PATENT DOCUMENTS

| | | | |
|---|---|---|---|
| EP | 2 048 422 | A1 | 4/2009 |
| JP | H02-41462 | A | 2/1990 |
| JP | H06346337 | A | 12/1994 |
| JP | 3382603 | B2 | 3/2003 |
| JP | 2003105632 | A | 4/2003 |
| JP | 2004353134 | A | 12/2004 |
| JP | 2009-537691 | A | 10/2009 |
| WO | 2006/075961 | A1 | 7/2006 |
| WO | 2007-135418 | A1 | 11/2007 |

OTHER PUBLICATIONS

Office Action for Japanese Application No. 2013-549814 mailed Oct. 30, 2015.

Japanese Office Action dated Oct. 25, 2016 for JP Patent Application No. 2013-549814 corresponding to PCT/EP2012/050820 filed Jan. 20, 2012.

Windycitizen. Mar. 2010. "(AP)2: Albany Park Art Project—Lifeline Project." Event and Internet Publication. Currently on <http://indulgy.com/post/bmVYexpLd3/class-project-each-student-designed-a-strip-o> ; Via <http://www.windycitizen.com/blogs/albany-park-post/2010/03/31/albany-parks-art-project-begun>.

Miller, Hugo. "Philippine mats." Jan. 4, 2010. <http://www.gutenberg.org/files/30850/30850h/30850h.htm>.

Hawley, Joan. Apr. 2, 2007. "Lazy Girl Designs" Weave a new fabric for your purse project. <http://www.lazygirldesigns.com/pdffiles/weaveanewfabricforyourpurseproject>.

Shiekh, Nicole.May 24, 2010. "Scissor Your Shots to Make a Photoweave." https://web.archive.org/web/20100618095601/http://content.photojojo.com/diy/make-a-photo-weave/.

International Search Report for PCTEP2012/050820, mailed Jun. 5, 2012; ISA/EP.

* cited by examiner

13

14

TEXTILE MATERIALS COMPRISING TAPES IN TWO OBLIQUE ORIENTATIONS AND ITS METHOD AND MEANS FOR PRODUCTION

CROSS-REFERENCE TO RELATED APPLICATIONS

This Application is a Continuation of application Ser. No. 13/979,738 filed on Sep. 23, 2013, which is a 371 U.S. National Stage of International Application No. PCT/EP2012/050820, filed Jan. 20, 2012, which claims priority to European Patent Application 11151534.2 filed on Jan. 20, 2011 in European Patent Office. The entire disclosure(s) of (each of) the above application(s) is (are) incorporated herein by reference.

FIELD

The inventions disclosed herein pertain in general to the bias textiles/fabrics and their production. In particular, the inventions relate to Oblique Fibre Textiles (OFT) comprising tapes which are incorporated in two opposite oblique orientations.

BACKGROUND

A sheet-like fabric/textile material comprising yarns, tows, rovings, filaments, so-called 'flat' yarns and 'tape' yarns etc. in bias orientations in relation to fabric's length (or width) direction is producible directly by the existing flat braiding process as flat braids. A bias fabric can be also obtained indirectly, for example, by cutting helically a tubular woven material produced by the circular weaving process. Another indirect way is by cutting diagonally a portion out of a large flat woven material. A bias fabric, producible indirectly by modified weaving method is also disclosed in U.S. Pat. No. 6,494,235. However, the bias fabrics resulting from all these direct and indirect methods are practically unusable because they develop openings/gaps during handling/processing due to lack of suitable structural integrity/stability. This critical fundamental problem needs a suitable solution because bias fabrics are needed to bear load in oblique directions in many applications. Further, the performance of such bias fabrics is poor because they are not produced using tapes, especially of the spread fiber and highly drawn polymeric types, as a result of which such bias fabrics, comprising one or other type of yarns (i.e. tows, rovings, filaments, so-called 'flat' yarns and 'tape' yarns etc.), have relatively high crimp frequency and angle, uneven surface, high areal weight, poor draping, high thickness, low fibre content, fewer exposed fibres, high openings/gaps due to improper fibre distribution, high handling difficulties etc. due to use of one or other type of indicated yarns. Therefore, for a variety of technical applications, such as ballistic mitigation, a safety product, composite materials etc., a high-performance and also functional bias fabric/textile material, that is free from the indicated drawbacks, is needed. Improved bias fabrics are also needed in practically useable large widths and continuous lengths for industrial applicability.

There is therefore a need for having a variety of novel bias fabric materials comprising tapes, including the spread fibre and highly drawn polymeric types of tapes, for improved performance and structural integrity to resist formation of openings/gaps during normal handling/processing. Also, new applications need functional bias fabrics.

SUMMARY

It is therefore an object of the present invention to provide a bias fabric comprising tapes to alleviate the above-discussed problems of the prior arts.

This object is achieved by means of a fabric as defined in the appended claims.

According to a first aspect of the invention, there is provided a fabric comprising tapes, wherein a first set and a second set of tapes are arranged in an intersecting and overlapping fashion, the tapes of the first set and the second set being structurally linked with each other, wherein all the tapes are arranged in oblique orientations in relation to the fabric length direction, said fabric further comprising, at least in a middle part of said fabric, a plurality of connection points or connection areas connecting at least some of the overlapping tapes of the first and second set together.

The fabric is preferably elongate, i.e. it has a length which is longer than the width, whereby the fabric length direction coincides with the elongated direction. Further, the fabric length direction preferably coincides with the production direction in which the fabric has been produced.

Hereby, the two sets of tapes that are obliquely oriented in relatively opposite directions with respect to either of the two representative diagonals, which could be either equal or unequal (major and minor), of any of the unit quadrilaterals that are created by overlapping of intersecting tapes. Further, one of the two representative diagonals could be more or less parallel to the fabric-length direction.

The first set of tapes are preferably arranged substantially parallel to each other in a first oblique orientation in relation to the fabric length direction, and the second set of tapes are preferably arranged substantially parallel to each other in a second oblique orientation in relation to the fabric length direction.

Further, the first set of tapes are, on average, preferably arranged in a first oblique orientation in relation to the fabric length direction, and the second set of tapes are, on average, preferably arranged in a second oblique orientation in relation to the fabric length direction, said first and second oblique orientations being non-perpendicular to each other, thereby forming either an acute or obtuse angle between said first and second orientations.

The first and second oblique orientations preferably mutually form an angle in the range 20-85 degrees or 95-160 degrees, and even more preferably in the range 40-80 degrees or 100-140 degrees, and most preferably in the range 60-80 degrees or 100-120 degrees.

The connection points or connection areas are preferably provided to overlapping tape areas/portions by means of at least one of: spot needling, spot entangling, spot gluing, adhesion, fusing and spot welding.

The connection points or connection areas are preferably formed without using any extra yarn or the like. Further, the connection points/areas are preferably arranged to remain flat, thereby not adding to the thickness of the fabric. Hereby, the connection points/areas do not create surface unevenness in the fabric by way of including extra yarns or the like.

The connection points or connection areas are preferably distributed evenly over the fabric.

The connection points or connection areas are preferably provided on all the tapes.

The connection points or connection areas are preferably provided in each overlap between the tapes of the first and second set of tapes.

The connection points or connection areas preferably form discrete points/areas, being unconnected to each other apart from being applied to the same fabric. Further, the connection points or connection areas are preferably discontinuous between the corresponding quadrilaterals along their diagonal directions, and preferably do not connect the quadrilaterals formed by the overlapping and intersecting tapes of the fabric to one another.

The plurality of connection points or connection areas are preferably arranged in one or several straight connection lines, each of said at least one straight connection lines comprising a plurality of connection points or connection areas. Preferably, at least one, and most preferably several, of the straight connection line(s) extend in the length direction of the fabric. It is also preferred that at least some of the straight connection lines extend in different directions. It is also preferred that at least some of the connection lines extend in directions parallel to the tapes of the first and second sets of tapes. Preferably, the connection areas can vary from one or several points to adhesion covering entire area of the overlapping tapes.

According to one embodiment, at least some of the tapes are either spread fibre tapes or highly drawn polymeric tapes.

It is further preferred that at least one tape is folded, said folded tape extending in at least two different oblique directions in relation to the length direction of the fabric. The folding of said at least one folded tape may be arranged at one side of the fabric, thereby forming an at least partly closed longitudinal edge. Foldings of at least two folded tapes may further be arranged on different sides of the fabric, thereby forming at least partly closed longitudinal edges on two sides of the fabric. Further, foldings of at least two folded tapes may be arranged at a distance from the longitudinal edges of the fabric, thereby forming a slit opening in the fabric.

The fabric is further preferably provided with a surface coating on at least one side of at least some of the tapes, said surface coating making the fabric adherent.

Preferably, the discrete length of each of the tapes is longer than the width of the fabric. It is also preferred that the discrete length of each of the tape is shorter, and preferably substantially shorter, than the length of the fabric.

According to another aspect of the invention, there is provided a use of the above-discussed fabric for at least one of ballistic mitigation and safety products.

According to still another aspect of the invention, there is provided a composite material comprising a fabric of the above-discussed type.

The present inventions provide novel bias fabrics producible directly using all types of tapes, including the spread fibre and highly drawn polymeric types, and which preferably present the following features, either independently or in certain combinations:

Discrete lengths of tapes are incorporated in two angular orientations in relation to fabric-length direction;

The discrete lengths of tapes constituting the bias fabric are either equal or unequal depending on whether the angles of their incorporation relative to fabric's longitudinal direction are equal or not.

The discrete length of tapes are longer than the width of the bias fabric's body;

The discrete tapes are in either straight or folded-straight forms;

The bias textile material possesses directionally oriented secondary structural integrity/stability, in addition to the primary integrity/stability, to resist developing openings/gaps during its manufacturing and subsequent handling/processing;

The tapes constituting the bias textile material, particularly the spread fibre and highly drawn polymeric types, provide uniform thickness, lower areal weight, thinner and wider construction exposing relatively greater number of constituent filaments/fibrils in compa-rison with conventional yarns, tows, rovings, filaments, so-called 'flat'/tape yarns etc.;

The bias fabric has either open longitudinal edges, or both longitudinal edges partly sealed, or one longitudinal edge wholly sealed;

The bias fabric is provided with either longitudinally or laterally oriented slits without cutting the tapes and the associated fibre discontinuities; and The built-in slits in the bias fabric are located either along the fabric's longitudinal axis or offset from the longitudinal axis.

The need for having bias fabrics incorporating tapes, particularly the spread fibre and highly drawn types, instead of yarns, tows, rovings, filaments, so-called 'flat' yarns and 'tape' yarns etc., is not only to make available a textile material that exhibits strength in two oblique directions relative to the textile's length and width directions, but also to realize certain other important performance, functional and commercial advantages. Accordingly, novel bias fabrics, which are hereinafter commonly referred to as OFT for 'Oblique Fibrous Textiles', are provided herewith. That the features of OFT disclosed herein are technically different from the available bias fabrics will become clear in the following.

Differences Between the Invention and the State of Art Relating to Material

From the foregoing description it would be obvious that textile materials in the form of OFT are preferred for manufacturing a variety of composite materials, ballistic mitigation products, safety products (e.g. parachutes, wall-strengtheners) etc. For all these technical applications presently woven materials comprising yarns, rovings, 'flat' yarns, tape yarns, tows etc. are extensively used for their unique weave-structure performance advantages compared with the knitted and non-woven materials. Flat braided materials are not practically producible in large widths that are generally preferred for industrial/technical applications and hence their applicability is also insignificant. However, woven materials provide strength in only warp and weft directions (i.e. fabric length and width directions respectively), and undergo shear deformation if forces are applied in oblique/angular/bias directions relative to the warp and weft directions.

Composite materials, ballistic mitigation products and safety products are produced by plying sheets of woven materials in relatively different orientations to realize a product that can bear load from different directions. However, such plying of woven sheets in different orientations makes it imperative to cut smaller parts from a larger woven sheet. The bias-oriented cut woven sheet is thus a discontinuous material that limits the possibilities of, for example, continuous inline automated pre-pregging and production of items requiring no discontinuities of either fibres or fabric structure in the required area/s of the product, for example when constructing the belly and wings of an aircraft. The precision of cutting and plying operations depends on the skills of the workers whereby achieving consistent quality becomes impossible in an industrial setting. Further, the production time, labour and costs tend to increase in a discontinuous process in addition to generation of substantial waste material which adversely impacts the environment. Today there is no suitable continuous bias textile material available that resists developing openings/gaps, provides performance and functions, and is useable for overcoming the indicated problems in a practicable way.

Apart from having a continuous running length and practically useful width of bias textile material that provides strength in two oblique directions relative to textile's length (or width) direction, there are certain other important performance and function related technical demands that an OFT must also fulfill. These material related demands cannot be fulfilled with available materials and methods of bias fabric production as presented below.

(a) Uniformly tensioned constituents of an OFT: Filaments, yarns, tows, rovings, so-called 'flat' yarns and 'tape' yarns etc. (hereinafter collectively called 'flat' yarns) that occur relatively highly tensioned than others in a fabric intended particularly for technical application are mainly responsible for causing material failure. This is because fabrics in technical applications are invariably subjected to a variety of forces from different directions and the fibres that occur most tensioned within the fabric are the first ones to break/fail under certain load/force. Such fibre breakages trigger the onset of eventual fabric failure as the next highly tensioned fibres have to successively bear the load and breakage of fibres progresses until finally a complete material failure results. The catastrophic consequences of fabrics comprising tensioned fibres in applications such as composite materials, ballistic protection, parachutes etc. cannot be over emphasized.

As is well known, the weaving, knitting and braiding processes introduce tensions and related problems in fabrics. This is because the inherent working design of these conventional processes requires the input fibres to be maintained constantly under certain tension for their satisfactory working and also for the machine's satisfactory operations. Invariably, the input fibres are required to be supplied in large sized and number of packages such as spools, beams, cones, cheeses etc. because the fabrics are required to be produced in large, but definite, continuous lengths. Such long lengths of input fibres invariably have tension variations in them because they cannot be completely controlled for a variety of technical and human reasons.

The existing fabric-forming processes thus inevitably start with unequally tensioned input fibres and induce additional tensions in the input fibres during fabric's production as the fibres interact with a variety of moving machine parts. Such tensions keep on increasing until the fibre's breaking point is reached (whereby the discontinuity of fibres causes fabric faults). Maintaining constantly equal tension in all fibres during fabric production is thus impossible in existing processes. It will be therefore desirable to have a fabric-forming process for manufacturing OFT in which additional tension variations are not induced in the fibres of the OFT during production to improve material's performance. For such a process to be practically viable, it should be able to produce OFT continuously using specified discrete lengths of individual fibrous material in a suitable form without requiring the constituent fibres to be always under tension as a condition for fabric production. The present invention provides a novel method and means for obtaining innovative OFTs the constituent tapes of which occur completely tensionless.

(b) Relatively lower areal weight and thinner OFT: Fabrics are now being increasingly demanded for achieving further weight reductions and improved draping in the said technical applications. For example, it is becoming important now to reduce the dead-weight of a composite material, i.e. the weight of the excess matrix that gets collected in the valleys of the weave crimp of traditional woven materials. This excess matrix does not contribute to anything useful. Its collection in the valleys of weave crimp happens because the traditional yarns and the so-called 'flat' yarns/'tape' yarns/tows/rovings are inherently thicker in the middle than at the edges (i.e. having ellipse-like or flat oval/race track-like cross-sectional shape) due to the uneven fibre distribution in the width direction of the roving/yarn/'flat' yarn/'tape' yarn/tow. As a consequence of their relatively narrow width and high thickness, the crimp frequency and crimp angle in the fabric tend to be significantly high as a result of which the fabric exhibits a relatively higher areal weight, higher mean thickness and an uneven surface resulting from peaks and valleys of crimp. These and other shortcomings can be overcome by producing OFT using Spread Fibre Tapes (henceforth called SFT) because such tapes are extremely uniform in thickness due to its structure and they are also substantially thin whereby the crimp frequency and crimp angle can be virtually eliminated. An OFT produced using tapes, such as SFT, has previously not been known.

(c) Structurally stable OFT: Because available bias fabrics do not have fibres oriented in fabric's length and width directions (like a woven fabric), its structure can easily open up or form gaps, even narrow down, during manufacture and handling such as that encountered normally when forces act on it longitudinally and laterally. Whereas in a woven fabric the warps easily slip out from selvedge sides if not properly integrated/locked-in with wefts leading to initiation of openings/gaps closer to selvedges than middle part, in bias fabric the situation is entirely different because there is no material that runs adjacent and parallel to its longitudinal sides to slip out. In bias fabric the openings/gaps are initiated in a middle part of the fabric instead of its longitudinal sides. For example, a certain length of a bias fabric easily develops openings/gaps, initially in its middle part, under its own weight when passed over two horizontal rolls. Formation of openings/gaps in middle part of bias fabric happens even if its longitudinal sides are closed/sealed as it sags most in middle part as the constituent materials there tend to shift laterally. The mechanism of formation of openings/gaps in woven and bias fabrics is hence characteristically different and requires correspondingly different solutions to overcome the problems.

Further, while use of tapes for producing OFT is considered beneficial as mentioned above, its use also means relatively lower frequency, or fewer points, of connections between the tapes, compared with the use of indicated yarn types (i.e. rovings, filaments, tows, so-called 'flat' yarns and 'tape' yarns, etc.), because such tapes will be relatively wider than any type of indicated yarns. Because the use of tapes will entail infrequent or fewer connections between tapes, there will be a correspondingly reduced stability of the fabric structure, whereby openings/gaps will be easily created when handling/processing them. An OFT produced with tapes can be thus practically difficult to use.

Therefore, to obtain a satisfactory OFT, certain additional directionally oriented secondary structural integrity/stability, apart from its primary structural integrity/stability, becomes necessary to impart, at least in its middle part, for improved resistance to lateral shifting and developing openings/gaps to render it practically useful. It is also important that an OFT exhibits similar structural features in its length and width directions. A uniform thickness OFT is also necessary for realizing satisfactory products, e.g. ballistic impact mitigation, composite materials etc. All these requirements can be met by imparting OFT a secondary structural integrity/stability, in addition to the primary structural integrity/stability, through a directionally oriented consolidation procedure. While the primary stability would come naturally from the manner by which the process organizes and assembles the tapes in the OFT, the secondary structural stability additionally imparts strength in OFT's thickness direction by methods such as spot entangling/needling for fibre migration, spot gluing, adhesion, fusing, spot welding etc., depending on the tape material being processed, to improve OFT's resistance to formation of openings/gaps. The secondary structural integrity/stability imparted to an OFT can be directionally oriented for providing low to high level resistance to forming of openings/gaps, applied in areas where preferred, and suitably dimensioned from a point to a larger area according to the requirements of a given application. An OFT that is made of tapes and is structurally well integrated and stable through secondary integrity/stability has previously not been known.

(d) Functional OFT: Previously there has been available no bias fabric that is functional in any way. Due to the inherent low load-bearing strength in its length and width directions, an OFT should incorporate certain features that will enhance its use functionally. For example, it should be capable of being applied easily and quickly in applications such as reinforcing heritage buildings and rapidly deployable impact resistant vehicles. In applications where an OFT would be required to be suspended, such as to cover hangar and stadium, it should have built-in arrangement that can facilitate its use directly and easily. Also, for properly guiding OFT during processing, for example coating, it should be provided with at least one sealed linear longitudinal edge. Accordingly, the OFT disclosed herein addresses such functional issues by way of being provided with suitable features, such as adhesive that enables it to adhere to surfaces, sealed linear longitudinal edge, and built-in slits that allow it to be mechanically connected by passing bands through the slits. An OFT offering such functionalities has previously not been known.

An OFT comprising SFT will also exhibit additionally, not only a lower areal weight, but also highly straight and parallel constituent filaments that are oriented in tape's length direction, and greater number of exposed filaments for easier and quicker wetting (these features are considered now to be imperative requirements for many technical applications, particularly where fibres are required to be coated/embedded). By producing an OFT using SFT in a manner that SFT is not subjected to unceasing tension as a condition for fabric production, the requirements/demands can be substantially and directly fulfilled.

Further, an OFT composed of thermoplastic material, in the forms of Highly Drawn/Stretched Polymeric Filaments and Highly Drawn/Stretched Polymeric Tapes (hereinafter collectively referred to as HDPT), can be also considered for bearing enormous loads/forces because of their highly straightened, parallel and uniformly distributed constituent molecular chains (which can be considered akin to SFT). For example, an OFT comprising HDPT can bear impact loads in the two oblique directions relative to the fabric's length and width. An OFT produced using HDPT has previously not been known.

While carbon fibres are extensively used as reinforcements in the manufacture of composite materials, certain polymeric materials are the choice materials for ballistic mitigation application. Such polymeric materials could be either HDPT or highly drawn polymeric fibres made in the form of an SFT.

An OFT comprising either SFT or HDPT or their combinations and also a process and means for producing OFT, have previously not been known. A background for explaining advantages of OFT produced using either SFT or HDPT or their combinations and its practical significance in industry are presented below.

Carbon fibres are widely used in the form of yarns, rovings, tows, so-called 'flat' yarns and 'tape' yarns etc. to produce a variety of fabric areal weights. For example, at present low areal weight woven fabrics are usually produced by weaving low count tows such as 1 k and 3 k (wherein k designates 1000 filaments). Higher count tows produce correspondingly heavy areal weight woven fabrics with a corresponding increase in uneven surface and mean fabric thickness, which are undesirable from the point of increasing the dead-weight of composite material as explained earlier. On the other hand, woven fabrics produced using lower tow counts are many times more expensive than those produced using higher tow counts in addition to the said problems. Their drawbacks are only relatively lower in magnitude. It is therefore necessary that for reducing the fabric cost, the relatively lesser expensive fibres of higher tow counts be used while at the same time low areal weight and high-performance fabrics be realized.

Similarly, different polymeric materials are used in the form of 'flat' yarns of different counts (tex, denier), to produce different areal weights of fabrics. As explained above, fabrics made using higher count 'flat' yarns of polymeric materials exhibit correspondingly heavy areal weight fabrics, uneven surface and increased mean thickness of the fabric, and thus have relatively lower performance.

The filaments constituting the tows/rovings/'tape' yarns/'flat' yarns etc. are given a light twist for keeping them together for handling convenience. Hence filaments of a tow have some freedom to shift laterally. As a consequence, the tows undergo change in their cross-sectional shape when subjected to pressure, like when bending over a cylinder. In fact the tows in their bobbin form appear 'flat' (the cross-section being generally represented as flat oval or race track-like), unlike yarns which are generally regarded to be either circular or oval in cross-section. Such yarns/rovings/tows/'tape' yarns/'flat' yarns etc., which are generally referred to as 'flat' yarns/'tape' yarns, are known to be not truly flat because of inherent uneven distribution of the constituent filaments whereby the thickness of the so-called 'flat' yarn in the mid flat region of its cross-section is significantly greater than that at the edges.

Further, the filaments constituting the yarn/roving/tow/'tape' yarn/'flat' yarn do not run linearly and parallel to tow's/'tape' yarn's/'flat' yarn's length direction—there is a constant internal crisscrossing of fibres. This haphazard arrangement of filaments is one of the main reasons for tension variations within these 'flat' yarns. Also, there is a limit to how flat and wide a 'flat' yarn can be made when subjected to pressure. The 'flat' yarn on a bobbin is already 'flat' and wide to the maximum. Such rovings, yarns, tows, so-called 'flat' yarns and tape yarns etc. are therefore generally called 'flat' yarns, 'tape' yarns etc. For all practical purposes, these 'flat'/'tape' yarns are extensively used and treated as they are, i.e. just like conventional yarns, for example in weaving and braiding processes to produce fabrics for different applications. These processes require practically no modifications for handling such 'flat'/'tape' yarns. The fabrics produced using such 'flat'/'tape' yarns that have crisscrossing fibres/filaments and uneven thickness are therefore possessed of drawbacks and associated problems described in the foregoing.

Spread Fibre Tape (SFT), as the name indicates, is produced by spreading the constituent filaments/fibres of a 'flat' yarn. As a consequence, a relatively thinner and wider material in tape form is obtained. The degree of fibre spreading is done according to the application needs and also in accordance with the areal weight of the fabric to be achieved. Thus, the lower the areal weight is desired, the higher will be the degree of spreading the filaments/fibres of the 'flat' yarn (of course up to a practical limit). Such spreading will result in a wider, thinner and a highly uniform thickness fibre tape due to the highly uniform distribution of fibres. An important consequence of such spreading action is that the inherent internal crisscrossing or migration of fibres/filaments and false twists etc. within the 'flat' yarn get eliminated and the filaments/fibres become highly linear, parallel and oriented in the tape's length direction. Such a highly organized arrangement of filaments/fibres renders the SFT free from inherent tension variations arising from defects such as internal twists, crisscrossing of filaments and uneven fibre distribution. Another very important outcome of spreading the fibres of the 'flat' yarn is that the resulting SFT has well-distributed fibres/filaments and exposes relatively more number of filaments than the parent 'flat' yarn. An SFT, being thinner and wider, is thus very flimsy and delicate compared to its parent 'flat' yarn. Clearly SFT is structurally different from the yarns, rovings, tows, so-called 'flat' and 'tape' yarns etc. Accordingly, an SFT cannot be handled and treated in the same way as the 'flat'/'tape' yarn is treated.

Typically, for a given count of roving/tow/'flat' yarn/'tape' yarn, and the degree of spreading performed, the comparative thickness of SFT could be at least 50% lower, the width at least 50% greater, and the number of exposed filaments at least 50% greater than that of the parent 'flat'/'tape' yarn. U.S. Pat. Nos. 3,795,944, 5,042,122 and 5,057,338, 4,994,303, 5,094,883, 5,101,542, 5,200,620, 6,049,956, 6,032,342 and JP 3382603 are examples of different processes specifically developed for spreading the filaments of a roving/tow/'flat' yarn/'tape' yarn etc. It will be clear now to the practitioner of art that SFT and yarns, rovings, tows, 'flat'/'tape' yarns etc. are characteristically structurally different and hence they exhibit different features in terms of thickness, areal weight, linearity and parallel disposition of constituent filaments/fibres and the number of exposed filaments/fibres.

As mentioned earlier, an SFT has a fragile or delicate structure and hence requires greater care and different handling arrangements than those required for rovings/tows/'tape' yarns/'flat' yarns. This is because any mishandling and unbalanced forces will collapse SFT back into a yarn, roving, tow, 'flat'/'tape' yarn etc. Clearly SFT cannot be processed in the same way as a yarn, roving, tow, 'flat'/'tape' yarn etc. An OFT produced using SFT will be therefore advantageous because they will be naturally free from crisscrossing fibres, twists etc., and hence free from inherent tensions, besides being of relatively lower areal weight, greater surface evenness, flatness and lower mean fabric-thickness than the fabric comprising yarns, rovings, tows, 'flat'/'tape' yarns etc. Further, as an OFT made using SFT will be relatively thinner, they can be draped into desired shapes relatively easily. Furthermore, because OFT comprising SFT will have relatively more number of well-distributed and exposed filaments, a correspondingly higher and quicker wetting of fibres will be enabled when coated or embedded. Most importantly, because SFT comprises filaments/fibres that are linear, well-distributed and parallel, the OFT produced using them shall have uniform tension if the fabric-forming process is such that it does not require constant tensioning of SFT as a condition during production of OFT.

Further, because of their relative thinness and large width, an OFT incorporating SFT will be substantially flat and have virtually no crimp. Also, due to the thinness and flatness of SFT, the OFT will have substantially lower mean thickness resulting in virtually no dead-weight matrix accumulation. As a consequence, the problem of dead-weight of composite materials will be substantially reduced, if not wholly eliminated. A composite material incorporating SFT will perform better because of the relatively higher wetting (i.e. adhering) of the well-distributed and exposed filaments by the matrix. The adhesion of greater number of filaments to the matrix will result in correspondingly increased distribution and transference of loads from the matrix to the fibres when the composite material is subjected to loading/forces, whereby improved performance will result.

The advantages described above for SFT can be also correspondingly found with the use of HDPT. When polymeric sheets are highly drawn/stretched, their molecular chains tend to become correspondingly highly stretched, straighter, parallel, well-distributed and oriented in the length direction of the sheet/tape. Also, during the drawing/stretching process the molecular chains slide past each other laterally and result in an extremely thin (measurable in terms of micrometer) sheets or tapes. Such HDPT can be thin to the point of becoming translucent, if not transparent (depending on the type of polymeric material drawn). These highly linear molecular chains, called fibrils, thus occur on the surface of the ultra thin HDPT. In fact such fibrils directly adhere to an ordinary adhesive tape and peel off readily from the surface of HDPT as extremely fine filaments and can be considered something akin to the exposed fibres in SFT. Due to such high linearity of the molecular chains an HDPT can bear relatively high impact loads.

To enlarge the scope of practical usefulness from the indicated benefits of SFT and HDPT it is naturally desirable to compose an OFT with not only tapes that exhibit relatively uniform thickness, low areal weight, highly straight and parallel constituent filaments/fibrils and greater number of well-distributed exposed filaments/fibrils, but also by employing a fabric-forming process that will not require constant or unceasing tensioning of SFT and HDPT as a condition during OFT production. An OFT of the described foregoing features and functions, and its method and means for production, as well as applications and advantages, have previously not been known.

To bring forward the novelty of OFT according to this invention, relevant known bias materials available through different ways of manufacture are cited below. As shall be noticed in due course, these known fabrics and their methods of production are characteristically different from the present inventions.

Differences Between the Invention and the State of Art Relating to Process

It would be apparent from the foregoing description that OFT production requires a completely new approach. The limitations of existing methods are explained below.

Although the flat braiding process directly creates a narrow fabric by incorporating obliquely yarns, rovings, tows, 'flat'/'tape' yarns etc., its working arrangement cannot produce an OFT using tapes, including SFT, HDPT and their combinations without distorting/crumpling them. The braiding process is therefore irrelevant to consider any further in the context of the present invention.

A fabric piece comprising either yarns or rovings or tows or 'flat'/'tape' yarns etc. in oblique orientations in relation to its length (or width) direction can be obtained indirectly by cutting out obliquely a portion from a larger woven material and called a 'bias' material. However, such a material then has poor strength in its length and width directions and cannot be handled ordinarily as it easily develops structural openings/gaps. Also, as is well known, constant tensioning of warp and weft is indispensable for processing them in the weaving process. Also, the tensions in the warp and weft directions are never equal. Therefore, a woven material will inherently continue to suffer from the effects of tension differences in the fibres of the warp and weft directions induced by a variety of weaving process variables controlling each of them. Such tension-related defects are either visible (for example, one or more warps, or wefts, appearing 'tight' with different crimp level compared to others, flat appearance due to stretching, breakage/discontinuity/fibre pull-out etc.) or determinable (for example, by measuring lengths of fibres of warps or wefts, observing behaviour under certain conditions of heat/humidity/wetting, and by loading fabric to the point of first fibre breakage etc.). Such effects of tension-related defects continue to remain even in the woven fabric even after it has been taken off the weaving machine due to locking-in of yarns, rovings, tows, 'flat'/'tape' yarns etc. by interlacing. These inherent tension related defects are unacceptable for critical technical applications. Obviously, an obliquely cut 'bias' piece of fabric obtained from a large woven material will inherit the same tension-related defects and shortcomings and will perform poorly in the desired technical applications. Most importantly such a 'bias' material will have no secondary structural integrity/stability, for example that accorded by spot entangling/needling, adhesion, fusion etc., in its middle part making its handling and processing impossible. Also, such a fabric will not be functional in any way.

Further, because such a woven 'bias' material is cut out from a large woven fabric, it will be small and of finite area making it of little practical use and value. It will not enable, e.g., continuous inline automated pre-pregging and production of items requiring continuity of fibres and fabric structure. Moreover, in such a bias material the 90° relationship between the warp and the weft of a woven fabric will always remain unaltered. An important limitation with the approach of cutting out pieces from a large woven material is the non-availability of practically useable continuous and wide bias materials. Cutting narrow strips and pieces and placing them together will still have fibre discontinuities and also fabric structure discontinuities. Also, the woven material from which the bias piece is cut out becomes a waste.

Clearly, the woven material is characteristically different from the preferred OFT and the existing flat weaving processes cannot be employed to produce OFT.

The traditional circular weaving process provides an indirect solution for obtaining a continuous bias material. A woven tubular fabric could be cut helically as disclosed in U.S. Pat. No. 4,299,878. Upon opening and laying the helically cut material flat, a long-length material comprising yarns in angular orientations in relation to its length and width directions is obtained. However, such a woven tubular fabric can be produced using only yarns/rovings/tows/'flat'/'tape' yarns etc. and not tapes, including SFT and HDPT types, because the working arrangement of the circular weaving process cannot handle and process tapes, without introducing twists and other deformations. Their handling requires new techniques which have previously not been known. Moreover, the helically cut 'bias' material cannot be free from the tension-related defects because the circular weaving process requires unceasing tensioning of the yarns, rovings, tows, 'flat'/'tape' yarns etc. during processing.

Clearly, the circular weaving process cannot handle tapes, especially SFT and HDPT types, to produce tubular OFT from which a bias material could be obtained by helical cutting. This process is therefore irrelevant to consider any further.

U.S. Pat. No. 6,494,235 describes an indirect method for producing a bias fabric comprising 'flat' yarns. The described bias fabric is produced indirectly by modifying the conventional weaving procedures. While the described modified weaving process could perhaps process yarns/rovings/tows/'tape' yarns/'flat' yarns etc. with difficulty, it definitely cannot process tapes, especially of SFT and HDPT types, as explained below. Moreover, because the indicated bias material is produced indirectly by employing the weaving process, there will be the inherent tension differences in the warps and wefts. Such a bias fabric composed of 'flat' yarns and produced by the traditional weaving procedures will have tension-related defects and shortcomings discussed earlier and hence are unsuitable for use in technical applications. As with the other bias materials described in the foregoing, such a bias material also has no secondary structural integrity/stability and they are thus prone to readily develop openings/gaps. It also has no functional features.

It will be apparent to one skilled in the art that the weaving arrangements described in U.S. Pat. No. 6,494,235 for producing a bias fabric are impracticable for the following reasons.

(a) It produces the bias fabric using 'flat' yarns by drawing it out from only one spool/source. Thus, the warps are drawn out one length at a time and fed one by one into the nips of two parallel belt drives so as to continuously cyclically create a working warp sheet. Apparently, a warp set up is performed and the individual 'flat' warp yarns can never be had close to each other as is normally required for obtaining a satisfactory high fibre content performance material. The resulting woven fabric will be thus loose and already have openings/gaps. Further, because all the 'flat' yarns are drawn out from only one supply source, the bias fabric can never be composed of two or more different materials, and the process cannot be efficient.

(b) The two distanced belt drives can never keep the spanning length of 'flat' warp yarns taut enough from sagging under its own weight. 'Flat' warp yarns hanging in the middle section of the two belt drives will sag relatively more than those at the entry end side as the gripping force in the belts' middle section will be relatively lower. Consequently, the 'flat' warp yarns will be differently tensioned and also be of different lengths making the process' working difficult, if not impracticable.

(c) The 'flat' warp yarns held between the two belts, will tend to slip out from the belts due to pulling when subjected to shedding. There is also no tensioning arrangement provided therein to level the warp yarns after the shed closes. As a consequence, the 'flat' warp yarns will remain loosely hanging when the shed closes and cause difficulties in subsequent operations, particularly the subsequent shedding whereby the weaving process cannot proceed any further satisfactorily.

(d) The 'flat' yarn warps are not threaded through any heald eye for shedding because they are required to flow in the direction of the fabric width (from entry selvedge side to the opposite) every cycle and each one of them should come into its specific position to be lifted up by the shedding arrangement. This is practically never achievable because the loose and sagging 'flat' warp yarns will never come clearly into those individually required specific shedding positions. Consequently, when the shedding arrangement operates, the said vertical 'combs' would tear through the misaligned 'flat' warp yarns and will never properly lift them up. The risk of 'flat' warp yarns getting damaged/narrowed/deformed/entangled in the shedding process is thus unavoidable. Further, the loose 'flat' warp yarns would get caught with the shedding arrangement that is located under them and thereby pulled out from the two belts that hold and drive them. An improper shed will obstruct weft insertion and cause weaving difficulties and halt the process.

(e) In this process the farthest (i.e. at the selvedge) 'flat' warp yarn from the feeding side of the 'flat' warp yarns in the two belt drives is subsequently used as the 'flat' weft yarn. To draw this last 'flat' warp yarn into the created shed as a weft, it has to be gripped by a gripper. Such a 'flat' weft yarn, which is initially occupying the position of the last 'flat' warp yarn, is inherently disposed at right angle orientation to the weft drawing-in direction of the weft gripper. When the gripper draws the 'flat' weft yarn into the shed, the trailing end of the weft (which just functioned as warp) will slip out from the nip of the corresponding drive belt and there will be no control over the released 'flat' weft yarn. As a consequence, the 'flat' weft yarn will snarl/twist/curl etc. and get deformed immediately due to inherent tension variations in the 'flat' yarn and thereby create weaving difficulties as a result of which the 'flat' yarn cannot be incorporated flatly and without twist. Also, the length of such a weft will be a constant and more or less equal the width of the warp sheet. Hence the warp length will roughly equal the fabric width produced at the instant.

(f) Although a guiding pin/finger is provided for the 'flat' warp yarn to change its direction by 90° when drawn into the shed as a 'flat' weft yarn that is held by the gripper, its bending around the pin will cause further twist/deformation to the 'flat' weft yarn (which is also indicated therein; column 12, lines 49-52) as the gripper draws it into the shed. The 'flat' yarn weft will also get deformed by the gripper itself because part of it will remain gripped in its earlier 'feeding' direction/orientation (as a warp it is at 90° to weft insertion direction) and remainder of it will be bent 90° in the 'drawing into shed' direction/orientation. A solution to this problem, arising from the use of guiding pin/finger, is also proposed therein ('associating a finger with a tongue'; column 12, lines 53-57), but that is also impracticable. By the provided alternative arrangement, the free segment of the leading side of the 'flat' weft yarn is required to be wrapped around the pin by the tongue to change its direction by 90°. If this free segment of 'flat' weft is already held by the weft gripper then it is impossible to carry out its wrapping about the pin because it is not free anymore (from the weft gripper) to wrap/enfold about the pin. If the free segment is not held by the gripper then after the tongue wraps the 'flat' weft yarn about the pin (to change direction by 90°), the weft gripper will not be able to contact, receive and grip the free segment of 'flat' weft because its orientation will no more be at right angle to the weft gripper anymore as before. Also, the gripping position of the 'flat' weft yarn's free segment when wrapped about the pin will shift from its earlier straight (i.e. not wrapped) position when the gripper can engage it. As a consequence, the gripper cannot engage the wrapped free segment of the 'flat' weft yarn in the 90° bent orientation whereby weaving cannot proceed. Further, the wrapping action of 'tongue' will cause damage to, and deformation of, the 'flat' weft yarn.

(g) The described arrangement for beating-up the 'flat' weft yarn is a combination of 'combs' that are fixed vertically to the shedding bars as described therein. However it performs the beating-up in the conventional reciprocating manner whereby the inserted 'flat' weft yarn is beaten towards the fabric-fell position. Such a beating action cannot process a weft tape, especially one that is fragile/delicate such as SFT and HDPT types, because it will immediately cause lateral crumpling and narrowing of the weft tape and hence damage/deform it. Obviously the described weaving method cannot process tapes, including SFT and HDPT types.

(h) The selvedge produced is of the 'tucked-in' type as the 'flat' weft yarn already exists as a pre-cut 'flat' warp yarn. However, such a selvedge creates non-uniform fibre distribution in the woven material because the folded-in/tucked-in length of 'flat' weft is only for a small distance inside the selvedges whereby more fibre gets incorporated at the selvedge sides than in the remainder part/body of the produced fabric. Such uneven fibre distribution readily lends itself to low pick/weft density and thereby creation of openings/gaps in the produced woven fabric. Also, because the warp and weft are of the same material, there is no possibility of incorporating relatively lower 'flat' yarn count at the selvedges to compensate for achieving higher weft packing as is the usual practice when producing tucked-in selvedge during usual weaving. Whereas the tucked-in selvedge is formable using yarns/tows/rovings/'flat'/tape yarns etc. by folding it adjacent to itself, it cannot be employed to fold a tape over itself in the same manner to create the selvedge. Doing so will crumple/deform the tape and also cause the selvedges to be doubly thicker.

(i) The described take-up arrangement advances first the just produced woven fabric in the laid 'flat' yarn weft's width direction, and then winds the fabric at an angular direction, to the fabric fell and not directly in its direction of advancement/fabric-length. Clearly, fabric winding performed at an angle to the fabric-fell misaligns/off sets fabric take-up and thus angular winding arrangement will naturally cause structural deformation of the produced woven fabric due to the unbalanced forces acting on the produced fabric. To overcome this shortcoming, extra yarns in fabric's length direction are incorporated to strengthen the produced fabric in its length direction for winding it up. However, such inclusion of extra yarns creates uneven thickness in the fabric. Such a woven fabric will be relatively thicker wherever such longitudinal yarns run compared with other areas. Further, the inclusion of these extra yarns also immediately causes uneven fibre distribution in the fabric. Areas of fabric where such yarns are incorporated will have higher fibre concentration than the other areas where such yarns are not included. A bias material with these defects is clearly unsuitable and undesirable for technical applications.

(j) The described method cannot incorporate extra yarns in the fabric's width direction whereby the described bias material's mechanical properties will be dissimilar in the fabric-width and fabric-length directions. Such an unbalanced construction is also not desirable.

Clearly, the described modified weaving process cannot produce a bias fabric using tapes. Also, such a modified weaving arrangement can neither process tapes, nor has any means for imparting secondary integrity/stability to the bias material nor has any means to engineer any functionality. Accordingly, the woven material produced therewith has neither any secondary structural integrity/stability arrangement to prevent structural opening and gaps nor any functional features. Further, because the woven fabric described therein is produced using 'flat' yarns, the crimp frequency and crimp angle will be relatively higher in such a woven fabric. Consequently, the accumulation of matrix in the valleys of the weave crimp will create the undesirable dead-weight problem as explained earlier. Further, the described woven fabric produced using 'flat' yarns cannot be of lower areal weight and mean fabric thickness. Also, the described operational arrangements and procedures, being complex and cumbersome, are obviously not suited for processing any type of tapes, including SFT and HDPT.

In any case, the disclosed method, which clearly follows the traditional weaving procedures, is capable of producing the woven material using 'flat' yarn warps and wefts of only one material type which are mutually oriented at right angle to each other during the weaving process. Such a method is evidently limited in that it cannot be practically employed for directly producing bias materials wherein the warp and weft 'flat' yarns are mutually oriented in either obtuse angle or acute angle relationship. Such a process also cannot produce other possible structures such as those with folded tapes to be described herein.

Although the 'flat' yarn described in U.S. Pat. No. 6,494,235 is said to be free from twists, it is not necessarily free from internal crisscrossing of filaments and twisting of filaments which cause non-uniform distribution of fibres and tension variations. These defects make the 'flat' yarn uneven in thickness. The use of 'flat' yarn also cannot provide relatively large number of well distributed and exposed filaments for increased and quicker wetting.

That the fabric according to U.S. Pat. No. 6,494,235 described above uses 'flat' yarns, and not tapes, including SFT and HDPT, also becomes apparent from U.S. Pat. No. 6,585,842 (attributable to the same applicant and also one of the inventors) wherein a multiaxial fibrous web comprising a plurality of unidirectional sheets is disclosed. The textile material according to U.S. Pat. No. 6,585,842 is produced by spreading tows to form unidirectional sheets which are then superposed in different orientations relative to each other and bonded together to obtain the textile material. The methods described therein for spreading the tows and laying them superposed in different orientations are specifically designed for handling spread fibres and distinctly different from the one described in U.S. Pat. No. 6,494,235. Clearly, the 'flat' yarns described in U.S. Pat. No. 6,494,235 are not tapes, including SFT and HDPT types. It will be also clear now to the person skilled in the art that the weaving method and means described in U.S. Pat. No. 6,494,235 are not suitable for handling and processing tapes, including SFT and HDPT types, and the described bias material is produced using 'flat' yarns and not tapes, including SFT and HDPT types.

It is relevant to point out here that the fabric according to U.S. Pat. No. 6,585,842 is crimpless and it has no natural primary structural integrity/stability such as that coming from, for example, interlacing (by weaving), interlooping (by knitting) and intertwining (by braiding). A bias fabric lacking natural primary structural integrity/stability will delaminate (i.e. layers will separate). And lack of secondary structural integrity/stability will cause fabric deformation/distortion (i.e. openings and gaps) when forces act on it.

Clearly, an OFT comprising tapes, including SFT and HDPT types and their combination types has previously not been known. Also, a method and means for producing OFT using tapes, including SFT and HDPT types have previously not been known.

U.S. Pat. No. 3,426,804, US 2005/0274426 are other examples to indicate methods available for producing bias fabrics. That these methods cannot process tapes, including SFT and HDPT types, is too obvious for a person skilled in the art and hence require no further consideration.

U.S. Pat. No. 6,450,208 and WO2006/075961 exemplify a method for weaving tape-like warps and wefts. The woven material according to U.S. Pat. No. 6,450,208 comprises tapes of sandwich and other special constructions. The woven material according to WO2006/075961 comprises partially stabilized tapes. A woven material comprising either SFT or HDPT, and having secondary structural integrity/stability, is not known from these documents. According to these documents the woven fabric comprises tapes orientated in fabric's length and width directions. WO2006/075961 also discloses a fabric construction wherein the weft tapes are obliquely oriented in relation to the warp tapes that run oriented in the fabric-length direction. This fabric structure should not be mistaken for a bias fabric and OFT because it does not have any fibres that are oriented in the correspondingly opposite bias weft-direction as a result of which such a fabric cannot bear any load/forces in that bias direction. From these documents neither a method and means for producing an OFT nor an OFT are known. Because these woven fabrics comprise tape-like warps and wefts oriented in fabric's length and width directions respectively, the usual handling of such woven fabric presents no difficulties as a woven fabric can bear loads/forces in its longitudinal and lateral directions. Accordingly, such woven materials do not require any secondary structural integrity/stability in its body to resist development of openings/gaps.

For laying the principles of the OFT forming process according to the present inventions on a technically correct basis, it is also important to consider here certain relevant aspects of the weaving and braiding processes and the related characteristics of the fabric structures producible by them because the disclosed method according to the present inventions is considered technically noncompliant with weaving and braiding processes.

The 2D-weaving process is designed for producing an interlaced material using two clearly defined sets of yarns/tapes—the warps (orientated in fabric-length direction) and the wefts (orientated in the fabric-width direction). Its fundamental operations are shedding followed by weft inserting, to interlace the warps and the wefts in mutually orthogonal relationship. While the warp occurs parallel to fabric-length direction, the weft is at 90° orientation to the warps. The shedding operation creates a shed, which is like a tunnel formed using the warps. The planes of the two openings of the shed are located at the selvedge sides of the fabric being produced and the planes of these openings are oriented more or less perpendicular to the fabric-fell. Seen axially in the direction of the opening, the shed usually resembles either a parallelogram/rhombus or a triangle depending on the specifics of the employed shedding elements and geometry. The opening of shed is thus always defined by a closed geometrical figure.

The length of the shed equals approximately the reed-width of the fabric being produced. Further, because the shed's openings are at the selvedge sides, the weft insertion has to be necessarily performed using the side openings. Thus, the weft is inserted incrementally, oriented in its length direction, from one opening of the shed to the opposite opening. The entire length of weft is never laid in the shed at once. Subsequent to weft insertion, the reed beats-up the weft to the fabric-fell position. Clearly weft insertion and beating-up are two different operations and hence require different means for effectuation (while the former requires either a shuttle or rapier or projectile or pressurized fluid, the latter requires a reed). The take-up of the produced woven material corresponds with the 'diameter' of the weft yarn or width of the weft tape and thus the fabric is invariably advanced in the direction of the weft's width while the warp is drawn in its length direction. Lastly, weaving is designed to produce a finite length of interlaced material by virtue of the warp supply being of specific length. Thus, once the supplied length of warps is woven, a new set of warps has to be either joined to the previous one (which produces a joint in the fabric) or setup freshly again. In any case, the weaving process is technically not capable of producing endless woven fabric. Further, the body of a woven material being produced at any instant is four-sided such as that represented by a rectangle (two length sides and two width sides).

The flat braiding process, to compare with the weaving process, is designed for producing an intertwined material using one set of yarns—the braiding yarns. Its fundamental operation comprises moving yarn spools in an endless path and in a manner that their paths crisscross each other to intertwine the yarns angularly relative to the braid's length direction. Through such a working, and to obtain an acceptable braid quality in terms of areal yarn density, the braiding process naturally has a convergent layout (areal yarn density at the spools/packages side is relatively lower than that at the fabric-formation zone). Further, the braiding process inherently requires the braiding yarns to be under constant tension and constant abrasion with each other. Such an abrading action between the braiding yarns is deleterious, particularly to the brittle fibre types, as they get significantly damaged, especially at the fabric-forming zone where the yarns tend to be in intense contact with each other due to their increased proximity/density.

Another disadvantage with such a convergent layout is that the braiding process, whether flat or rotary, inherently cannot handle tapes without causing their deformation (crumpling, creasing, folding, wrinkling etc.). Thus, braiding process is relatively limited in its processing capability compared with weaving. Further, for a given braiding angle, the braiding process cannot enable relatively tighter packing of the yarns in the fabric beyond a certain point as there is no beating-up operation involved (such as in weaving). All the constituent yarns of a flat braid intertwine with each other and run continuously from one edge to opposite creating self-locked edges in braid's length direction. However, this is not possible with tapes without crumpling or deforming them. The braids are relatively narrow fabrics compared with usual woven materials which are relatively enormously wider. Such narrowness of the braid fabric is due to the natural limitation of the braiding process design. All braiding yarns run continuously from the start of the fabric to its end. Clearly the braiding process is designed to produce a finite length of intertwined material by virtue of the braiding yarn supply from spools being of specific length. Thus, once the supplied length of yarns is braided, a new set of braiding yarns has to be either joined to the previous one, which will create knots in the braid, or a new one set up again. Thus, the braiding process is technically not capable of producing endless braided material. Here again, the body of a flat braided material being produced at any instant is four sided such as that represented by a rectangle (two length sides and two width sides).

From the foregoing descriptions of the weaving and braiding processes it will be clear that both these processes cannot produce OFT using tapes, including SFT and HDPT types.

Further Features and Advantages of the Present Invention

In the light of presented technical aspects, it is obvious that it will be beneficial to make available an OFT comprising tapes, including SFT, HDPT and their combination types, whereby the OFT provides, among other performance and function related benefits, maximum strength in two opposite oblique orientations relative to the fabric-length (or width) direction and also certain secondary structural integrity/stability, preferably directionally oriented, for improved resistance to formation of openings/gaps during normal handling/processing and thereby be industrially relevant and useful.

The present invention makes available OFT fabrics that enable strengthening of large surfaces of buildings and other similar constructions, composite materials for producing lightweight and strong parts such as large mobile dish antennas, rapidly deployable heat/chemical/radiation etc. shields and ballistic mitigation products. The use of OFT for aesthetics is another objective. In short, the novel OFT fabrics will be highly advantageous wherever weight savings and bias directional performance are necessary. Obviously, OFTs comprising not just carbon and polymeric materials, but also other materials such as organic, inorganic, synthesized, metallic and natural fibres, including their combinations, to suit the requirements of a given application, can be considered. The novel OFTs can be used either independently or in combination with other suitable fabrics, for example by plying with different fabric materials. Such OFTs can occur either between the plies or at the exteriors or in combination.

A bias fabric inherently lacks strength in the fabric-length and fabric-width directions compared with a woven material (wherein warp and weft can respectively bear the loads in those directions). However, the provided OFT solves this inherent problem and advantageously provides an improved bias fabric that does not easily develop structural openings/gaps and can be handled. Such an OFT does not include extra yarns etc. The bias fabric can be also provided with the capability to adhere to other surfaces, at least temporarily, so that it can be handled and worked upon subsequently while kept in desired position and thereby not destroy/impair its structural characteristics. In a preferred embodiment, both faces of the OFT are enabled to adhere, at least temporarily, to surfaces of other materials or bodies, through use of suitable tapes. This will be helpful when, for example, OFT as reinforcement has to be positioned on other materials, or vice-versa, in particular orientations relative to the other. The OFT may be used in numerous different types of applications. For example, it will be highly useful for protecting a vehicle or a building (i.e. its occupants) by sticking one or more sheets of the OFT of suitable material quickly and temporarily over the vehicle/building and cover it for mitigating the full impact of an impact. This is further facilitated by providing adhesion of OFT to other surfaces and it could be achieved, for example, by suitably including an adhesive formulation directly in the OFT itself (e.g. through use of suitable tapes) so that it can be activated either by pressure or chemical reaction (including application of water) or heat or a suitable combination of them.

The OFT may also be preferably provided with slits so that suitable bands can be passed through it for supporting/attaching the OFT to other surfaces when necessary. Incorporation of slits will uniquely render OFT functional.

The OFT may also be preferably provide with either one wholly sealed longitudinal edge, or both longitudinal edges partly sealed, for its reliable and durable guiding and handling, for example during its subsequent processing such as unrolling and pre-pregging.

BRIEF DESCRIPTION OF THE DRAWINGS

The preferred embodiments of the novel OFT and its unique method and means for production are illustrated through the following drawings.

DETAILED DESCRIPTION OF THE INVENTION

Figure 1A:
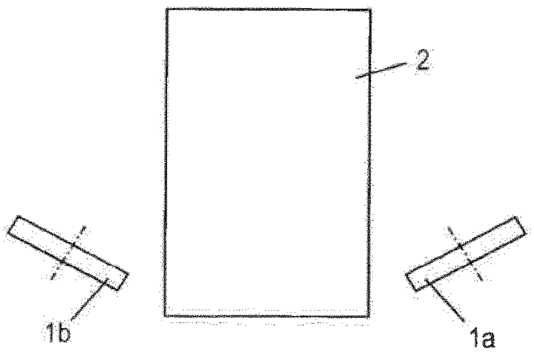
FIGS. 1*a-j* illustrate the steps of Starting Phase of the method for producing OFT.

The preferred embodiments of the present inventions relating to the method of and means for producing OFT and also the OFT constructions producible thereof will be described in the following. However, it is to be understood that features of the different embodiments are exchangeable between the embodiments and may be combined in different ways, unless anything else is specifically indicated. It may also be noted that, for the sake of clarity, the dimensions of certain components illustrated in the drawings may differ from the corresponding dimensions in real-life implementations of the invention.

Production Method

Production of OFT comprising tapes, including SFT and HDPT, according to this invention involves the Starting and Continuing Phases. The various steps involved in the Starting Phase are first described in reference to FIGS. 1*a* to 1*j* and those of the Continuing Phase in reference to FIGS. 2*a* to 2*j*. These illustrations show the plan view and represent one mode of OFT production.

Starting Phase

The starting phase preferably comprises the following steps:

Positioning each of the two tape supply spools (1*a*, 1*b*), with a defined angle between their axes, at either side of the working bed (2) as shown in FIG. 1*a*.

Figure 1B:
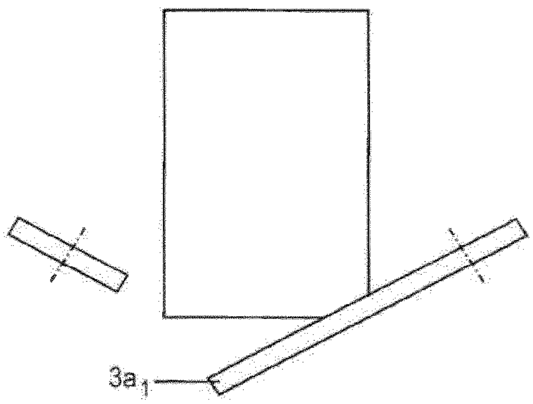

Drawing out specified length of tape (3*a*1) from spool (1*a*) towards bed (2) as shown in FIG. 1*b*.

Figure 1C:
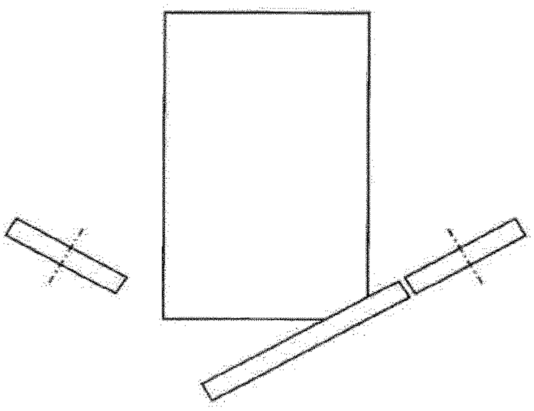

Cutting tape (3*a*1) from its supply spool (1*a*) as shown in FIG. 1*c*.

Figure 1D:
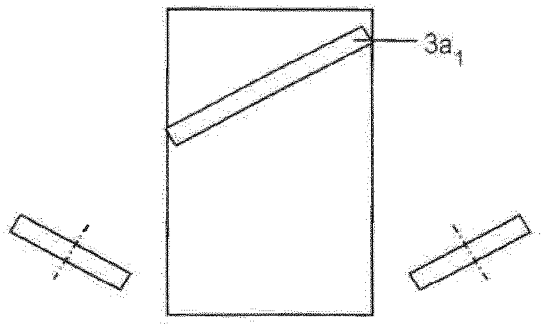

Placing cut tape (3*a*1) on working bed (2) as shown in FIG. 1*d*.

Figure 1E:
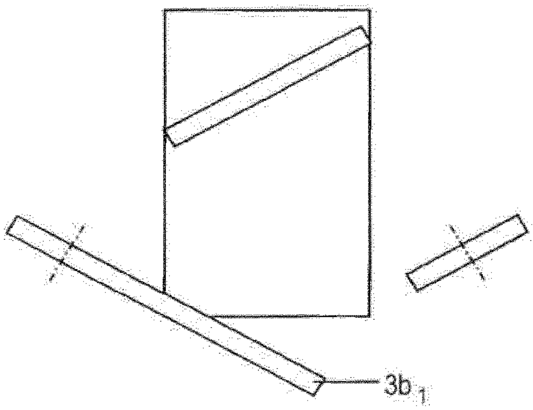

Drawing out specified length of tape (3*b*1) from spool (1*b*) towards bed (2) as shown in FIG. 1*e*.

Figure 1F:
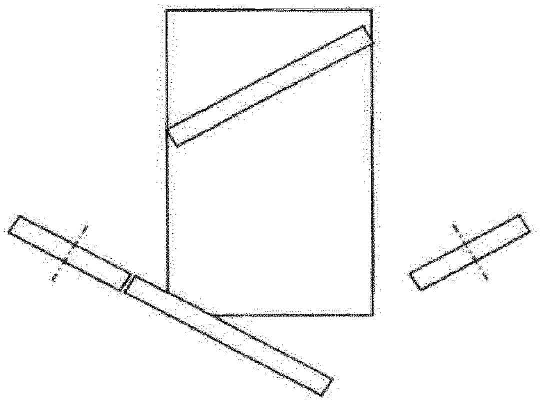

Cutting tape (3*b*1) from its supply spool (1*b*) as shown in FIG. 1*f*.

Figure 1G:
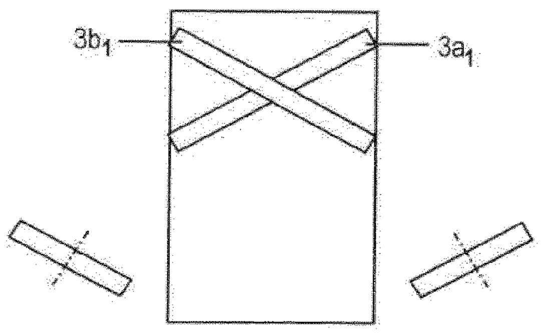

Placing cut tape (3*b*1) over tape (3*a*1) on working bed (2) as shown in FIG. 1*g*.

Figure 1H:
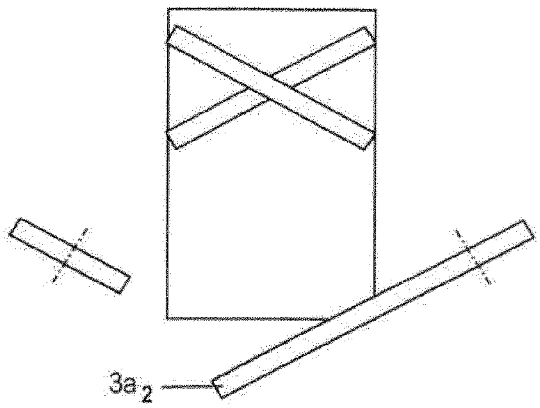

Drawing out specified length of tape (3*a*2) from spool (1*a*) towards bed (2) as shown in FIG. 1*h*.

Figure 1I:
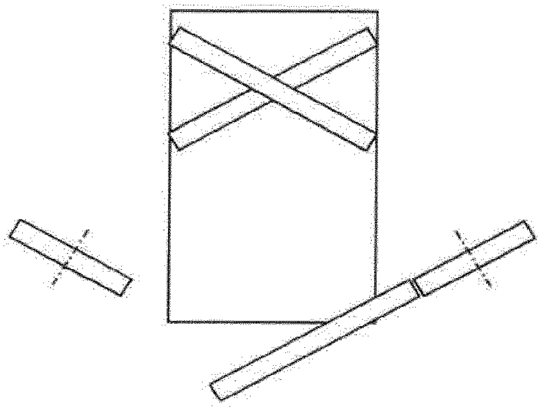

Cutting tape (3*a*2) from its supply spool (1*a*) as shown in FIG. 1*i*.

Figure 1J:
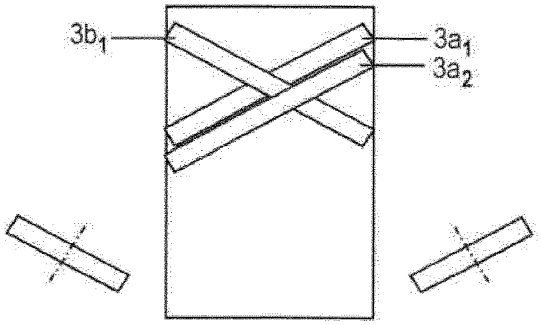

10) Placing cut tape (3*a*2) over tape (3*a*1) and adjacently parallel to the previously laid tape (3*a*1) on working bed (2) as shown in FIG. 1*j* and consolidating the created primary structural integrity/stability with a suitable secondary structural integrity/stability.

Continuing Phase

Figure 2A:
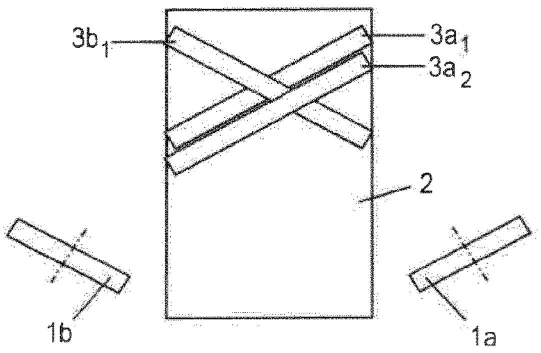
FIGS. 2*a-j* illustrate the steps of Continuing Phase of the method for producing OFT.

The commencement point of the Continuing Phase, as shown in FIG. 2*a*, is after the first three tapes have been laid according to the procedure described in the Starting Phase. The Continuation Phase involves the following procedures.

Figure 2B:
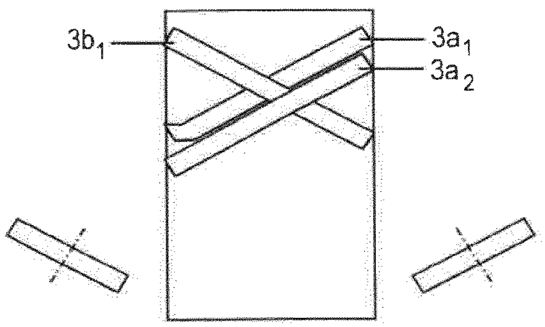
Figure 2C:
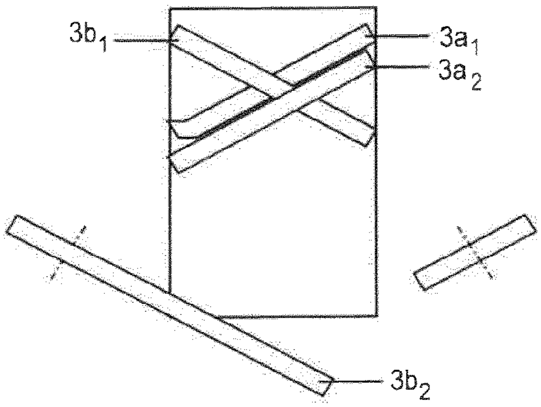
Figure 2D:
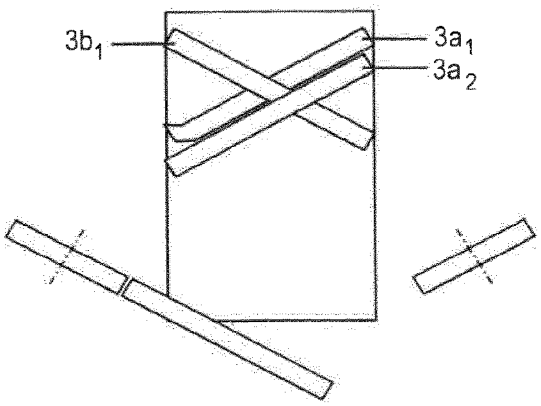
Figure 2E:
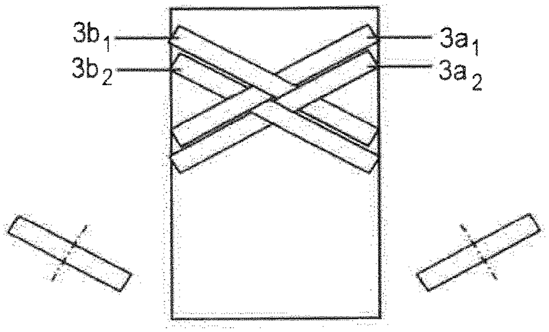
Figure 2F:
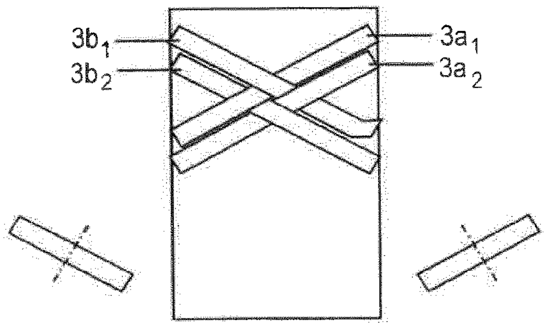
Figure 2G:
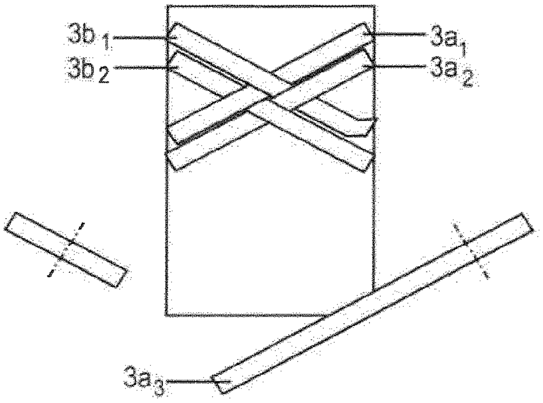
Figure 2H:
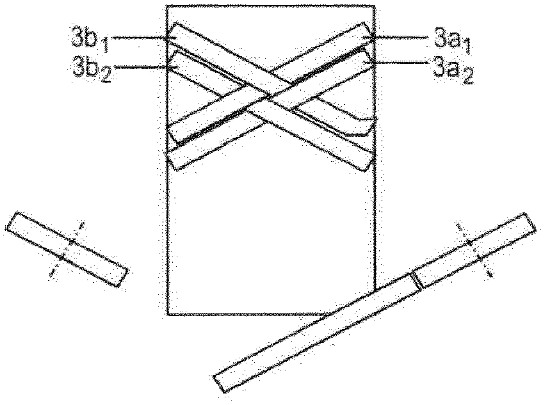
Figure 2I:
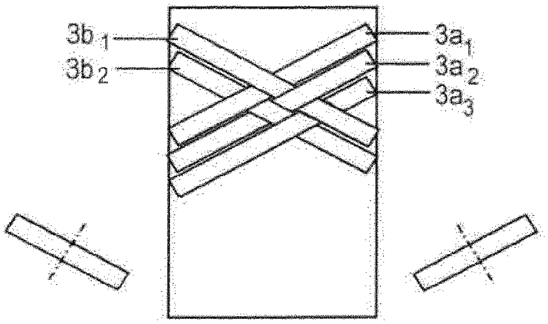
Figure 2J:
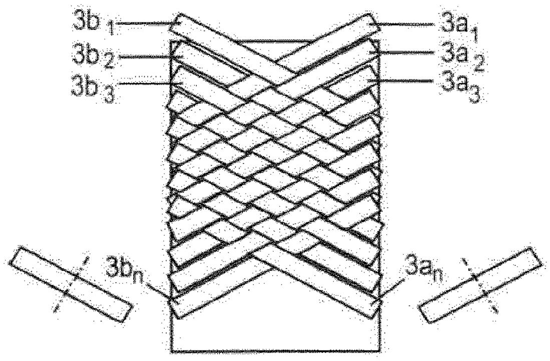

1) Displacing the fore end of tape (3*a*1) in its thickness direction and creating front-face opening in relation to non-displaced fore end of adjacent tape as shown in FIG. 2*b*.
2) Drawing out specified length of tape (3*b*2) from spool (1*b*) towards bed (2) as shown in FIG. 2*c*.
3) Cutting tape (3*b*2) from its supply spool (1*b*) as shown in FIG. 2*d*.
4) Positioning cut tape (3*b*2) in the created front-face opening, i.e. over tape (3*a*2) and below raised fore end of tape (3*a*1), laying it adjacently parallel to the previously laid tape (3*b*1) and reverting back raised fore end of tape (3*a*1) as shown in FIG. 2*e*.
5) Displacing the fore end of tape (3*b*1) in its thickness direction and creating front-face opening in relation to non-displaced fore end of adjacent tape as shown in FIG. 2*f*.
6) Drawing out specified length of tape (3*a*3) from spool (1*a*) towards bed (2) as shown in FIG. 2*g*.
7) Cutting tape ($3a_3$) from its supply spool (1*a*) as shown in FIG. 2*h*.
8) Positioning cut tape ($3a_3$) in the created front-face opening, i.e. over tape ($3b_2$) and below raised fore end of tape ($3b_1$), laying it adjacently parallel to the previously laid tape ($3a_2$) and reverting back raised fore end of tape ($3b_1$) as shown in FIG. 2*i*.
9) Consolidating the created primary structural integrity/stability with a suitable secondary structural integrity/stability.
10) Repeating endlessly steps 1-9 of Continuing Phase by displacing the fore ends of preferred laid tapes in their thickness direction in a predefined patterning order and creating front-face opening in relation to adjacent non-displaced tapes, laying cut tapes ($3a_n$) and ($3b_n$) in the created front-face openings from corresponding directions and adjacently parallel to the previously laid tapes and reverting back raised fore ends of corresponding tapes and consolidating the created primary structural integrity/stability with a suitable secondary structural integrity/stability to produce OFT continuously as shown in FIG. 2*j*.

Figure 3:
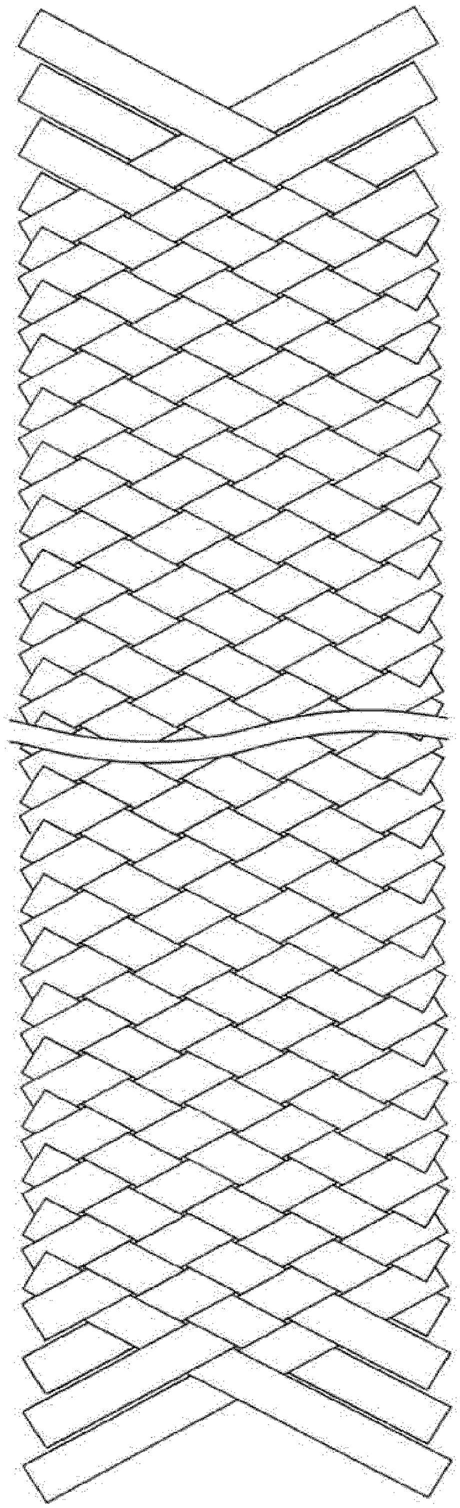
FIG. 3 exemplifies an OFT construction.

The steps for consolidating the created structure for resisting formation of openings/gaps, advancing forward the produced OFT for winding-up in a roll form, though not listed above, will be performed at appropriate moments for achieving practical continuity of the process as shall be described later. An OFT is represented generally in FIG. 3.

The listed steps are for general guidance and do not have to be necessarily performed in the indicated sequence. For example, the Starting Phase could commence by drawing out tape ($3b_1$) instead. Also, variations can be introduced in the described steps of the novel process to achieve practical efficiency. For example, the fore end of a laid tape can be displaced while the tape from the spool is being drawn out, or tapes from both the spools can be drawn out half way simultaneously, or cutting of drawn out tape can be performed when produced OFT is being advanced forward for winding into roll etc.

Alternatively, in the Starting Phase, initially two tapes of the same oblique direction could be laid adjacently. Then, one of the fore ends be displaced in its thickness direction to create front-face opening, in conjunction with the other tape the fore end of which is not raised, to receive a tape of the other oblique direction. From this point on, the described Continuing Phase could commence suitably, as described, by displacing the preferred fore end of the initially laid two tapes of the other oblique direction.

From the foregoing description of the method the following important novelties can be immediately observed:

The process employs essentially two tape supply sources, such as working spools (which can be of either same or different materials, types, properties etc.).

The process does not involve traditional setting-up of materials, such as that associated with weaving and braiding.

The process is endless, i.e. the process need not be technically stopped to start afresh with new setting up so long as the two supply sources of tapes, such as spools, are replenished, either automatically or manually. Alternatively, cut tape lengths could be continuously stored in and drawn/supplied from a magazine.

4) The process does not follow the procedures of weaving process because:
(a) It is not possible to perform weaving using only two supply spools—one for warp and one for weft.
(b) There are no defined sets of warps and wefts.
(c) The fore ends of the laid tapes that are to be displaced in their thickness direction occur along the respective two longitudinal edges of the fabric whereby no shed is created between the two longitudinal edges.

(d) There is no shed created of any defined closed shape and there is no weft insertion performed from one open side of a shed to the opposite.

(e) The laid tapes are tensionless and not required to be maintained in a tensioned condition during OFT production.

(f) There are two production phases—Starting and Continuing.

5) The process does not follow the procedures of braiding process because:

(a) It is not possible to perform braiding using two stationary spools. (By using two moving spools the issuing tapes will only twist with each other and not intertwine.)

(b) The two spools remain stationary and are not traversed in any endless tracks.

(c) The tapes are not under constant abrasion with each other.

(d) The tapes do not run continuously between the fabric edges.

(e) The laid tapes are tensionless and not required to be maintained in a tensioned condition during OFT production.

(f) There are two production phases—Starting and Continuing.

6) The process involves consolidation of the created primary structural integrity/stability with a suitable secondary structural integrity/stability for improved resistance to formation of openings/gaps and deformation.

7) The produced OFT is advanced forward for winding by a distance defined by the length of longitudinal diagonal of the rhombus-shaped pattern of the OFT, and not the width of the tape. The OFT is not advanced forward for winding in the constituent tape's width direction.

8) The process can combine tapes of different materials, types, properties etc. at will.

9) The process does not require the tapes to be maintained under constant tension as a condition for processing them into OFT.

10) The process associates partly the tape of one direction that is being laid with the earlier laid tapes of the other direction emanating from the body of the produced OFT and the remainder of this tape is laid free to associate with the tape of the other direction that will be laid subsequently.

11) The length of each tape required for producing an OFT is governed by a definite relationship between fabric width and angle of tape's incorporation in OFT.

12) The process directly lays at once the entire length of each of the required tapes during OFT production and such laid tapes occur in a tensionless state in OFT.

It is preferable that the described process is carried out in a horizontal format to produce the novel textile material. However, if there are space restrictions then OFT can be produced in either an inclined format or vertical format using suitable means without departing from the spirit of the described process.

To the practitioners of weaving and braiding it will be amply clear now that the described process does not comply technically with the established principles, procedures and operations of either weaving or braiding processes. Also, the novel process described herein is technically not both weaving and braiding processes at the same time. It is also technically not a part-combination of both weaving and braiding processes in any way. That the described novel process is technically neither weaving nor braiding is in itself a novelty of this process. The simplicity of the described process, in comparison to the weaving and braiding processes, makes it all the more practically relevant and industrially attractive. Accordingly, a suitable practical device, working on the new fabric-forming principle, for producing OFT, is presented next.

Production Device

Figure 4:
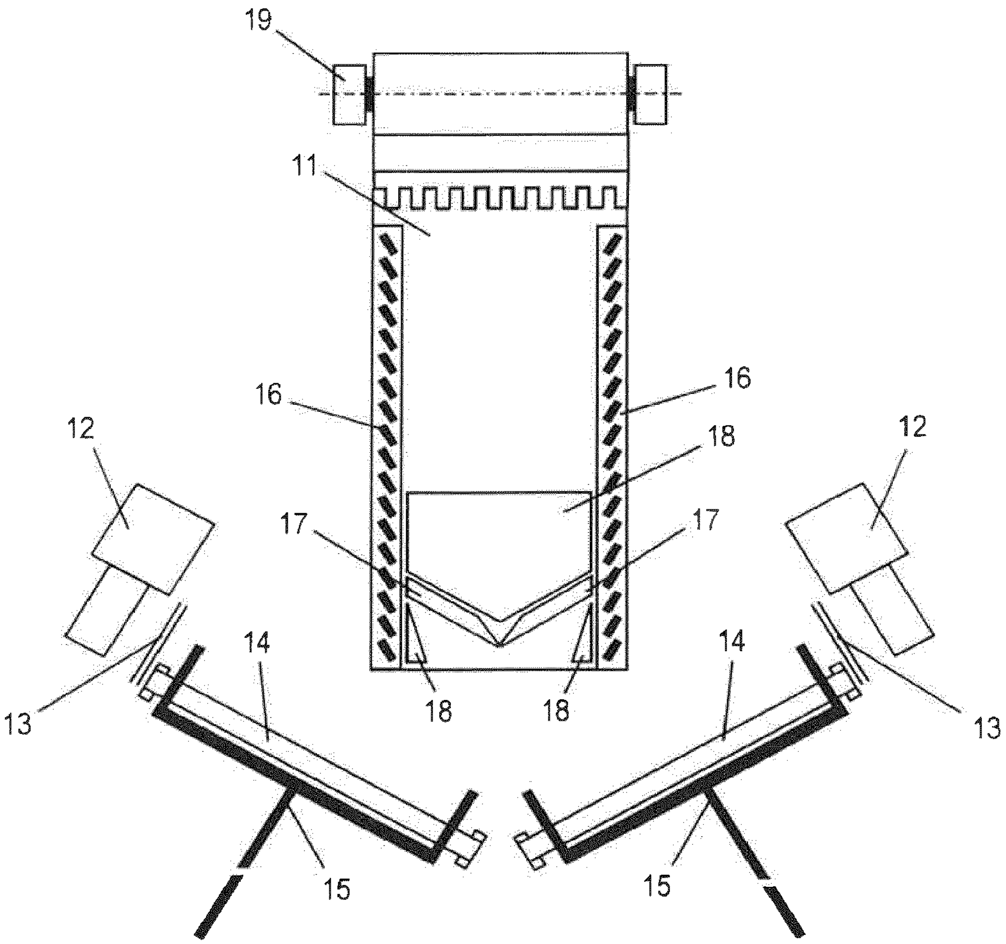
FIG. 4 illustrates a layout of the essential components of the device preferred for producing OFT.

The preferred embodiments of the novel practicable device for producing OFT using tapes, including SFT and HDPT types and any other kind and combination of tapes, are described in reference to FIG. 4, which shows the plan view in general.

The relative positions of the essential and different constituent arrangements of the novel device for producing OFT are shown in FIG. 4. The device comprises the following:

1. Arrangement for supporting textile formation (11)
2. Arrangements for supplying tapes (12)
3. Arrangements for cutting tapes (13)
4. Arrangements for drawing out tapes from spools (14)
5. Arrangements for laying the cut tapes (15)
6. Arrangements for displacing fore ends of the laid tapes (16)
7. Arrangements for consolidating produced material (17)
8. Arrangement for advancing produced material (18)
9. Arrangement for collecting produced material in a roll (19)

Each of these indicated arrangements of the device and their features are individually described below.

1. Arrangement for Supporting Textile Formation (11)

Figure 5A:
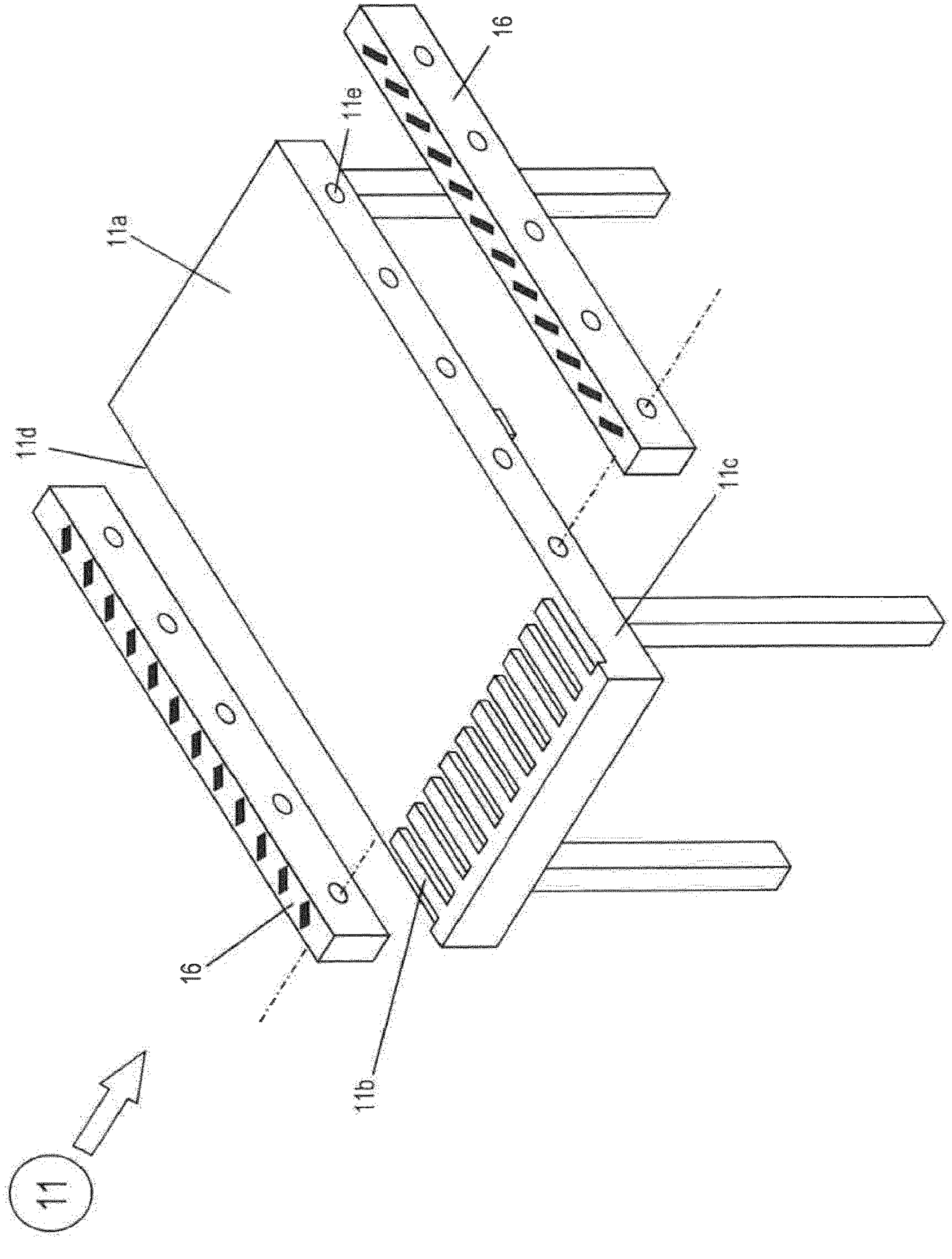
FIGS. 5*a-b* exemplifies the working bed of the OFT producing device.
Figure 5B:
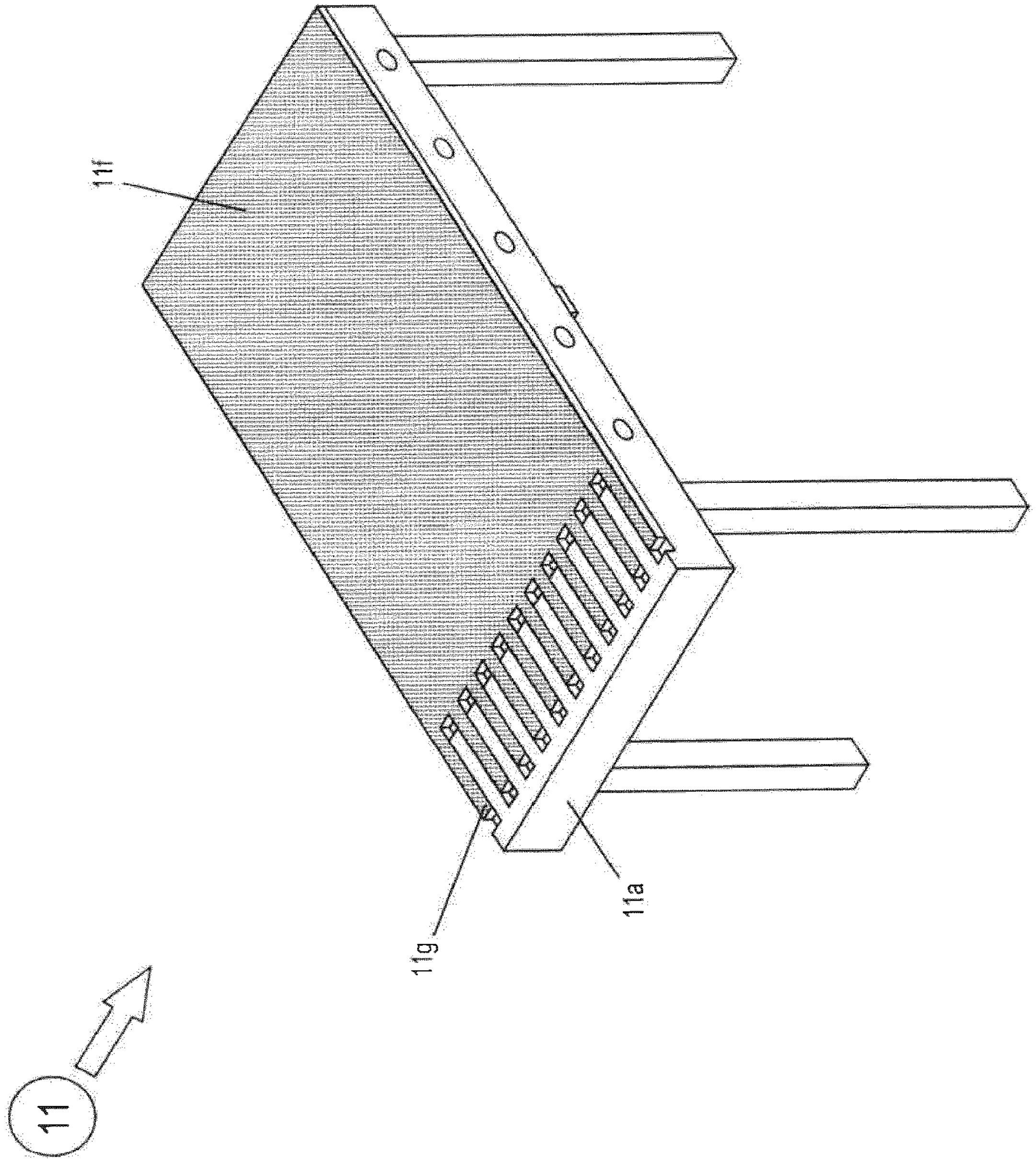

As shown in FIG. 4, arrangement (11) for supporting textile formation is central to the production of OFT. In FIG. 5*a* are shown, by way of example, the basic components of this arrangement (11). It comprises a working bed (11) part of which is stationary (11*a*) and provided with finger-like projections (11*b*) at one end side. Bed (11) supports movable bed/plate (11*f*) shown in FIG. 5*b*. Plate (11*f*) is also provided with matching fingers (11*g*) as shown in FIG. 5*b*. Plate (11*f*) can be reciprocated relative to the bed (11*a*) in the longitudinal direction of bed (11*a*) for enabling forward advancement of OFT for take-up. The arrangement (11) is thus composed of stationary and movable parts. The distance of reciprocation of plate (11*f*) is controlled by suitable drives (not shown). The distance by which plate (11*f*) has to be reciprocated would depend on the width of the tapes used for producing the OFT and the angle of their orientation relative to the longitudinal direction of arrangement (11). For example, when using tapes of 50 mm width, the distance of reciprocation of plate (11*f*) will be about 100 mm when tapes' orientation is 60°; 71 mm when tapes' orientation is 45° and 58 mm when the tapes' orientation is 30°. As can be noticed, the distance of reciprocation of plate (11*f*) is always greater than the width of the tapes used and it corresponds approximately to the distance that the produced OFT has to be advanced for winding into a roll. Arrangement (11) thus also functions to assist in advancing forward the produced OFT for take-up.

The stationary bed (11*a*) and the movable plate (11*f*) are respectively provided with fingers (11*b*) and (11*g*) or similar arrangement. The heights of fingers (11*b*) and fingers (11*g*) are preferably equal so that they can together provide a bridge of uniform plane and continuous surface for the OFT being produced over them. This way OFT can be supported in a sliding manner by plate (11*f*) and without its constituent fibres getting hooked or damaged or pulled out during reciprocation of plate (11*f*). Alternatively, the height of fingers (11*g*) of plate (11*f*) could be relatively greater than that of fingers (11*b*) of bed (11*a*). The OFT is essentially formed on bed of arrangement (11) which is composed of stationary and movable components. Accordingly, arrangement (11), shown in FIGS. 5*a* and 5*b* constitute the textile formation support of this novel process. Arrangement (11) has two ends, which may be regarded as the feeding end (i.e. the end farthest from fingers (11*b*/11*g*) and winding end (i.e. the end closest to fingers (11*b*/11*g*).

The surfaces of plate (11*f*) and fingers (11*b*) and (11*g*) are preferably in one plane and of low friction type such as that obtained by either coating it with PTFE (or the like) or fixing a suitable sheet of PTFE (or the like) over it. The advantages with the latter being easier, quicker and lower cost of replacement. As all other involved arrangements will be physically related to this arrangement (11), it is preferred that this arrangement is robust and stable to support them. Bed (11*a*) need not be necessarily heavy; it could be as well produced using suitable lightweight composite materials. The bed (11*a*) and plate (11*f*) could be also made using perforated plates, not only to reduce weight but also to keep the tapes laid over them detachably attached, such as possible by using vacuum pressure. A construction as this could be beneficial especially when arrangement (11) is preferred to be had either inclined or vertical due to certain needs as indicated below.

Preferably bed (11*a*) is employed horizontally as shown in FIGS. 5*a* and 5*b*. The height of bed (11*a*) from the floor could be of either fixed type or raising-lowering type depending on the convenience requirements of the operating personnel. In case of either production floor space restrictions or other special needs of the operating personnel, the bed could be either tilted at a convenient incline or even made vertical (together with the other arrangements that will be physically connected to it). The bed (11*a*) has dimensions suitable for accommodating whole lengths of tapes that will be laid obliquely in two orientations over it for OFT production. The arrangement (11) is constructed in a manner that all its edges are smooth and rounded to prevent the constituent fibres of the produced OFT from getting hooked and damaged, for example when OFT is fed in sliding manner over the surfaces of fingers (11*b* and 11*g*) and plates (11*a* and 11*f*) for taking-up.

On the two longitudinal sides (11*c*) and (11*d*) of bed (11*a*) are provided suitable provisions (11*e*), for example threaded holes, projections, recesses, slots etc., to support arrangements (16), that are preferred for displacing the fore ends of the laid tapes, as indicated in FIG. 5*a*. These arrangements (16), to be described later, are preferred to be located at the sides (11*c* and 11*d*) of bed (11*a*) for operational reasons and shall be described later.

As normally OFT of different widths shall be preferred to be produced, it is considered advantageous to have bed (11*a*) and plate (11*f*) made in a manner that its width can be suitably altered and set prior to commencing the desired production. Such an alteration of the bed's width could be realized by constructing it modularly. For example, bed (11*a*) and plate (11*f*) can be made in suitable longitudinal sections of different widths so that they can be placed adjacently to each other and joined to achieve the preferred width of bed (11*a*) and plate (11*f*). There is another benefit in having the possibility of varying the width of bed (11*a*). For example, operating personnel can easily access the material during production in case attention is needed. A relatively small width material produced on a wide bed will be obviously difficult to reach. In any case, as will become clearer later, the total working width of the arrangement (11) will be the combined width of bed (11*a*) and the two arrangements (16) attached at its sides (11*c*) and (11*d*).

In an alternative arrangement, a conveyor belt may be used, whereby the upper part of the conveyor belt of preferred width could be used over bed (11*a*) and reciprocating plate (11*f*), for producing OFT over it, while the lower part of conveyor belt passes under bed (11*a*). Such a conveyor belt could be turned by a pair of suitable rolls, one mounted at feeding end of bed (11*a*) and the other at the OFT winding end. An advantage with using a conveyor belt is that it can be continuously moved in preferred increments or steps. However, its main disadvantage is that it tends to curve in its width direction (over long spans) and hence the surface of the conveyor belt is difficult to be maintained plane. Getting the belt equally tensioned longitudinally at both sides also presents difficulties and it can become a cause for skewing the OFT during production.

In another alternative arrangement, if preferred, a paper sheet, or the like, could be continuously supplied from a large roll from feeding end and passed over plate (11*f*) and OFT directly produced over it. This way the fed paper can also directly function as an interleaving material between the layers of OFT when it is wound into a roll. The paper can be substituted by any other material, such as polymeric film and laminated paper.

2. Arrangements for Supplying Tapes (12)

Figure 6:
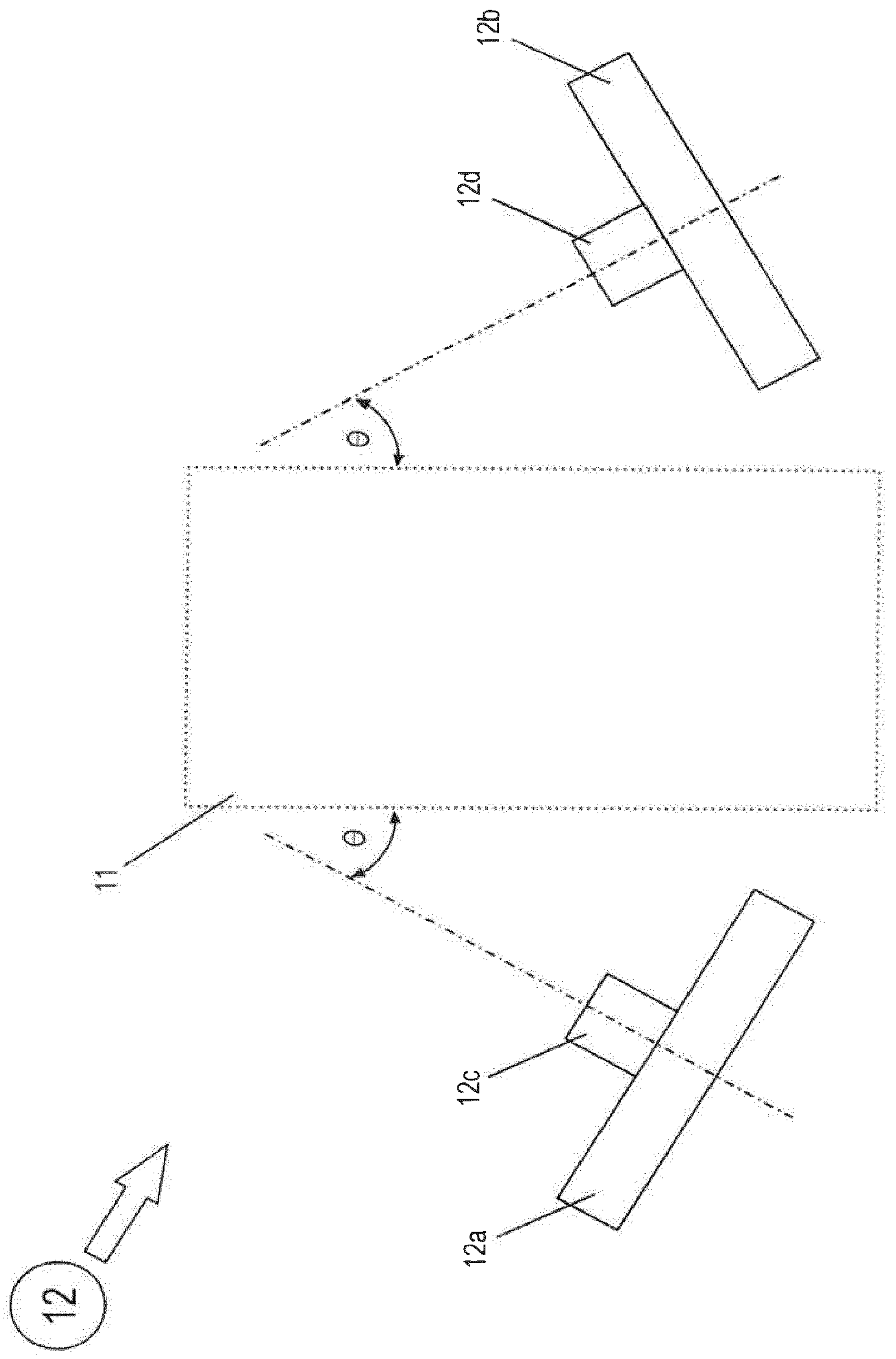
FIG. 6 exemplifies the arrangement of the tape supply spools at either sides of the bed.
Figure 7A:
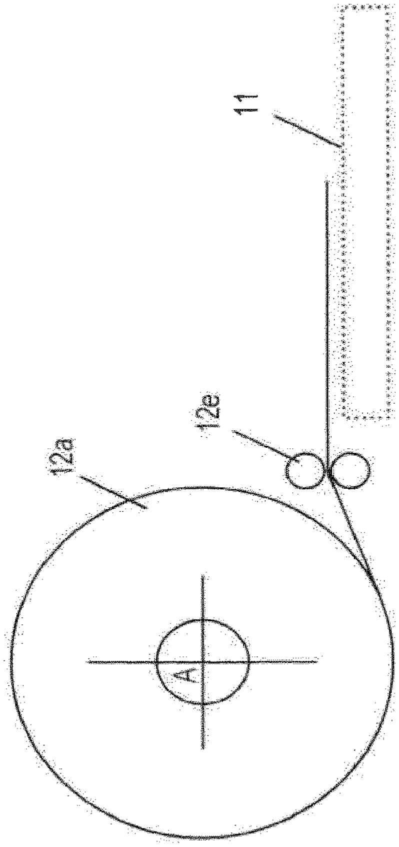
FIGS. 7*a-d* exemplify different possibilities of arranging the tape supply spools in relation to the working bed.
Figure 7B:
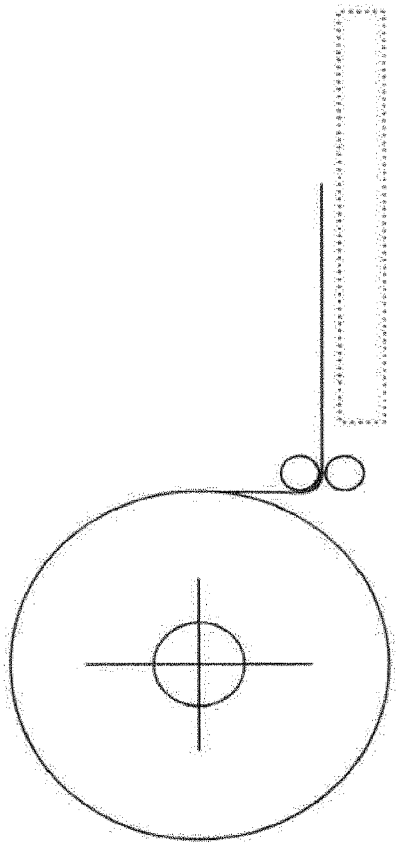
Figure 7C:
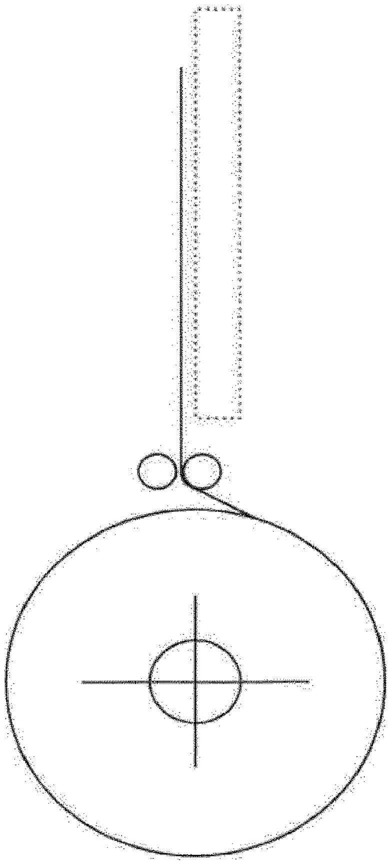
Figure 7D:
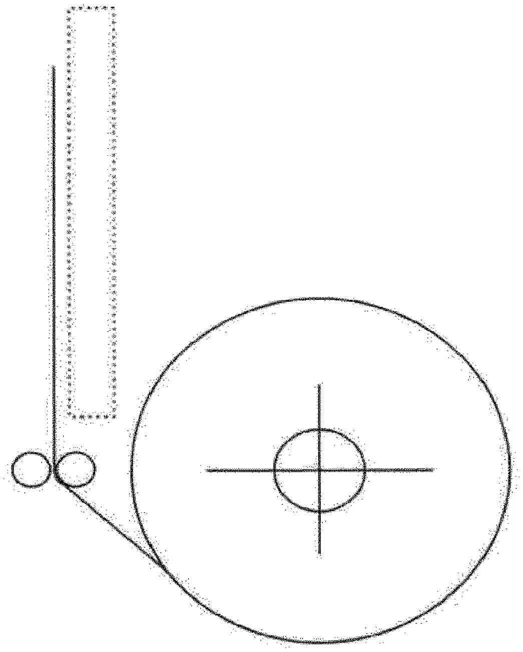

In FIG. 4 is shown, by way of example, the relative position of arrangement (12) that is preferred for supplying tapes for producing the novel OFT materials. As shown in FIG. 6, two tape spools (12*a*) and (12*b*) are mounted on respective shafts/holders/chucks (12*c*) and (12*d*) which are located at the sides of arrangement (11) described earlier. The axes of both these spools are respectively maintained at an angle relative to the two longitudinal sides of arrangement (11). Both these angles 8 made by the axes of the spools (12*a*) and (12*b*), shown in FIG. 6, can be either equal or unequal, but preferably in opposite oblique directions, according to the desired obliqueness of the tapes that are to be incorporated in the OFT. Preferably, each of the two axes are maintained at a practically convenient height from the floor for convenience in mounting/dismounting spools.

The axes of spools (12*a*) and (12*b*) could be maintained in different relations to the top surface of arrangement (11) as exemplified in FIGS. 7*a* to 7*d*, wherein only one spool is shown for explanation. The position of the spool axis A can be either above (FIGS. 7*a* and 7*b*), or at the same level (FIG. 7*c*) or below (FIG. 7*d*) the top surface of arrangement (11). Such positioning possibility of the spools is possible because the position of the exit guide rolls (12*e*) can be maintained constant in relation to the surface of arrangement (11). As exemplified in FIGS. 7*a* and 7*b*, the tape can be drawn out from spool (12*a*) from either 'under' or 'top' sides of the spool while the axis A remains above the top surface of arrangement (11). It is not necessary to locate the spools besides the arrangement (11) as shown in FIG. 6; depending on the constructional and floor space reasons the spools can be located either over or under the bed of arrangement (11). Also, the axis of the spools can be had either parallel or at an angle to the surface of arrangement (11). Such positioning possibilities of the spools uniquely provide savings in operational floor area requirements and ease of accessibility considering the required space restrictions and engineering and operational conveniences. In any case, as can be inferred, it is not necessary to draw the tapes only from spools (12*a*) and (12*b*); specific cut-length of tapes could be also stored in a suitable magazine and supplied for uninterrupted production of OFT.

The spools (12*a*) and (12*b*) are respectively mounted on shafts/chucks (12*c*) and (12*d*), as shown in FIG. 6, which are fixed to suitable pedestals (not shown). These pedestals could be fixed to a base plate or mounted on two arms that could extend from the arrangement (11) (not shown). While the inner ends of the arms could be connected to arrangement (11), the outer ends of these arms could bear the pedestals for supporting the holders/chucks (12*c*) and (12*d*). The arms could be preferably of the telescopic kind so that the spools (12*a*) and (12*b*) can be easily positioned either close to or away from arrangement (11) according to needs. The pedestals could be mounted on the arms in a manner that each one of them can be individually swiveled and locked respectively into desired positions so that the angle of the axes of the spool (12*a*) and (12*b*) could be directly and easily adjusted and set. Alternatively, the inner ends of the arms could be suitably connected in a way, such as gears, that movement of one of the arms produces a corresponding movement in the other. Means for locking the arms in the desired positions could be suitably located.

The turning of the spools (12*a*) and (12*b*) to pay out the tapes in the direction of arrangement (11) can be controlled by available conventional electrical, mechanical, pneumatical etc. systems.

While the essentials of arrangement (12) have been described above, certain other aspects relating to special needs and automation are considered next.

At times special tape materials, such as prepregs and tacky, might be preferred to be processed. Such tapes are usually supplied with a foil that prevents the layers of the tapes wound in a spool from sticking to each other. For handling such foil tapes, additional pedestals can be fixed to the base plate or arms (or extensions thereof) so that collection of the waste foil paid out by the spools (12*a*) and (12*b*) can be directly wound onto other spools that are respectively mounted close to the working spools.

When processing tapes that incorporate powdery substance, suitable suction units could be mounted at appropriate positions for continuous removal of the powder, if needed. Likewise, if wet tapes are to be processed, suitable drying heaters/blowers could be mounted at appropriate positions.

To enable automation, spool changers could be incorporated. For example, robotic arms could pick fresh spools from a magazine and mount them onto the shafts/chucks (12*c*) and (12*d*) projecting from respective pedestals. Another approach would be to have the spools directionally arranged in a magazine that could be brought into position for the shafts/chucks (12*c*) and (12*d*) to directly receive such spools once the running spools near exhaustion. Still another way would be to have a pedestal with, e.g. four or six, shafts/chucks fixed to it in as many orientations. By angularly turning the pedestal, the spools mounted on the shafts/chucks can be brought into the desired working position. Yet another way to replenish the exhausted spools with fresh ones would be to have additional pedestals, loaded with fresh spools, which could then be turned and brought into the working position. Fresh spools could be loaded in advance on the shafts/chucks of pedestals at the 'non-working or passive' positions while the 'working or active' spools are running. As the running spools get expended, the additional pedestals could be brought into position automatically. Through use of any type of automated spool changer, an OFT can be produced using any tape material, type, form, properties etc. Also, such changes can be effected at will and in any sequence whereby an endless variety of OFT can be easily and directly produced.

Alternatively, as indicated earlier, specific cut lengths of tapes could be continuously stored in a magazine and suitably presented for laying on arrangement (11).

3. Arrangements for Cutting Tapes (13)

Figure 8:
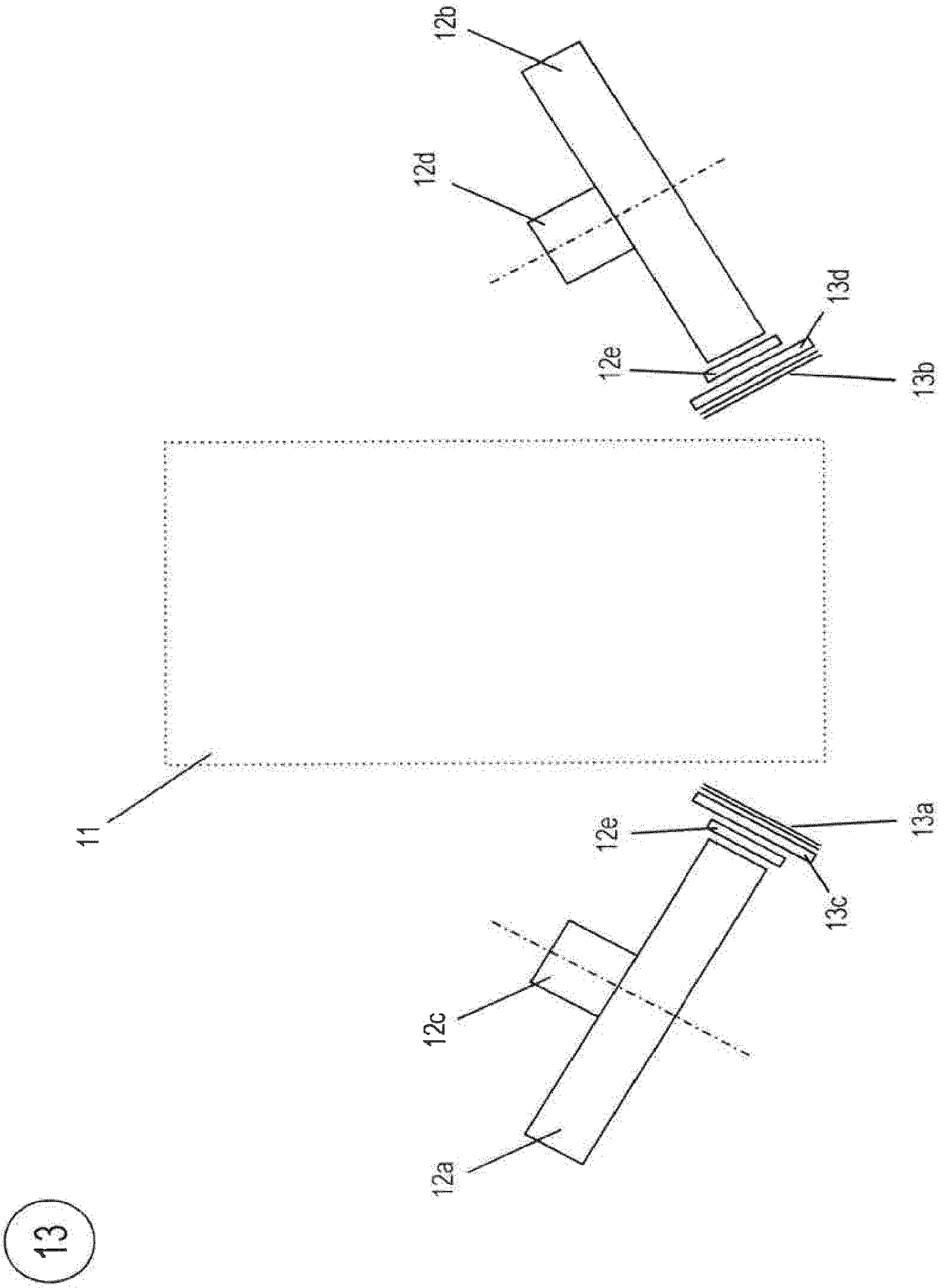
FIG. 8 exemplifies the arrangement of the tape holders and tape cutters.
Figure 9B:
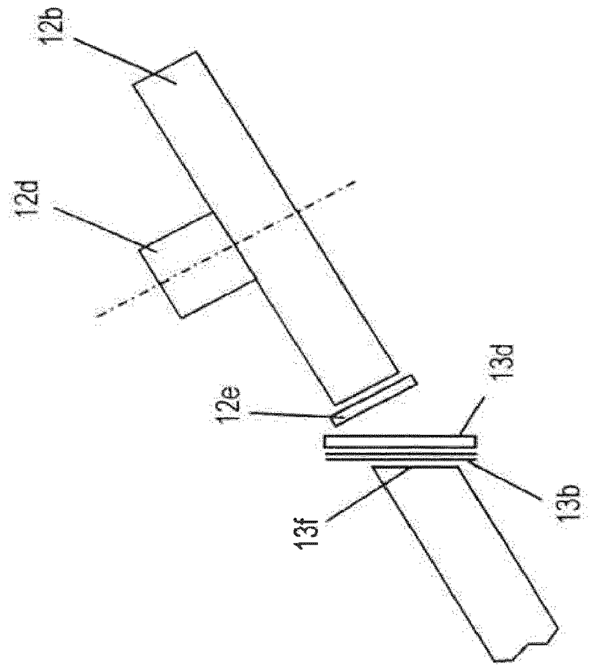
FIGS. 9*a-b* exemplify different styles of cutting the tape.
Figure 9A:
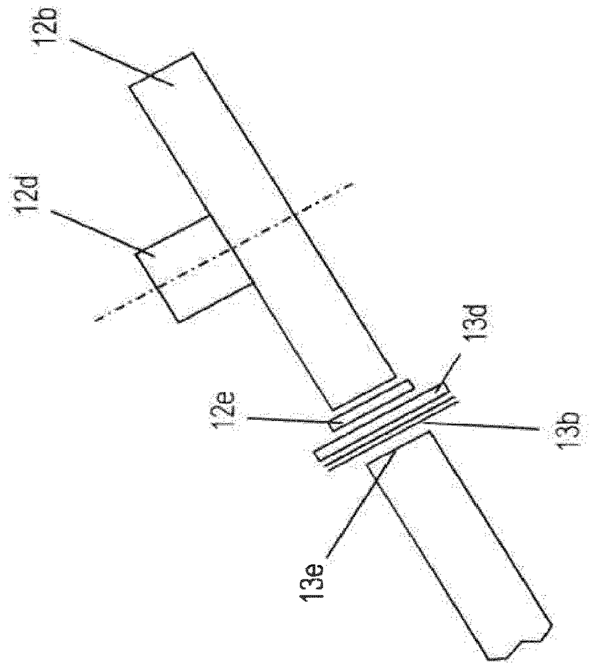

As the novel OFT is produced using only specific discrete lengths of tapes, inclusion of devices for cutting the tapes that are drawn out from the spools (12*a*) and (12*b*) become indispensable. In FIG. 4 is shown, by way of example, the relative position of the arrangements for cutting tapes (13). Accordingly, as shown in FIG. 8, the cutting device exemplified includes the cutters (13*a*) and (13*b*) and also means for clamping (13*c*) and (13*d*). Both these cutting units are suitably located, preferably besides arrangement (11). Further, the cutters (13*a*) and (13*b*) are positioned in the vicinity of the exit rolls/bars (12*e*). These cutters can be reciprocated if necessary. Further, the cutters (13*a*) and (13*b*) are mounted in a manner that they can be turned/swiveled and locked into desired angular position in relation to the length direction of the tapes paid out by the spools (12*a*) and (12*b*). As shown in FIG. 9*a*, the cut edge (13*e*) of the tape is 90° relative to its length direction. In FIG. 9*b* is shown the cut edge (13*f*) of the tape at an angle relative to its length direction. Such an angular cut is preferred to have cut edges of the angularly laid tapes oriented in line with the corresponding longitudinal edge of the OFT.

This arrangement for tape cutting (13), in addition to cutters (13*a*) and (13*b*), also includes clamps (13*c*) and (13*d*), FIG. 8, to hold the fore ends of the drawn out tapes in position (for subsequent operation) and also for the cutters (13*a*) and (13*b*) to cut them reliably. These clamps (13*c* and 13*d*) can be also correspondingly turned/swiveled and locked in position just as the cutters (13*a* and 13*b*).

The cutting devices (13*a*) and (13*b*) can be preferably of either contact type (e.g. mechanical, thermal) or contact-less type (e.g. laser). The type of cutting device to be selected will depend on the material composition of the tape to be used in the production of OFT.

4. Arrangements for Drawing Out Tapes from Spools (14)

The relative positions of the arrangements (14), which are preferred for drawing out the tapes from the respective spools, are shown in FIG. 4. As essentially two tape supply sources, for example working spools (12*a*) and (12*b*), are preferred for producing OFT, this arrangement (14) comprises two units which work identically. For the purpose of explaining, the working of only one of the units is exemplified in FIGS. 10*a* and 10*b*.

Figure 10A:
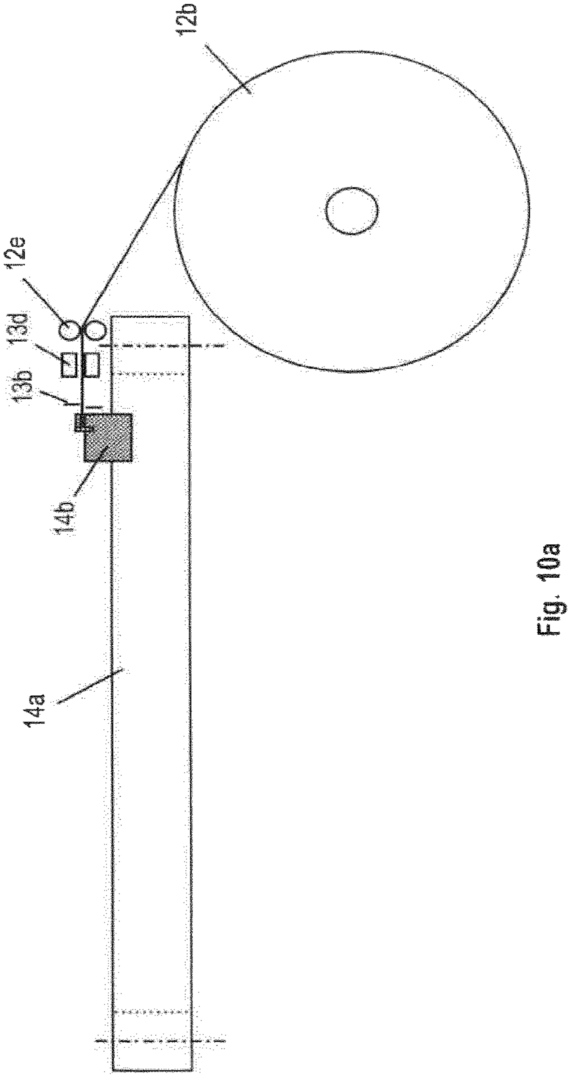
FIGS. 10*a-b* exemplify an arrangement for drawing out the tape from the spool.
Figure 10B:
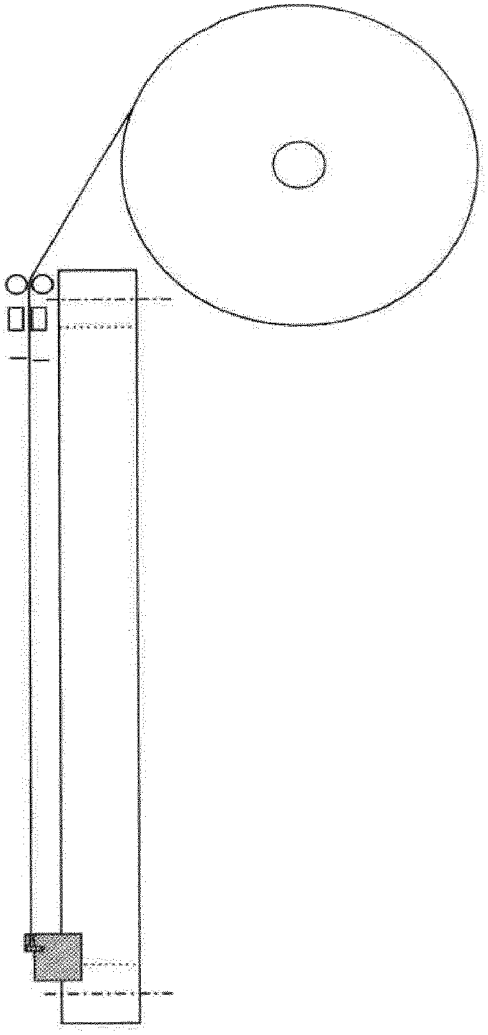

As shown in FIGS. 10*a* and 10*b*, this arrangement essentially comprises a linear driving member (14*a*) onto which is fixed a gripper block (14*b*) for gripping/clamping the tape as is described below. The tape gripper (14*b*) can be moved back and forth (i.e. reciprocated) by the linear driving member (14*a*) between two desired positions that defines the length of the tape to be drawn out from the spool (12*b*) for producing OFT. These two positions are a constant for a given width of the OFT to be produced. This way the gripper (14*b*) grips the fore end of the tape issuing from the spool (12*b*) in a flat condition and draws it out linearly.

To draw out the tape from spool, as shown in FIGS. 10*a* and 10*b*, the gripper block (14*b*) moves towards the pair of holders (13*d*) and receives the free fore end of the tape that is held in position and presented by the pair of holders (13*d*). At this moment cutter (13*b*) is moved away from the path of the moving gripper (14*b*). After the gripper (14*b*) has held the presented tape's fore end, it is moved towards the direction of arrangement (11) whereby the tape gets drawn out from the spool (12*b*). The gripper (14*b*) is reciprocated through suitable electro-mechanical or pneumatic driving units (14*a*). The tapes are normally drawn out alternately from the two oppositely arranged supply sources, such as spools (12*a*) and (12*b*) by respective grippers to produce the OFT.

For enabling the drawn out tape to be positioned in the path for subsequent handling by the tape laying arrangement to be described next, gripper block (14*b*) and pair of holders (13*d*) are mounted in a manner (not shown) such that they can be raised and lowered through conventional methods, and thereby correspondingly raise and lower the drawn out tape held between them. Accordingly, gripper block (14*b*) and pair of holders (13*d*) occur at a relatively lower level when drawing out the tape from spool and at a relatively higher level after the preferred tape length has been drawn out. This way, the drawn out tape is raised for being caught by the tape laying arrangement (15) to be described next. Alternatively, an arrangement for only shifting/deflecting the drawn tape could be considered to position the tape in the preferred gripping path of arrangement (15).

Figure 11:
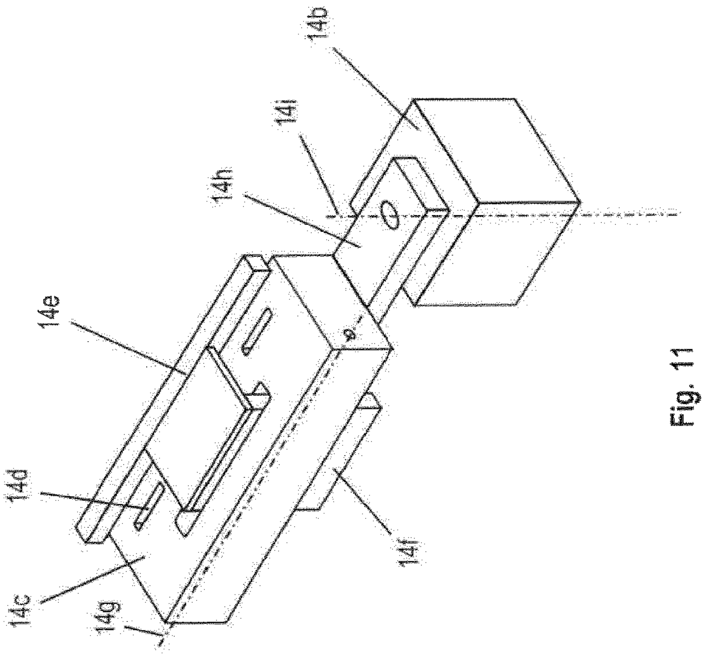
FIG. 11 exemplifies the main components and mounting arrangement of the tape gripper.

In FIG. 11 is exemplified an arrangement for gripping the fore end of the tape in a flat condition. This unit essentially comprises a base member (14*c*) and a clamping member (14*e*), which respectively form the lower and upper lips of the gripper. The base member (14*c*) has suitable provisions, such as slots (14*d*), for positioning and fixing it in the preferred position on plate (14*h*). The upper lip (14*e*), which is pivoted about axis (14*g*) through its leg (14*f*), can be moved to open and close the mouth, in relation with lower lip (14*c*), by suitably moving the leg (14*f*) through a suitable triggering member (not shown) such as available pneumatic, mechanical, electro-mechanical etc. devices at appropriate positions and moments. The entire described gripper assembly is fixed to the driving block (14*b*) in a manner that it can be swiveled about axis (14*i*).

The lower lip (14*c*) and upper lip (14*e*) are long enough to receive a range of tape widths in a flat condition. This way the same gripper can be used for a large range of tape widths. The lips (14*c*) and (14*e*), which form the mouth of the gripper, always hold the tape in a flat condition when drawing out the tapes from the spools (12*a*) and (12*b*). The top surface of lower lip (14*c*) is suitably positioned at a level that enables easy and direct receiving of the free fore end of the tape held and presented by the pair of holders (13*d*) (shown in FIG. 10).

The lips (14*c*) and (14*e*) always close and jointly draw out the tape from the spool in the direction of arrangement (11). This direction of drawing out tape is preferably at 90° relative to the respective supply spool axis. Accordingly, the longitudinal side of each of the linear driving units (14) subtends the same angle in relation to arrangement (11) as the drawn out tapes from the corresponding spools (12*a*) and (12*b*).

Figure 12A:
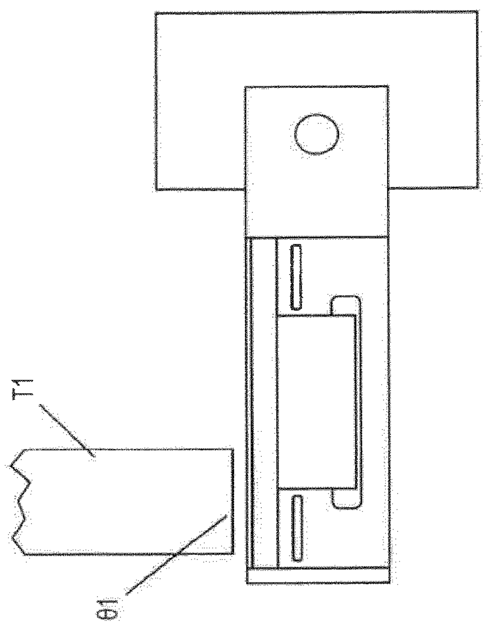
FIGS. 12*a-b* exemplify different styles of fixing the gripper to match the corresponding styles of tape's cut.
Figure 12B:
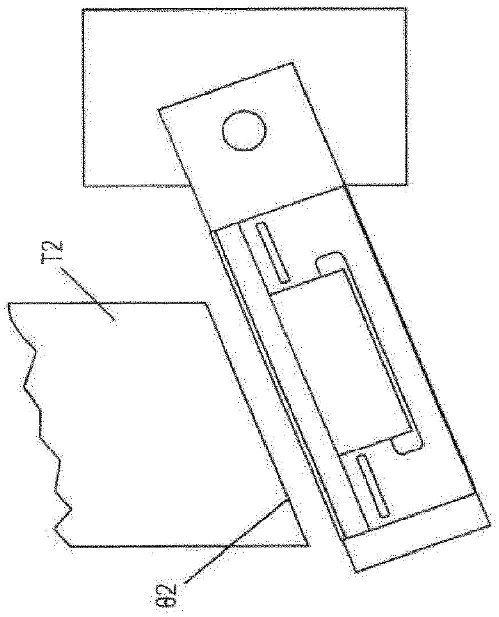

A unique feature of the described gripper is that it can be swiveled into desired position about axis (14*i*) and locked by suitable arrangement (not shown) as illustrated in FIGS. 12*a* and 12*b* (which are the plan views of the device shown in FIG. 11). The possibility of swiveling gripper assembly is advantageous for receiving tapes that are cut either straight (81), as shown in FIG. 12*a*, i.e. the cut angle is 90° to tape length direction, or at an angle (82), as shown in FIG. 12*b*, i.e. the cut angle is other than 90° to tape length direction. Through such an arrangement the cut edge of tape and the fore sides of the gripper base (14*c*) and clamp (14*e*) can be maintained parallel and thereby a complete gripping of the tape's cut side ensured. The FIGS. 12*a* and 12*b* also represent the same gripper's ability to grip different tape widths T1 and T2.

It may be pointed out here that the length of tape drawn out by the described arrangement (14) for producing a given OFT is always longer than the width of the body of the OFT being produced.

5. Arrangements for Laying the Tapes (15)

In FIG. 4 are exemplified the relative positions of the pair of arrangements (15) which are preferred for laying the tapes on arrangement (11) once the preferred length of the tape has been drawn out by the pair of units (14) described above. As shown, each of the two arrangements (15) are identical and are located at either sides of arrangement (11) and they respectively lay the drawn out tapes, preferably alternately, for producing OFT.

Figure 13:
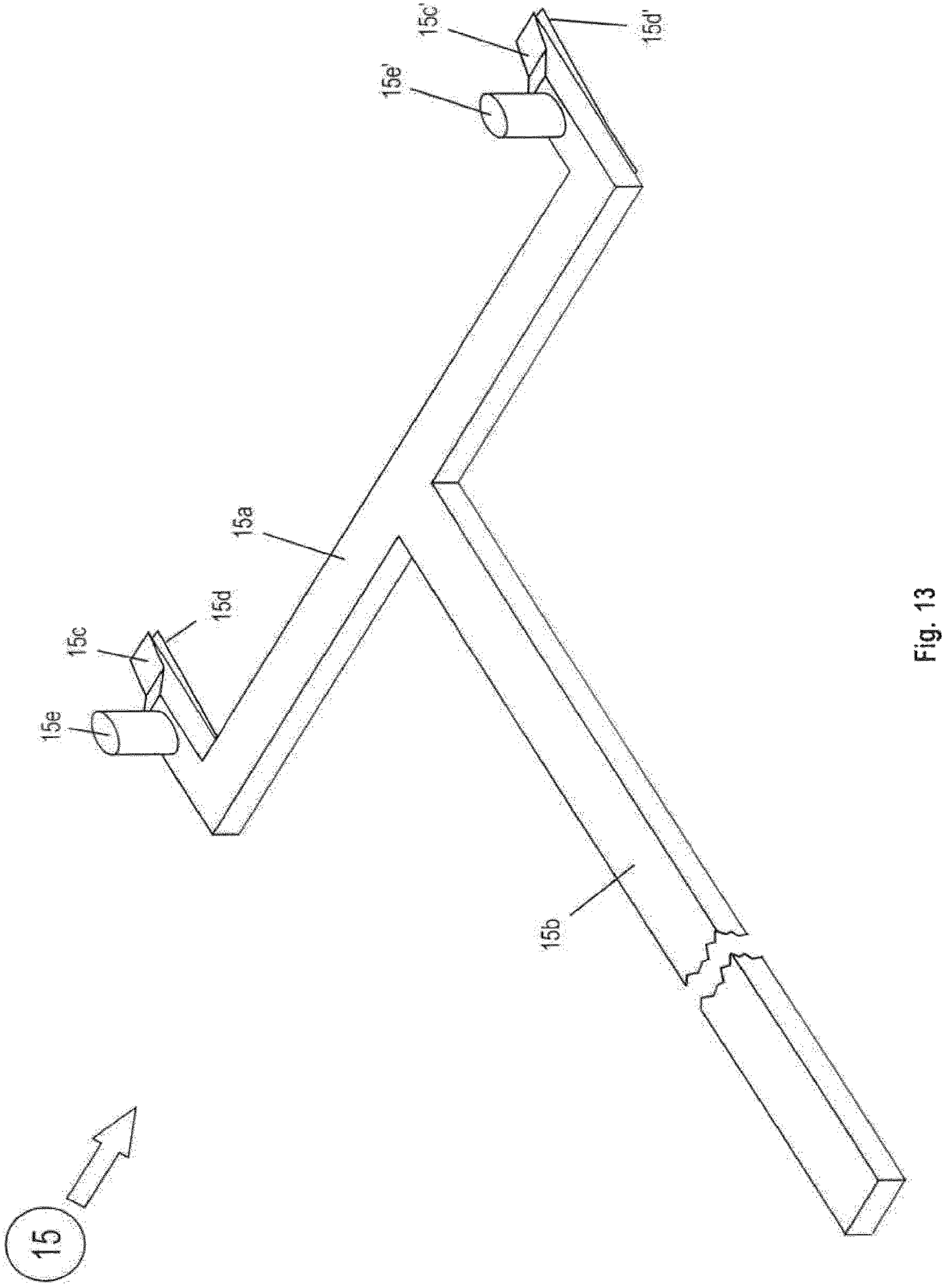
FIG. 13 exemplifies a tape holding and laying unit.

The constructional features of arrangement (15) are shown by way of example in FIG. 13. Its front part is like a fork or yoke (15*a*) with two forward extending fingers (15*c*) and (15*c*'). A stem (15*b*) extends at the back side of the fork (15*a*). Stem (15*b*) is supported and constrained in a sliding fashion (not shown) such that unit (15) can be reciprocated linearly in a guided manner through suitable arrangements. Alternatively, the fork (15*a*) could be directly connected to a linear drive in a suitable manner for its reciprocation. Further, unit (15) is mounted in a manner that it can be swiveled and locked in preferred position (not shown) to match its orientation with the desired angle of tape's incorporation in the OFT. Apart from being able to be oriented, unit (15) is also provided with a suitable arrangement (not shown) to move it to a new position to correspond with different lengths of tapes that might be used depending on their angle of incorporation in the OFT. To hold different lengths of tape for laying on arrangement (11), the fork (15*a*) is preferably of the telescopic type. Should there be a need for producing a textile with stretched tapes, the telescopic yoke can be made to lengthen/expand for stretching the tape, for example by a pneumatic device.

On the underside of fingers (15*c*) and (15*c*") are clamping plates (15*d*) and (15*d*") respectively as shown in FIG. 13. These clamping plates (15*d*) and (15*d*") are linked to actuators (15*e*) and (15*e*") respectively in a suitable manner whereby these plates can be individually drawn either toward (closing position) or away (opening position) from the respective fingers to receive and grip a range of tape widths directly. This action allows gripping the tape in its width direction between the two gripping fingers (15*c*, 15*d*) and (15*c*", 15*d*").

The gripping fingers (15*c*, 15*d*) and (15*c*", 15*d*") grip or catch the tape drawn out by arrangement (14) described in the previous section as follows. Arrangement (15) is retracted such that the tape drawn out by arrangement (14) can be raised without encountering any hindrance, particularly from gripping fingers (15*c*, 15*d*) and (15*c*", 15*d*") and fork (15*a*) of arrangement (15). The tape drawn out by arrangement (14) is raised to a level such that the gripping fingers (15*c*, 15*d*) and (15*c*", 15*d*") can receive the tape in their open mode. Arrangement (15), with its gripping fingers (15*c*, 15*d*) and (15*c*", 15*d*") in open mode, is inched towards the drawn out tape. When the front edge of the tape is in the same vertical plane as the front edges of the gripping fingers (15*c*, 15*d*) and (15*c*", 15*d*"), the clamp plates (15*d*) and (15*d*") are activated by respective units (15*e*) and (15*e*") into close mode. The drawn out tape is thus held between the gripping fingers (15*c*, 15*d*) and (15*c*", 15*d*"). The tape is released from gripper lips (14*c* and 14*e*) by opening them and cut from its supply source after it has been gripped by the gripping fingers (15*c*, 15*d*) and (15*c*", 15*d*") of unit (15).

The tape held by unit (15) is released after being laid adjacently parallel to the previously laid tape by opening fingers (15*c*, 15*d*) and (15*c*", 15*d*"). The release/removal of the tape from fingers (15*c*, 15*d*) and (15*c*", 15*d*") can be assisted, if necessary, by suitably incorporating pressing bars to keep the tape in position by pressing/holding it at a few places when unit (15) is drawn back.

The pair of units (15) is preferably at the same level during their working. Each of these units (15) is oriented in a manner whereby preferably one of the longitudinal edges of the tape held by each of these units (15) faces in the direction of arrangement (11). Each of the units (15) lays the entire length of tapes at once on the bed of arrangement (11). Once the tape is delivered and released by unit (15) on the bed of arrangement (11) for incorporation in the OFT, there is no tension in the tape. Thus, this novel OFT forming method and means does not require the tapes to be unceasingly tensioned as a condition during production of OFT.

It is desirable that yoke (15*a*) and stem (15*b*) are made of relatively lightweight material such as tubes and composite materials. It is also important that the reciprocation of yoke (15*a*) does not cause the tape held in its fingers to vibrate/flutter unduly highly. The length of gripping fingers (15*c*, 15*d*) and (15*c*" and 15*d*") are long enough to receive different widths of tapes directly. An advantage with the use of relatively wider tapes is the corresponding increase in the production rate of OFT.

In an alternative and less preferable method, only one unit (15) could be used in the described manner whereby it is swung alternately between two different positions to grip the individual tapes supplied by the two spools and lay them successively on the bed of arrangement (11) from two corresponding directions. In a still less preferable arrangement, only one unit (15) could be used in the described manner to grip tapes from only one tape supply source such that single unit (15) swings between two different positions alternately to lay the tape on arrangement (11) from two corresponding directions. However, both these methods are considered inefficient and complex and therefore undesirable.

6. Arrangement for Displacing Fore Ends of the Laid Tapes (16)

In FIG. 4 are shown the relative positions of a pair of arrangements (16) for displacing the fore ends of the laid tapes in their thickness direction. Each of the two arrangements (16) is located at the two longitudinal sides of arrangement (11) as indicated earlier in reference to FIG. 5*a*. This pair of arrangement (16) is preferred for displacing the fore ends of select tapes that are laid on the bed of arrangement (11) for producing the OFT. The pair of arrangements (16) are identical in their workings and displace the fore ends of select laid tapes in the tape's thickness direction to create a front-face opening. The arrangements (16*m*) shown in FIGS. 14*a* to 14*c*, and (16*n*) shown in FIGS. 14*d* to 14*f*, respectively, are two examples of the means for displacing the fore ends of tapes. Other possibilities will be listed later on.

Figure 14A:
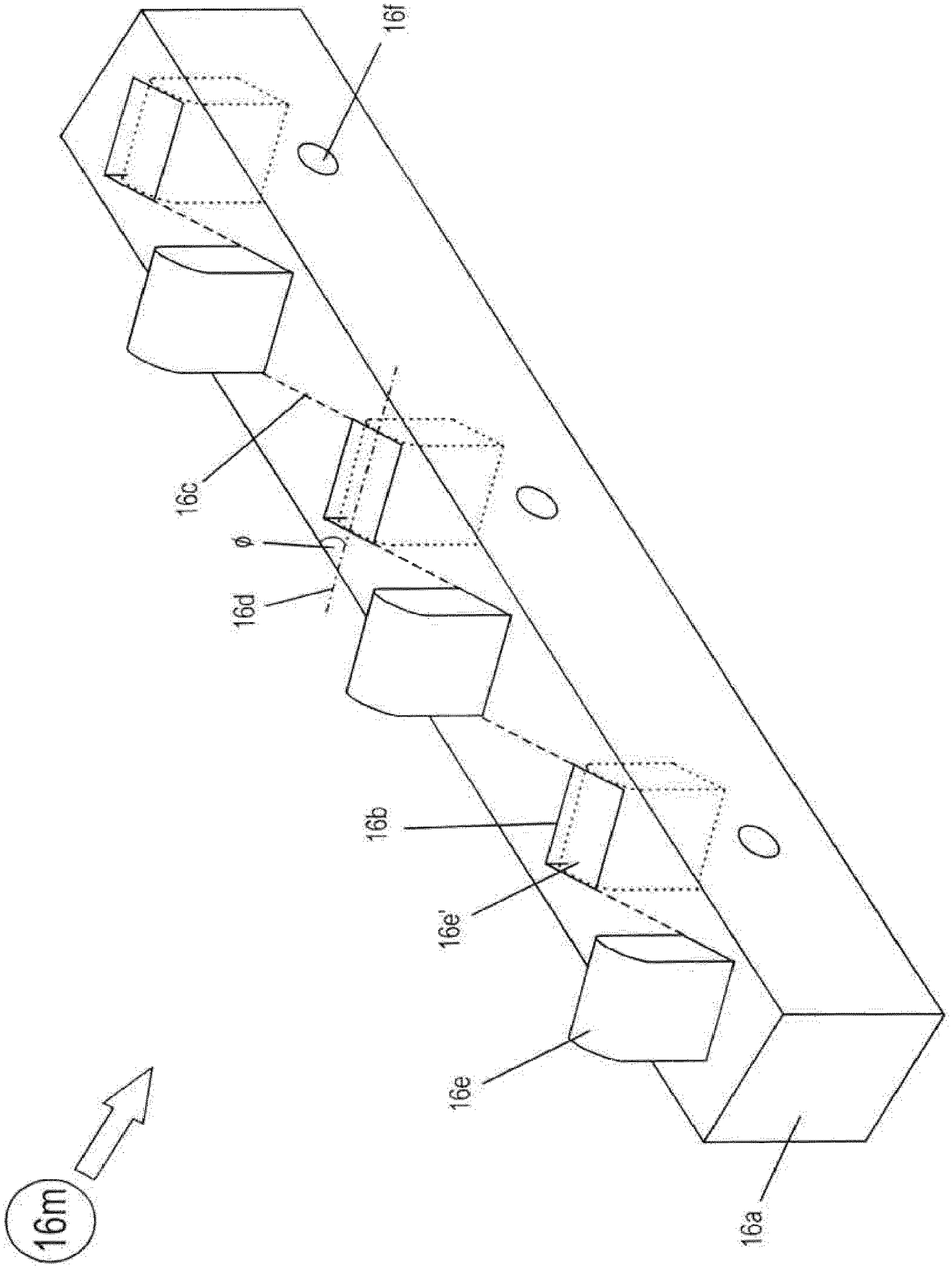
FIGS. 14*a-f* exemplify relevant details of different arrangements for displacing the fore ends of the laid tapes.

As shown in FIG. 14*a*, arrangement (16*m*) comprises a housing (16*a*) which has a plurality of slots (16*b*). The surface of housing (16*a*) is preferably smooth and plane so that fibres can slide over it without getting hooked/caught by, for example, uneven edges. If required the surface of housing (16*a*) can be coated with a low friction material such as PTFE. The slots (16*b*) are arranged in series and in a manner that the opposite sides of two adjacent slots occur in a line (16*c*). Further, the axis (16*d*) of each of the slots (16*b*) is at an angle $\phi$ relative to the longitudinal side of housing (16*a*) and this angle corresponds with the angle of facing tape's width direction.

Each of the slots (16*b*) contains a block (16*e*), preferably having curved top. Blocks (16*e*) preferably have a sliding fit with the respective slots (16*b*). The width of blocks (16*e*) is preferably lesser than the width of the tapes to be processed. These blocks are preferably smooth and coated with a low friction material such as PTFE. The function of these blocks (16*e*) is to displace the fore ends of the tapes resting over it in the direction of tape's thickness. Each of these blocks (16*e*) can be reciprocated, either independently or collectively in suitable groups according to the structural pattern to be created in OFT, by available mechanical or pneumatical or electromechanical devices. The top side of blocks (16*e*) can be completely drawn inside slot (16*b*) such that its top surface and the surface of housing (16*a*) are level as depicted by block (16*e*") in FIG. 14*a*. Housing (16*a*) has suitable provisions, such as holes (16*f*), for attaching it to arrangement (11) through suitable provisions (11*e*) shown in FIG. 5*a*.

In an alternative construction, the blocks (16*e*), instead of being in one piece, could be made by joining suitable plates so that the width of block can be varied as desired, within a range, by adding or taking away required plates. Suitable round-ended fingers/pins/bars/plates could be also used in place of blocks—e.g. when processing relatively narrow tapes. Alternatively a hinged lid-like arrangement could be provided at the top side of the housing. When flipped open, it would displace the fore end of tape and when pressed closed, it would be level with the housing's surface providing a plane surface to enable the fore ends of tapes to slide over.

Figure 14B:
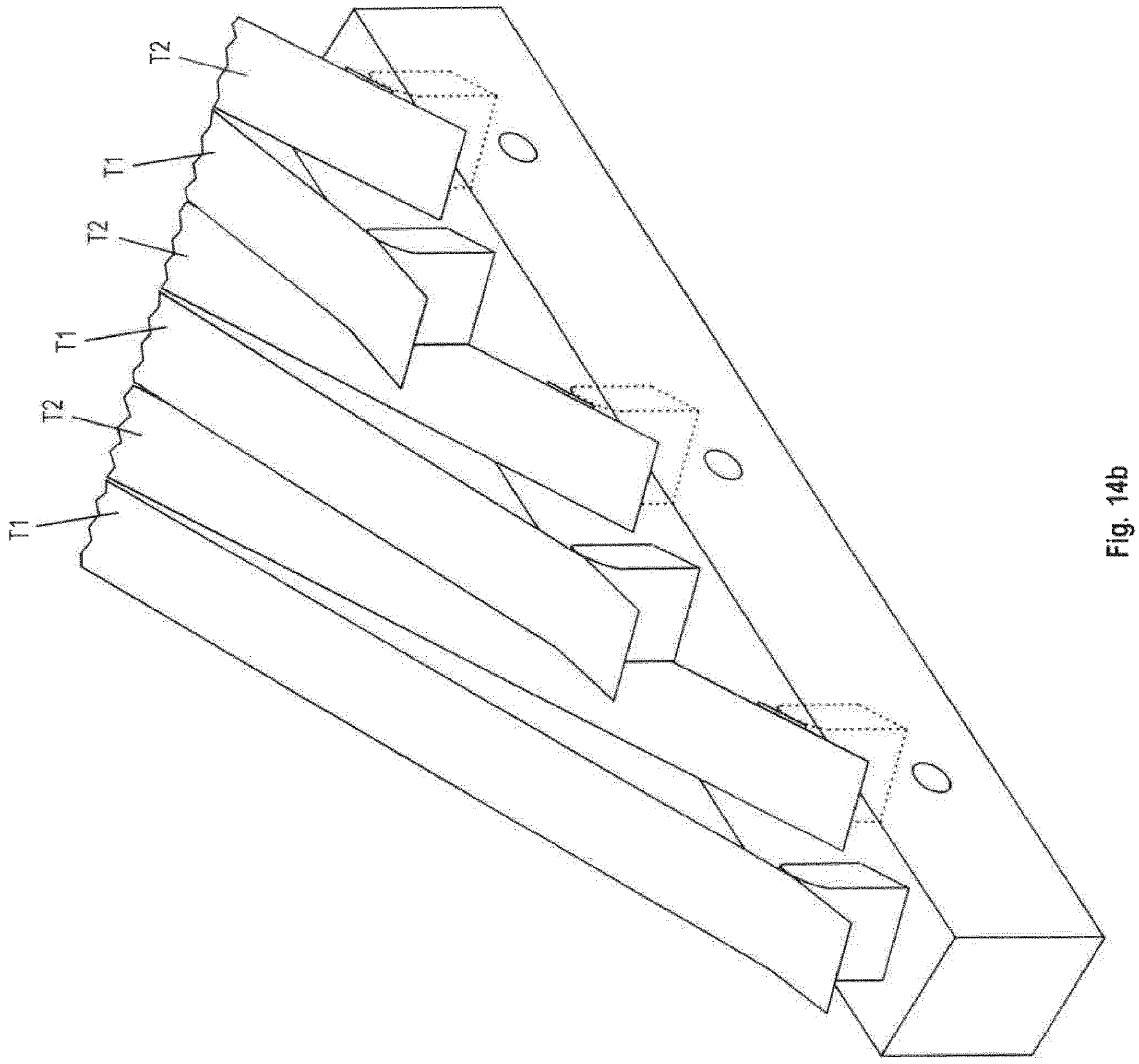

The top side of block (16*e*) is preferably curved so that at least a minimum contact, such as tangential, is achieved when the fore ends of tapes (T1) are displaced by it in tape's thickness direction as shown in FIG. 14*b*. Alternatively, a flat plate/block could be also used to displace the fore ends of the tapes resting over it in the direction of tape's thickness. When top of blocks (16*e*) occur at the surface of housing (16*a*), the corresponding fore ends of the tapes (T2) occur relatively below the fore ends of the upwardly displaced tapes (T1). As a consequence of selective displacement of the fore ends of tapes (T1) relative to remaining fore ends of tapes (T2) that are not displaced, it becomes possible to create a front-face opening to gain entry for laying tape easily and directly on arrangement (11) by using arrangement (15) for producing OFT. Displacement of fore ends of tapes in the said manner enables to move the tape being laid in its lateral direction (i.e. the direction of its width). This is unlike weft insertion associated with weaving wherein the weft always moves in its axial or length direction.

It may also be pointed out here that it is sufficient to raise only every alternate block (16*e*) shown in FIG. 14*b* to displace the alternate fore ends of tapes. This is because as the OFT is advanced forward, the fore end of tape will also advance to the next block which can be raised again to displace the fore end of the new tape.

Figure 14C:
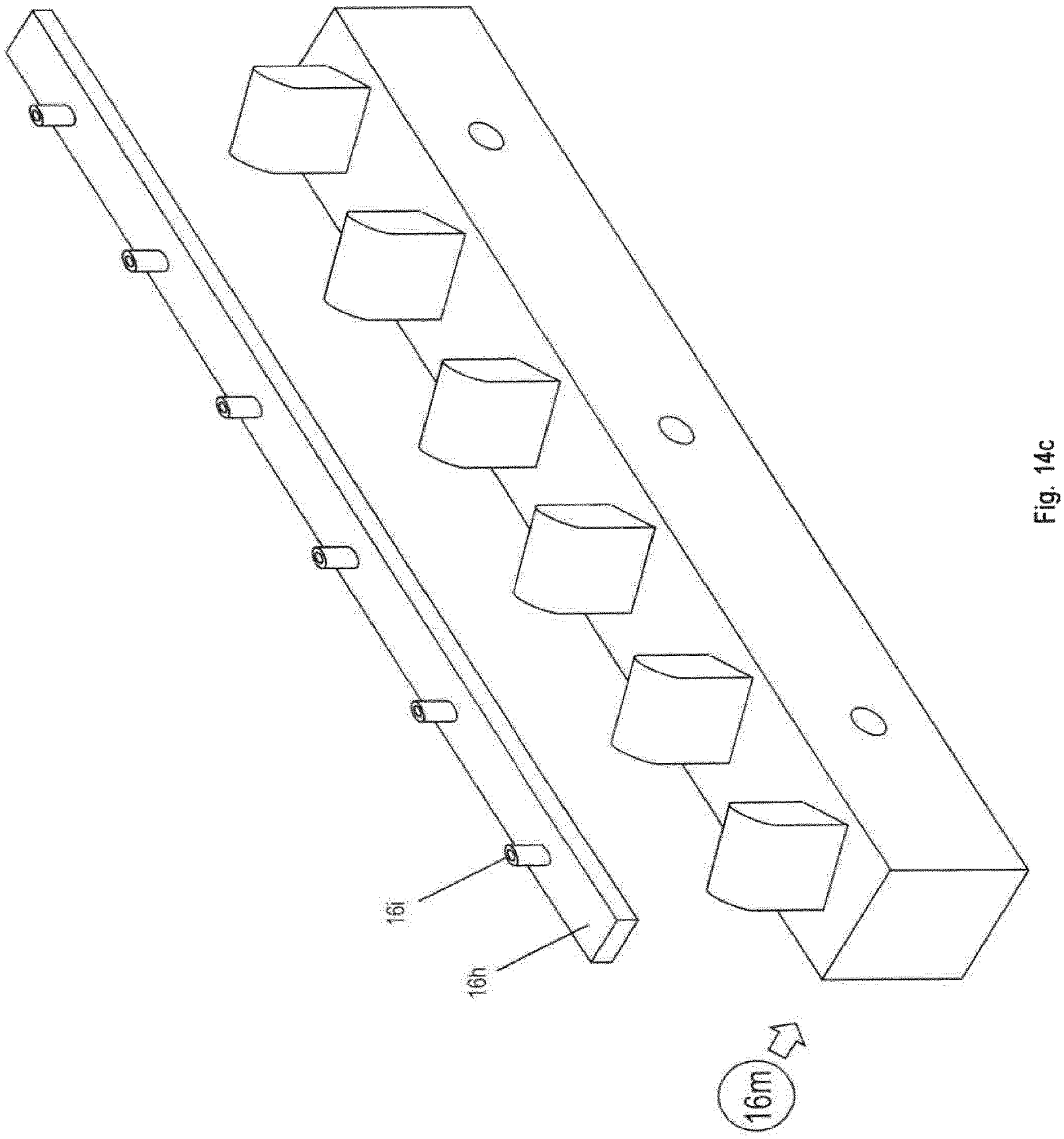

Relatively stiff tapes of most types and materials can be processed satisfactorily by the described action of blocks (16*e*). However, when processing certain types of tapes, such as flexible, flimsy and fragile/delicate, it is possible that the displaced tapes could get dislodged from the respective blocks, especially when the new tape is entered in the created front-face opening, and thereby cause difficulties in OFT production. This problem is overcome, for example, by incorporating a suction unit (16*h*) that is placed over unit (16*m*) as shown in FIG. 14*c*. Suction unit (16*h*) maintains the fore ends of tapes in raised position after the blocks (16*e*) are drawn back into their slots (16*b*). The blocks (16*e*) thus serve to feed the fore ends of the tapes to the suction unit (16*h*). The suction unit (16*h*) and fore end displacing unit (16*m*) together preferably constitute the preferred arrangement (16). The suction action, which can be automatically turned on and off as required, is enabled by connecting unit (16*h*) to a suitable negative air pressure source (not shown) through nipples (16*i*), which function either individually or in suitable groups.

The suction unit (16*h*) is preferably positioned a little over and near the vicinity of the fully projecting blocks (16*e*). The suction pressure can be just sufficient to hold the fore end of the tape which is any way lying on the bed of arrangement (11). When the fore ends of tapes are displaced in the tape's thickness direction by activating desired blocks (16*e*), the raised fore ends of tapes get attracted to suction unit (16*h*) and can be held temporarily in that position. The projecting blocks are subsequently drawn into its housing (16*a*) to create a full front-face opening and the new tape can be entered into this opening as described earlier. Once the to-be-laid tape has gained entry in the front-face opening, and preferably before the tape is laid adjacently parallel to the previously laid tape, the suction unit (16*h*) is preferably lowered through suitable arrangement (not shown) and preferably presses the fore ends of the held tapes over drawn-in blocks (16*e*) while the negative air pressure is cut off to let the fore-ends of the tapes become free. By this method dislodgment of the displaced tapes can be prevented and thereby ensure satisfactory production of OFT. Alternatively, individual suction units could be directly used to lift up and lower down the fore ends of tapes without involving the use of blocks (16*e*).

Figure 14D:
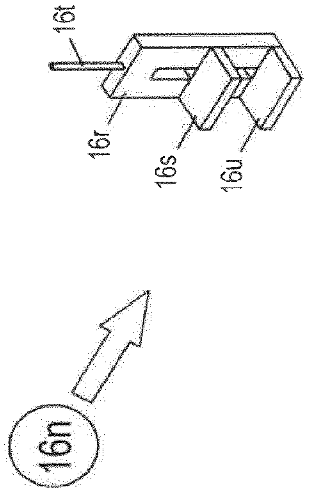
Figure 14E:
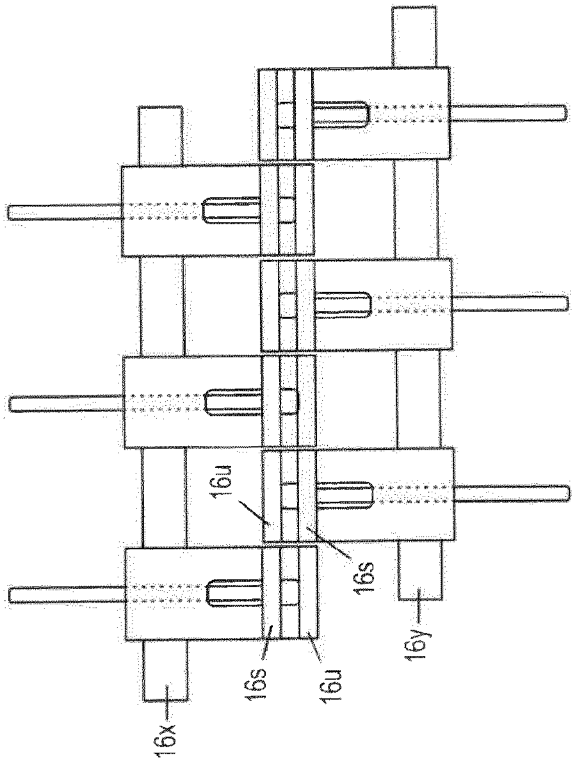
Figure 14F:
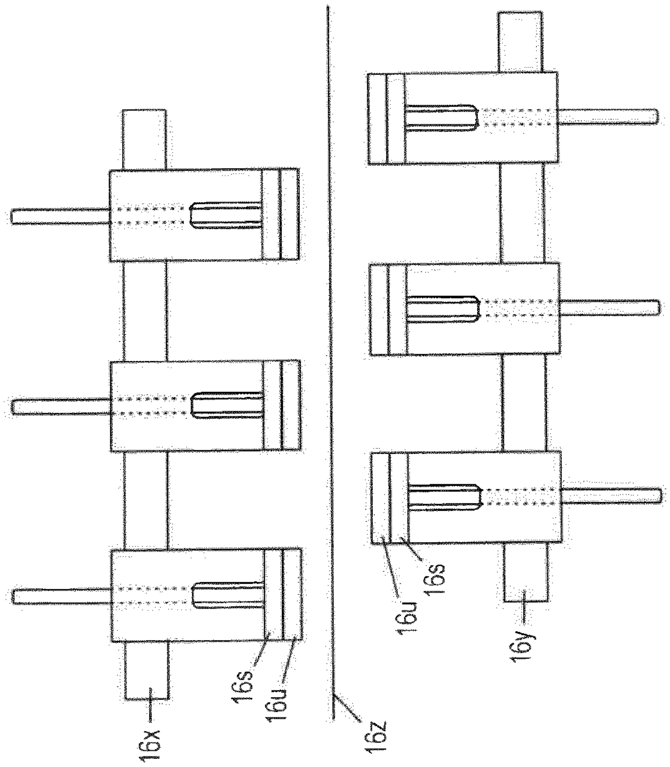

Yet another fore end displacing arrangement is shown by way of example in FIGS. 14*d* to 14*f*. In this arrangement, a plurality of clamps (16*n*) is used for displacing the fore ends of tapes. Essentially each clamp comprises a body (16*r*) to support the fixed clamping jaw (16*u*), the movable clamping jaw (16*s*) and a connector (16*t*) to move the jaw (16*s*). The connector (16*t*) is controlled by a suitable actuator (not shown). A series of clamps (16*n*) are fixed to supporting arms (16*x*) and (16*y*), as shown in FIG. 14*e*. The clamps fixed to arm (16*y*) are inverted in relation to those fixed to arm (16*x*). The distribution of all these clamps can be preferably relatively alternating and uniform as shown in FIG. 14*e*. In the setup shown, while the lower arm (16*y*) is fixed to the longitudinal side of arrangement (11) (not shown in FIGS. 14*e* and 14*f*) and remains stationary, the upper arm (16*x*) can be moved up and down, either linearly or angularly about a pivot. Preferably the width of clamp (16*n*) is less than the width of the tape being processed.

The fore ends of the tapes (not shown in FIGS. 14*e* and 14*f*) are supported by the alternating clamp jaws (16*s*) and (16*u*) which are arranged to be in one plane in their open position, as can be inferred from FIG. 14*e*. The uniform one plane provided by the jaws (16*s* and 16*u*) enables the fore ends of the tapes to slide unhindered from one clamp to the next (when OFT is advanced forward) and also to get them clamped between the jaws (16*s* and 16*u*). When all the tapes are individually clamped by respective clamps (16*n*), the upper arm (16*x*) is moved upwards as shown in FIG. 14*f*, whereby the fore ends of tapes clamped to the respective clamps are correspondingly moved upwards in their thickness direction. In relation to the fore ends of the tapes that are clamped to the respective clamps fixed to the stationary lower arm (16*y*), the upwardly moved fore ends create a front-face opening that can receive tape (16*z*) as can be inferred from FIG. 14*f*.

Alternatively, the fore ends of the tapes could be downwardly displaced in relation to adjacent tapes by suitably modifying the indicated constructions (16*m*) and (16*n*).

In any case, as the produced OFT gets advanced forward for winding into a roll, the free fore ends of the tapes will also correspondingly advance forward and change positions relative to blocks (16*e*)/clamps (16*n*). Arrangement (16) thus uniquely allows the fore ends of tapes to change positions relative to its constituent blocks/clamps. Apparently, no free fore end of any tape will ever get displaced by the same block (16*e*)/clamp (16*n*). Thus, each displacement of the fore end of a tape is done by a different block/clamp which is uniquely technically and characteristically unlike the shedding operation of the weaving process wherein the same warp is controlled all the way by the same heald.

As can be understood now, the described operation for displacing the fore ends of the laid tapes to create front-face opening does not create any shed, as in weaving, that can be defined by a closed geometrical figure such as rhombus and triangle.

A person skilled in the art can understand now that other methods such as mechanical gripping, pinching, clipping, clamping, hooking, magnetic action, chemical adhesion, pneumatic blowing, vacuum gripping, electrical repellency, magnetic repellency etc. are possible to employ, either singly or in suitable combination, for achieving the preferred displacement of the individual fore ends of the tapes in their thickness direction and for maintaining the fore ends of the tapes in the displaced positions. The method to be employed for either displacing or maintaining the fore ends of the tapes will depend on the needs and type of tape material to be processed. In any case, the fore ends of the displaced and not-displaced tapes will be held in a firm manner such that the tape being laid between them will not cause their pulling and dislodging from the occupied positions. Such functional reliability will ensure trouble-free operations for producing OFT.

It will be obvious to a person skilled in the art that to achieve relatively higher OFT production speed it is important to keep the displacement of the fore ends of the tapes as small as practically possible because smaller displacements take correspondingly lesser time. The displacement of the fore ends of the tapes could be just small enough to clearly receive the thickness of the tape to be laid as there is no gripper that needs to be passed through the front-face opening (as happens in weaving). Given that SFT and HDPT tapes are rather thin, the fore ends would be preferred to be displaced by a correspondingly very small distance. This process thus provides the unique possibility wherein the free fore ends of tapes need to be displaced by only a relatively small distance whereby the tapes are not subjected to any tensioning as happens in weaving process when the warps are shed. Also, because the displaced fore ends of the tapes can be reverted to their original positions immediately after the new to-be-laid tape has entered a little distance in the front-face opening, the total operation times can be substantially reduced. Because the created opening is unlike a shed in the weaving process, the fore ends need not be kept in raised position until the new tape is laid adjacently close to the previous tape on bed of arrangement (11).

Blocks (16*e*)/clamps (16*n*), as also any other device that might be employed, can be activated in either a regular sequence or a random sequence through a suitable programme to selectively displace the fore ends of the tapes to create the desired corresponding primary structural integrity/stability pattern in OFT. Obviously such a possibility allows to uniquely create different primary structural integrity/stability patterns with the tapes drawn from the left and right side spools. Thus the primary structural integrity/stability pattern on left half of OFT can be entirely different from that on the right half side.

It will be amply clear now that arrangement (16) and its working is technically unlike the shedding arrangement and operation associated with the weaving process.

7. Arrangements for Consolidating Produced Material (17)

In FIG. 4 is shown the relative position of a pair of arrangements (17), which is located over arrangement (11). This arrangement (17), shown by way of example, is preferred for consolidating the intersecting and overlapping tapes laid on bed of arrangement (11) when producing OFT according to this invention. The consolidation action is preferred to this process because the created primary structural integrity/stability of OFT is weak in its longitudinal and lateral directions because of absence of fibrous materials oriented in its length and width directions. Such a consolidation step is preferred to impart interconnection between over-lapping tapes and provide the secondary structural integrity/stability to OFT to resist formation of opening/gaps in subsequent handling/processing operations. Preferably the interconnections are in the forms of connecting points and connecting areas. The OFT's consolidation is achieved by units (17*a*) and (17*b*) shown in FIGS. 15*a* and *b*. It is preferable that the consolidation is performed at least in a middle part of the produced OFT as that part initially develops openings/gaps.

The pair of units (17*a*) and (17*b*), which are identical in working, are described in reference to FIG. 15. The construction described in FIGS. 15*a* and 15*b* is by way of example. Units (17*a*) and (17*b*) are incorporated preferably in a 'V' configuration. The angle between them matches with the angle of the tapes incorporated in OFT. It is preferable to have arrangement (17) in a split construction as shown, instead of a single piece construction. This is because the split construction enables the same parts to be used as their relative angles can be easily altered to correspond with the angles of tape's incorporation in OFT.

Figure 15B:
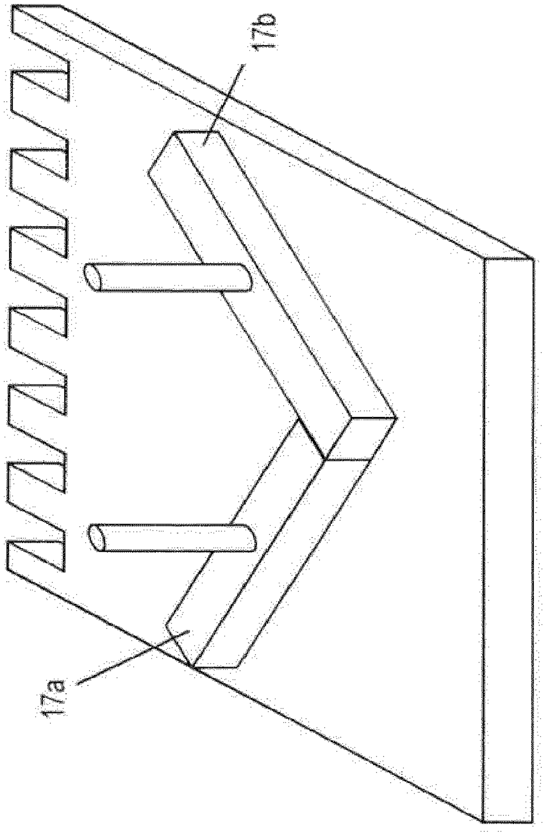
FIGS. 15*a-k* exemplify an arrangement for consolidating the produced OFT and some examples of directionally oriented consolidations.
Figure 15A:
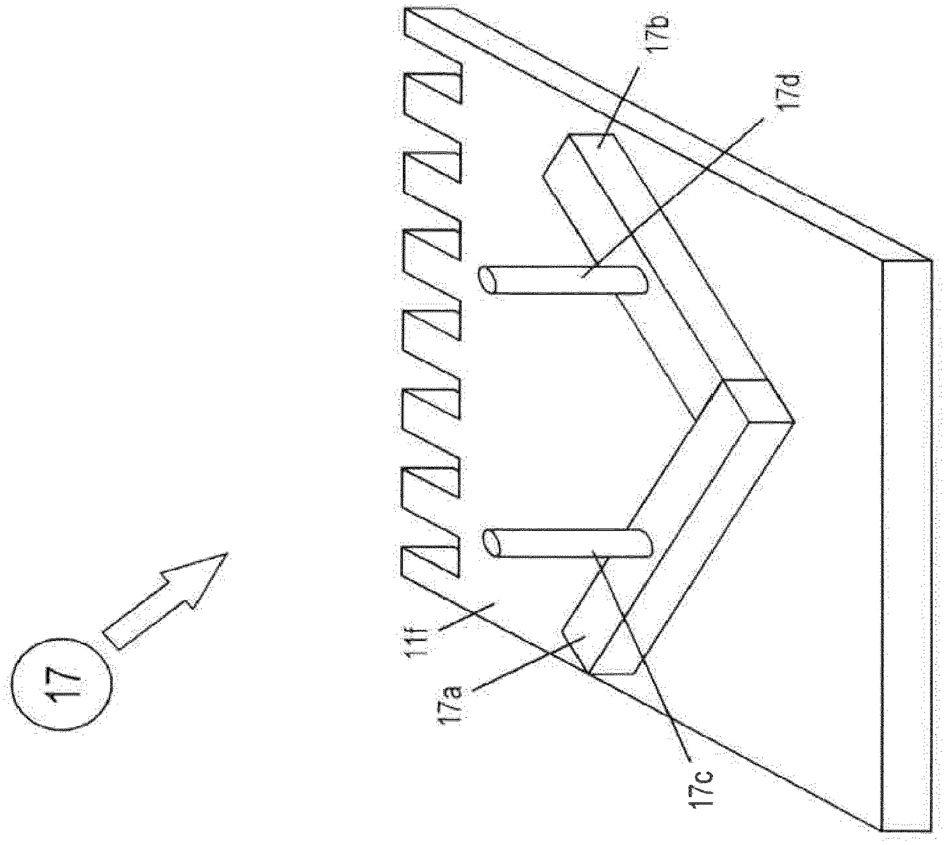

Each of the units (17*a*) and (17*b*) is essentially modular in construction (not shown) comprising smaller individual units though it is shown in FIGS. 15*a* and 15*b* to be a collective whole. These bar-like units (17*a*) and (17*b*) preferably alternately press the respective just-laid tape in the produced OFT on bed (11*a*). Preferably the width of the bar-like units (17*a*) and (17*b*) is not greater than the width of the tape being processed. Units (17*a*) and (17*b*) have stems (17*c*) and (17*d*), which are connected by suitable arrangements (not shown) to their respective actuators. The entire arrangement is finally connected to the mainframe of arrangement (11). Through such a construction, units (17*a*) and (17*b*) always maintain a constant positional relationship with bed (11*a*).

Further, units (17*a*) and (17*b*) are preferably constructed to incorporate either heating/welding elements (e.g. thermal, infra-red and ultrasonic) or needling elements (e.g. hooked and barbed wire) or fibre entangling elements (e.g. nozzles for pressurized gas and liquid) or glue/adhesive applying elements or fluid spraying elements or vibratory elements etc. Such elements are incorporated individually and in a manner that their orientation can be easily rearranged according to needs. Through use of one or more of these elements, the intersecting and overlapping tapes are additionally connected and thereby the produced OFT imparted the secondary structural integrity/stability, at least in a middle part, and effectively consolidated in its thickness direction and rendered structurally sound for subsequent handling. The choice of element to be employed in units (17*a*) and (17*b*) to achieve cohesiveness/interconnection between the laid intersecting and overlapping tapes will depend on the type of tape material being processed and the end application needs. The consolidation units (17) thus preferably provide at least one of mechanical, chemical, thermal etc. type of secondary structural stability/integrity to OFT.

The described consolidation of OFT is preferably directionally oriented so that the fibres/fibrils are subjected to the least possible disruption while maximum secondary structural integrity/stability is achieved in the preferred direction/s. Directionally oriented consolidation is achieved by incorporating in units (17*a* and 17*b*) the preferred elements (heating, welding, needling, entangling, glue/adhesive applying, spraying, vibratory etc.) in desired orientation/s. Through such a directionally oriented consolidation procedure, the areas of interconnection between over-lapping tapes can vary from relatively small areas of overlapping tapes (such as a point) to large (such as entire overlapping area).

The connection points or connection areas are preferably directionally oriented in one or several straight connection lines. Preferably each straight connection line comprises a plurality of connection points or connection areas. Preferably, the connection points or connection areas extends at least in the length direction of the fabric although their extension in different directions and in directions parallel to the laid tapes of the two oblique directions of tapes can be will be beneficial. Preferably, the connection areas can vary from one or several points to interconnecting entire area of the overlapping tapes.

Such interconnection is thus correspondingly oriented in the desired direction/s (e.g. relative to OFT's length direction) and can be of either uni-linear or bi-linear or multiple direction types. Knowing what subsequent process OFT would be subjected to, the consolidation can be performed in suitable directional orientation/s that is aligned in the direction/s of the expected forces of that process. If a high resistance is required to prevent the OFT from developing openings/gaps then entire overlapping areas can be interconnected such as by bonding. Through such secondary structural integrity/stability, in addition to the primary structural integrity/stability, sufficient strength is realized in OFT to withstand the normal handling/processing. As a result there is improved resistance to development of openings/gaps and at the same time the mechanical properties of tapes constituting OFT, and that of OFT itself, is not diminished.

Further, depending on the type of consolidation to be performed (e.g. needling and entangling), suitable recesses or cavities can be provided on arrangement (11) in appropriate forms and places to match with those on the underside of units (17*a*) and (17*b*) to enable needles, fluid jets etc. perform properly. Because the working of units (17*a*) and (17*b*) and arrangement (11) have a constant relative position relationship, the preferred recesses and cavities can be machined on different plates which can be interchanged and fixed at the predetermined positions on arrangement (11) as and when required.

The construction of each of the units (17*a*) and (17*b*) can be preferably modular so that the same units can be rearranged and rendered useful to process tapes of different widths directly. Further, units (17*a*) and (17*b*) be preferably coated with a suitable material, e.g. with non-sticky and low friction material such as PTFE. Units (17*a*) and (17*b*) could be also provided with suitable shoes that can be easily taken off for cleaning, changing settings etc. These shoes can be also suitably spring loaded to ensure proper contact with the tapes under it. Further, the sole of these shoes could be of either hard or soft types and either plain or suitably designed for creating a pattern or logo through pressure impression, heat embossing etc.

After a tape has been laid to form OFT on arrangement (11), the respective unit (e.g. 17*a*) is activated on the section of the just-produced OFT to consolidate the laid tape and the tapes with which it associates by interconnecting at least some of their overlapping areas. The next tape from the other direction is laid on arrangement (11) to form OFT and the other unit (17*b*) is then activated on the section of the just-produced OFT to consolidate the newly associated tapes as described before. Alternatively, tapes from two directions can be laid to form OFT on arrangement (11) one after another and then units (17*a*) and (17*b*) can be simultaneously activated on the produced OFT to consolidate them for imparting secondary structural integrity/stability. Likewise, units (17*a*) and (17*b*) can be moved away from the produced OFT after performing consolidation procedure either one after another or simultaneously.

As can be observed, through the described consolidation process the produced OFT has its constituent tapes uniquely interconnected, and preferably only at the desired overlapping areas of the tapes, in the produced OFT's thickness direction and thereby imparted a certain additional structural integrity/stability or cohesiveness, in addition to the primary structural integrity/stability. As a consequence, there is certain material flow in the thickness direction of the tapes. For example, if tapes of fibrous materials are used and the needling consolidation arrangement is employed, then some fibres would flow between the upper and lower tapes' thickness directions wherever the consolidation is performed. Similarly, if spot gluing/adhesion is performed then there will be flow of glue/adhesive in the thickness direction of the OFT. Such flow of material (fibres, glue, adhesive etc.) will provide certain secondary interconnectivity/cohesiveness in the tapes' thickness direction and thereby render OFT additionally structurally stable/integrated for subsequent processing and handling needs. Flow of material also happens when interconnectivity between tapes is achieved, e.g. when tapes of either a polymeric material or fibrous tapes comprising polymeric and non-polymeric materials are used such that they can be consolidated thermally by fusing. In this case there will be a flow of some molten polymeric material in thickness direction which will fuse the upper and lower tapes together wherever thermal consolidation is performed. Likewise, if an adhesive is used for consolidation then, for example, connectivity between the surfaces of contacting tapes can be achieved in the thickness direction of the tapes through adherence. Likewise, if an adhesive bearing tape is used then the adhesive can be activated by pressure (or heat/water etc. if so required) to help bond the upper and lower laid tapes in the their thickness direction and thereby impart secondary structural stability/integrity to OFT. Such adhesive can be also activated partly for consolidation and partly later for adhering the OFT to other surface/s.

The consolidation of OFT described above is preferably performed at places where needed and not necessarily all over OFT. For example, it might be sufficient to perform consolidation only in a middle part of OFT, or in a certain patterned way. Depending on the end use or application of OFT it might be preferable to consolidate at the OFT edges as well. Further, the degree of consolidation can be also performed according to needs. For example, the needling area and the welding area can be relatively small and large. The consolidation can be also directionally oriented to impart consolidation in expected direction of force.

Figure 15C:
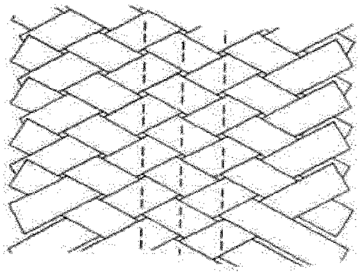
Figure 15D:
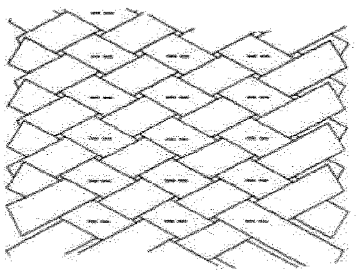
Figure 15E:
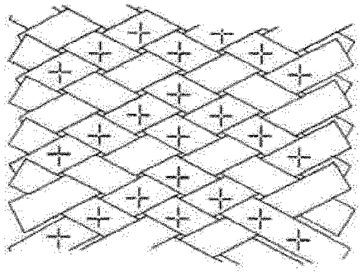
Figure 15F:
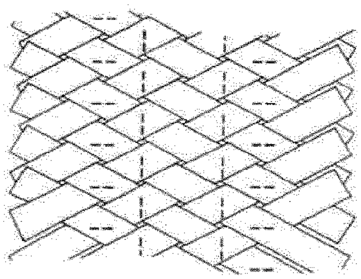
Figure 15G:
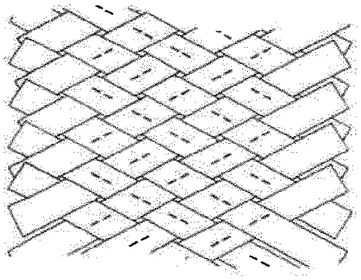
Figure 15H:
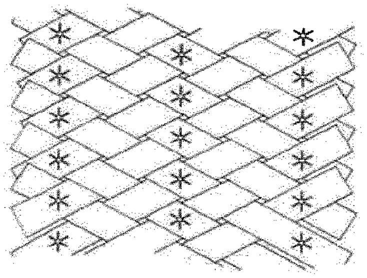
Figure 15I:
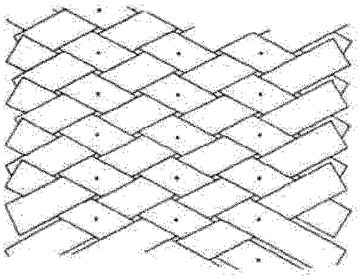
Figure 15J:
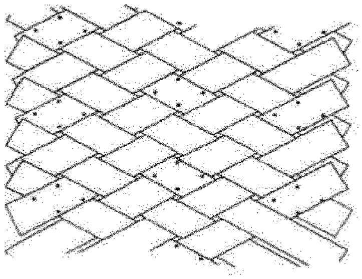
Figure 15K:
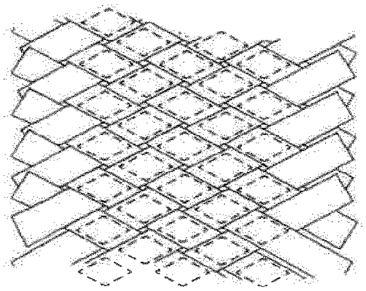

Accordingly, in FIGS. 15*c* to 15*k* are shown some examples of different forms of directionally oriented secondary structural integrity/stability achievable through the described consolidation units (17). FIGS. 15*c* and 15*d* respectively show linear consolidation oriented in longitudinal and lateral directions of the OFT and such structural integrity/stability is performed at some tape overlapping regions/areas in a middle part of OFT. FIG. 15*e* shows bi-linear consolidation performed jointly in both orientations and at desired regions. FIGS. 15*f* and 15*g* show combination of longitudinal and lateral linear consolidations in two orientations in different styles. FIG. 15*h* shows multiple direction consolidation at desired places of OFT. FIGS. 15*i* and 15*j* respectively show single and multiple spot consolidations at select regions of OFT. FIG. 15*k* represents another multiple direction type of consolidated OFT wherein large overlapping areas are interconnected, such as possible by adhesive bonding.

As can be inferred, the described consolidation process accords secondary structural stability/integrity, and preferably only at the desired overlapping areas of the tapes, to OFT equally in its length and width directions and imparts additional strength to OFT for resisting formation of openings/gaps when processing and handling it. Through the described consolidation procedure inclusion of extra longitudinal yarns in OFT is rendered unnecessary. Thereby, the attending drawbacks of incorporating extra yarns, such as uneven fibre distribution in OFT and uneven thickness of OFT described earlier, is eliminated. A bias fabric having secondary structural stability/integrity, through the described consolidation procedures, has previously not been known.

8. Arrangement for Advancing Forward Produced Material (18)

Because the produced OFT has no fibrous materials (yarns/filaments) that are incorporated in the orientation of the fabric-length direction, the produced OFT cannot be pulled in the fabric-length and width directions without causing its deformation or damage. Therefore, it becomes preferred to feed OFT in a tensionless manner and advance it positively forward for winding it into a roll for subsequent handling and transportation.

Figure 16A:
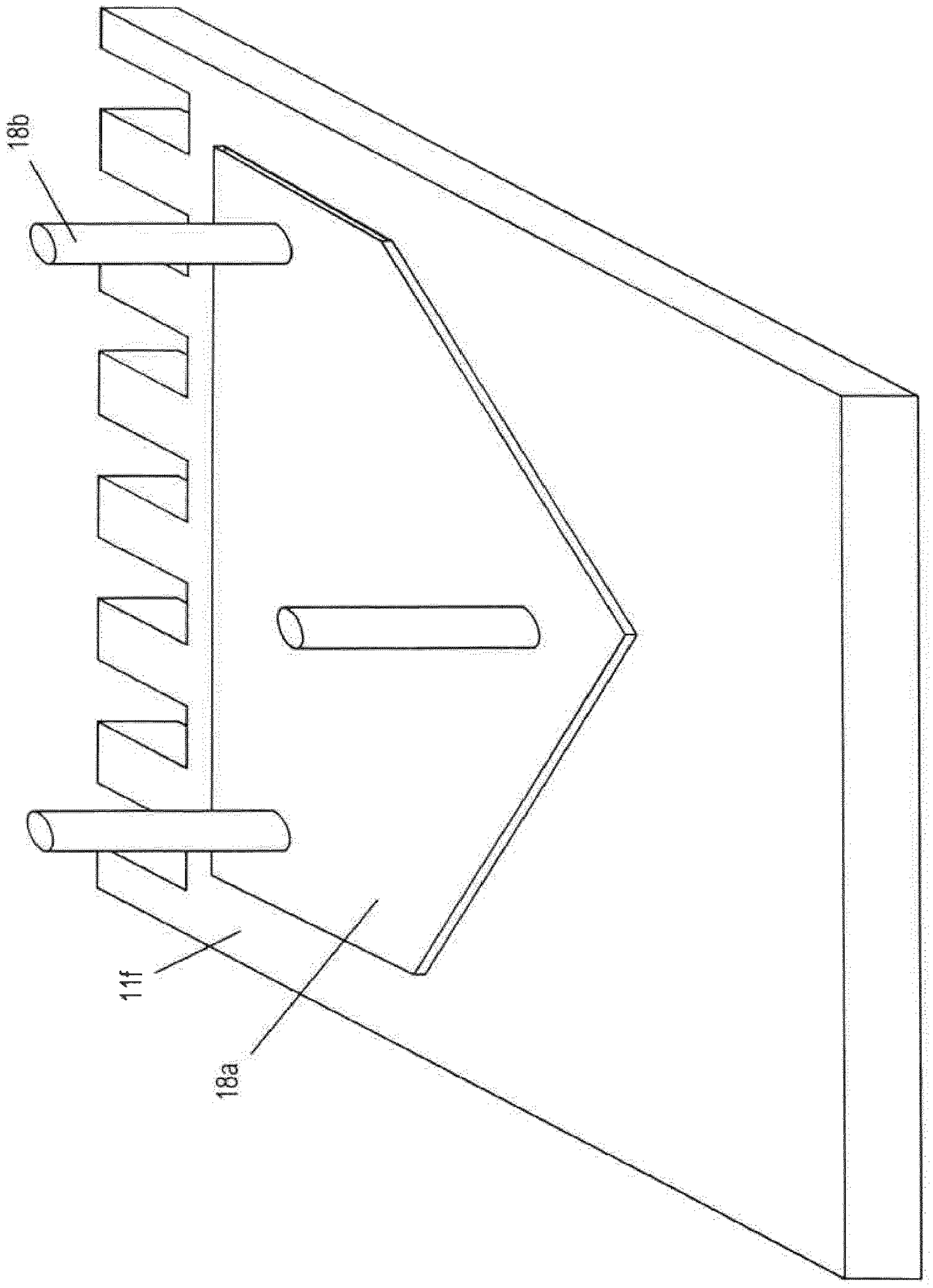
FIGS. 16*a-b* exemplify an arrangement for aiding the advancement of OFT for taking-up.
Figure 16B:
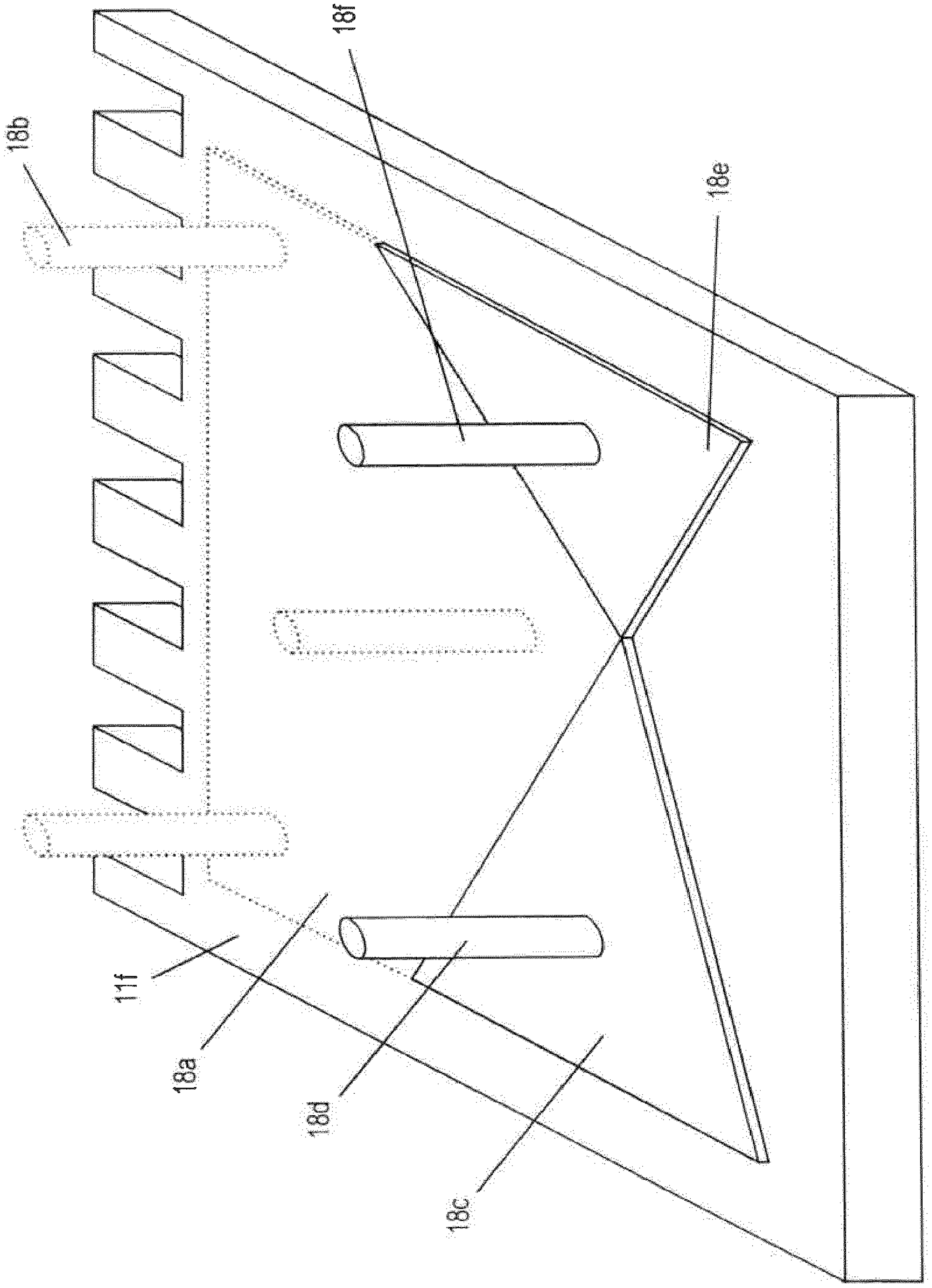

In FIG. 4 is shown the relative position of arrangement (18), which is located over arrangement (11). This arrangement (18), shown in FIGS. 16*a* and 16*b* by way of example, is preferred for aiding the forward advancement of OFT in conjunction with arrangement (11) (shown in FIGS. 5*a*-*b*). Arrangement (18) is essentially composed of three elements; the first element (18*a*) is shown in FIG. 16*a*, and the other two (18*c*) and (18*e*) are shown in FIG. 16*b*. Advancing of OFT is achieved jointly by these elements (18*a*, 18*c* and 18*e*) shown in FIGS. 16*a* and 16*b* and arrangement (11) (i.e. through stationary bed (11*a*) and reciprocating plate (11*f*)) shown in FIGS. 5*a* and 5*b*.

The construction of elements (18*a*, 18*c* and 18*e*) shown in FIGS. 16*a* and 16*b* are by way of example. Thus, instead of having elements (18*a*, 18*c* and 18*e*) in plate form, they could be realized using suitably arranged bars so that their area of contact with OFT, which they shall press against reciprocating plate (11*f*), is as small/large as preferred. Having the elements (18*a*, 18*c* and 18*e*) in a modular construction is preferable than a single piece construction because the angular part of elements (18*a*, 18*c* and 18*e*) can be easily matched with the angle of the laid tapes. The modular construction will be also advantageous when producing an OFT that incorporates tapes at unequal angles.

The 'V' shaped projection on element (18*a*) provides the preferred clearance for laying the tapes from the two directions close to the previously laid tapes that are already incorporated in the body of OFT.

Elements (18*a*, 18*c* and 18*e*) can be provided with suitable stems (18*b*, 18*d* and 18*f*) respectively, as shown in FIGS. 16*a* and 16*b*. The purpose of these stems is to connect the element (18*a*, 18*c* and 18*e*) to their respective actuators (not shown) for their raising and lowering to press OFT for forwarding and for releasing OFT after it has been forwarded. The length and number of stems will depend on the design of other working systems. The elements (18*a*, 18*c* and 18*e*) are finally connected to reciprocating bed (11*f*) through suitable construction (not shown) whereby a constant positional relationship is always maintained between them.

While element (18*a*) will press on the body of OFT, elements (18*c* and 18*e*) will press on the tapes that are freely extending from the body of OFT. Such pressing of OFT material and also the extending tapes on reciprocating bed (11*f*) is preferred not only to reliably move forward the produced OFT to the winding unit, but also to correspondingly reliably advance forward in a controlled manner the freely extending tapes from the body of OFT. Without the action of elements (18*c* and 18*e*), the freely extending tapes from OFT's body will drag in an uncontrolled manner leading to their disorientation and positional change, which in turn will cause problems in the subsequent steps of the process, particularly displacement of the fore ends of the laid tapes by arrangement (16). The elements (18*a*, 18*c* and 18*e*) can work either simultaneously or independently in desired sequences.

Elements (18*a*, 18*c* and 18*e*), whether in plate or bar forms, need not be necessarily flat. The side facing OFT can have uniform projections so that they can exert uniform pressure on OFT without making a full surface contact. Such a construction will prevent lateral displacement of OFT and the freely extending tapes from the body of OFT such as when elements (18*a*, 18*c* and 18*e*) are lowered and raised. The air between OFT and the elements (18*a*, 18*c* and 18*e*) will escape easily in a non-planar construction, than with a planar construction, and thereby not cause the attending creation of any vacuum when lifting up.

The projections on elements (18*a*, 18*c* and 18*e*) can have smooth surfaces besides preferably a coating of anti-stick material such as PTFE. These projections could be also suitably perforated, or provided with channels, so that the air between OFT and these elements (18*a*, 18*c* and 18*e*) can easily escape when the elements are lowered for pressing OFT and the freely extending tapes from the body of OFT and thereby ease the raising of elements (18*a*, 18*c* and 18*e*) without lifting up OFT and the freely extending tapes.

Alternatively, elements (18*a*, 18*c* and 18*e*) could be replaced with an arrangement that applies preferred air pressure on OFT. Such an arrangement could be considered as a contact-less arrangement and it need not be lowered and raised.

To advance OFT forward for winding in a controlled manner, elements (18*a*, 18*c* and 18*e*) are supported in a sliding arrangement (not shown) and suitably connected to the reciprocating plate (11*f*). Through such construction, elements (18*a*, 18*c* and 18*e*) have defined reciprocating positions corresponding with that of the reciprocating plate (11*f*). Thus elements (18*a*, 18*c* and 18*e*), when resting over OFT and reciprocating plate (11*f*), can be moved equally and simultaneously with the reciprocating plate (11*f*) to advance forward the OFT for winding. Likewise during retraction of reciprocating plate (11*f*) the raised elements (18*a*, 18*c* and 18*e*) can be moved back equally and simultaneously with the reciprocating plate (11*f*) to be in correct position for the subsequent cycle of the process.

Figure 18A:
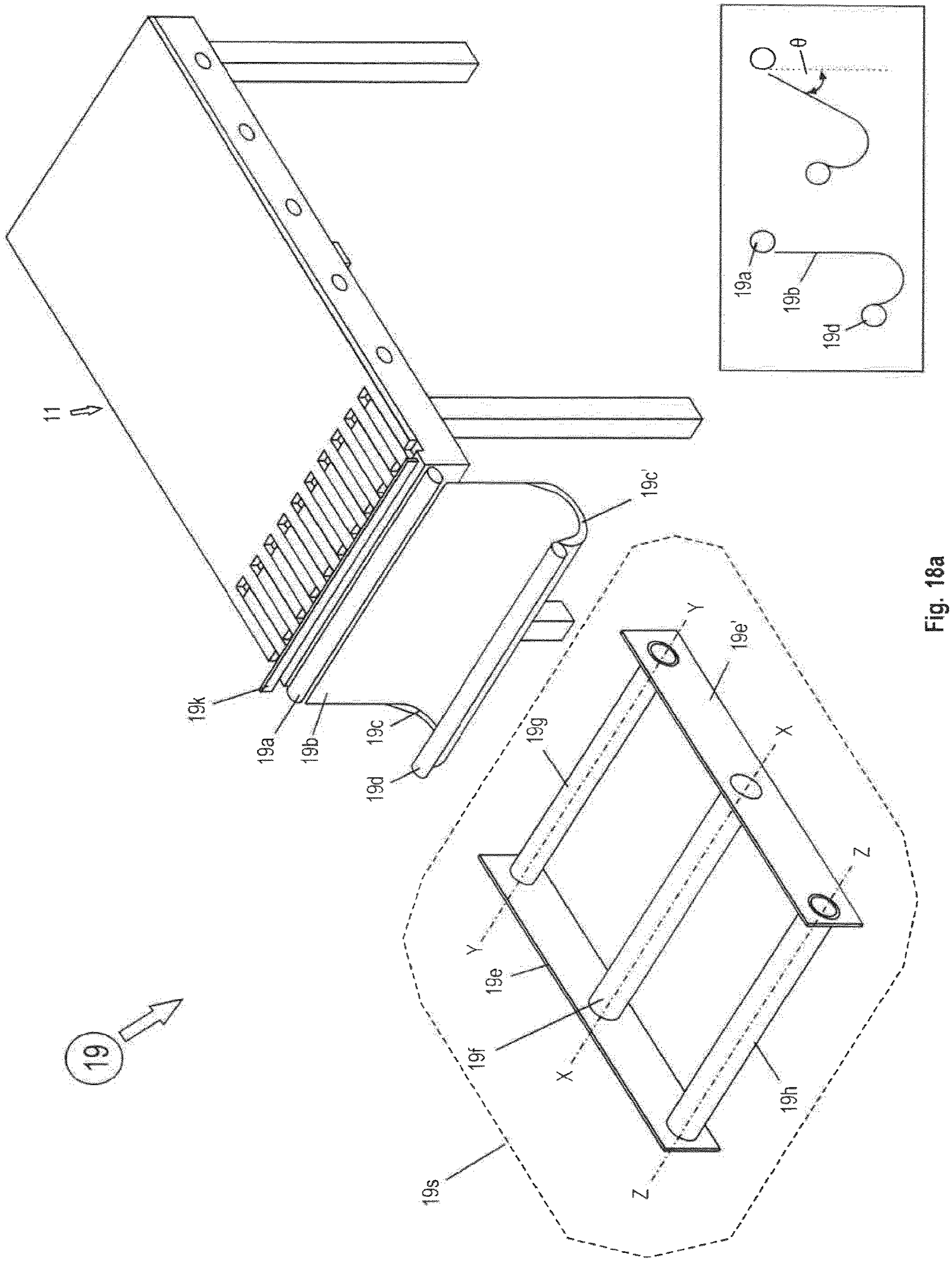
FIGS. 18*a-b* exemplify an arrangement for advancing and collecting/winding OFT.

In addition to the above parts, there is also incorporated a pressing plate/bar (19*k*), as shown in FIG. 18*a*. This plate (19*k*) is located over the flat stationary area of arrangement (11), i.e. on bed (11*a*) and near the projecting fingers (11*b*). The purpose of this plate (19*k*) is to press OFT against the stationary area of arrangement (11) to hold the forwarded OFT in position and prevent it from being pulled back when elements (18*a*, 18*c* and 18*e*) and reciprocating plate (11*f*) are retracted after jointly aiding OFT's forward advancement for winding it into a roll. Thus, the pressing plate (19*k*) is activated to press the forwarded OFT against the stationary area before elements (18*a*, 18*c* and 18*e*) are raised/drawn away from OFT's surface. The plate (19*k*) is raised/drawn away from OFT after elements (18*a*, 18*c* and 18*e*) press OFT on bed (11*f*) to effect forward movement of produced OFT.

The foregoing description describes forward advancement of OFT during Continuing Phase (after OFT's body has attained its full width). However, initially when the OFT production commences in the Starting Phase the body of OFT starts to grow longitudinally and laterally. To handle the issuing tapes from the relatively small body of OFT, certain constructional features are temporarily needed, although it could be managed manually if preferred. This essentially includes suitable extensions to elements (18*a*, 18*c* and 18*e*). Thus, the elements (18*a*, 18*c* and 18*e*) could be initially connected with similar, but suitably dimensioned, temporary elements through joining/connecting arms. The purpose of these temporary elements is to assist the forward advancement of the tapes extending in the direction opposite to the growing body of OFT. Once the body of OFT attains its full width and passes the winding side of arrangement (11), these extensions can be removed and the extending tapes cut. The OFT advanced forward is then preferred to be wound into a roll.

Figure 17A:
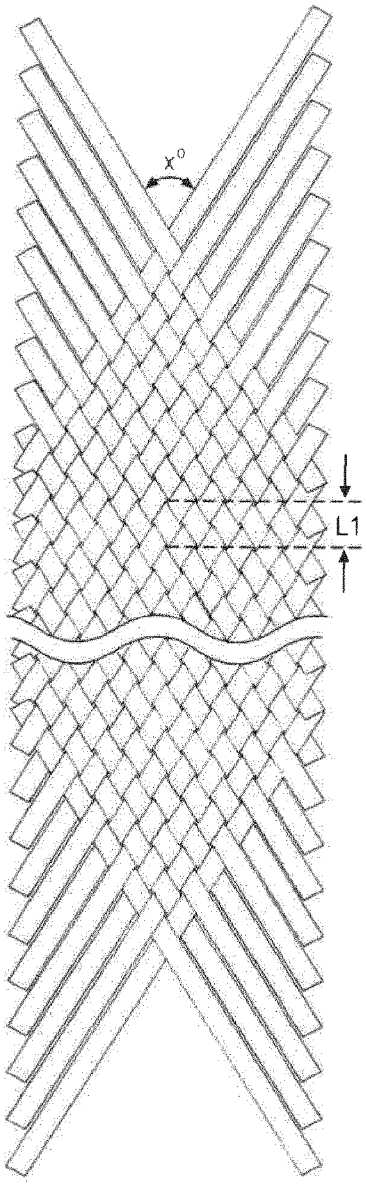
FIGS. 17*a-c* exemplify three different OFT types wherein the tapes are orientated in two equal and opposite oblique directions relative to the fabric-length (or width) direction and the angle subtended mutually by the tapes are acute, right and obtuse angles respectively.
Figure 17B:
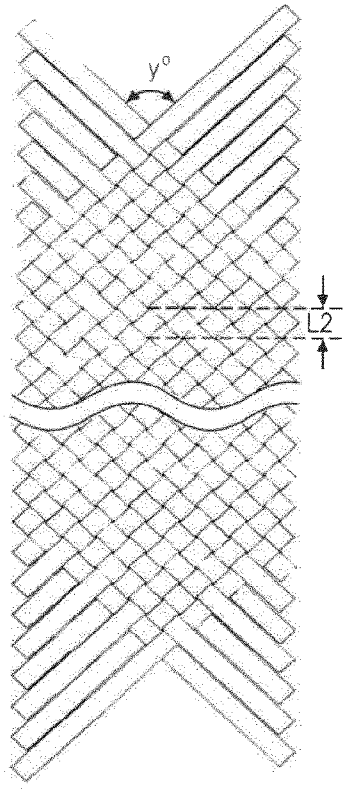
Figure 17C:
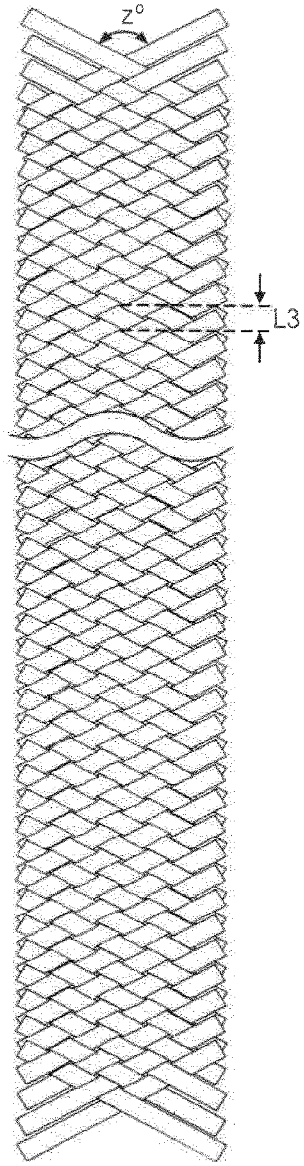

A novel feature of the OFT advancing method is that the distance by which OFT is advanced forward is greater than the used tape's width as indicated earlier. This unique situation arises from the incorporation angle of the tapes in OFT. The angle subtended by the constituent tapes of OFT could be either acute angle or right angle or obtuse angle as shown in FIGS. 17*a* to 17*c*. Thus, for the same width of tapes, the distance of advancement for OFT incorporating tapes in an acute angle relationship (x° in FIG. 17*a*) will be L1, which will be greater than when the tapes are incorporated in a right angle relationship (y° in FIG. 17*b*) which is L2, and this distance in turn will be greater than when the tapes are incorporated in an obtuse angle relationship (z° in FIG. 17*c*) which is L3. Thus, for the same tape width, the distance for advancing forward OFT will vary according to the angle of tapes' incorporation in OFT.

The distance for advancing forward OFT would roughly correspond with the length of the longitudinal diagonal (the one parallel to the fabric-length direction) of the 'square/parallelogram/rhombus' created by the intersecting and overlapping tapes.

9. Arrangement for Collecting Produced Material in a Roll (19)

Even though OFT is consolidated for handling, its strength in longitudinal direction could be relatively lower at times compared with a fabric that incorporates fibres oriented in its length direction, such as the woven material. As indicated earlier, the produced OFT requires careful handling during its collection in a suitable package, such as when winding it into a roll. Further, because OFT is produced using discrete lengths of tapes, it becomes preferred to keep the winding distance as short as possible so that the OFT does not develop openings/gaps or come loose. Therefore, the roll of OFT should be preferably produced as close as possible to the point where the full body width of OFT gets formed. It is also important to ensure that OFT proceeds in a more or less linear path to prevent its skewing and also to obtain a satisfactory package and quality for subsequent handling and intended application.

Figure 18B:
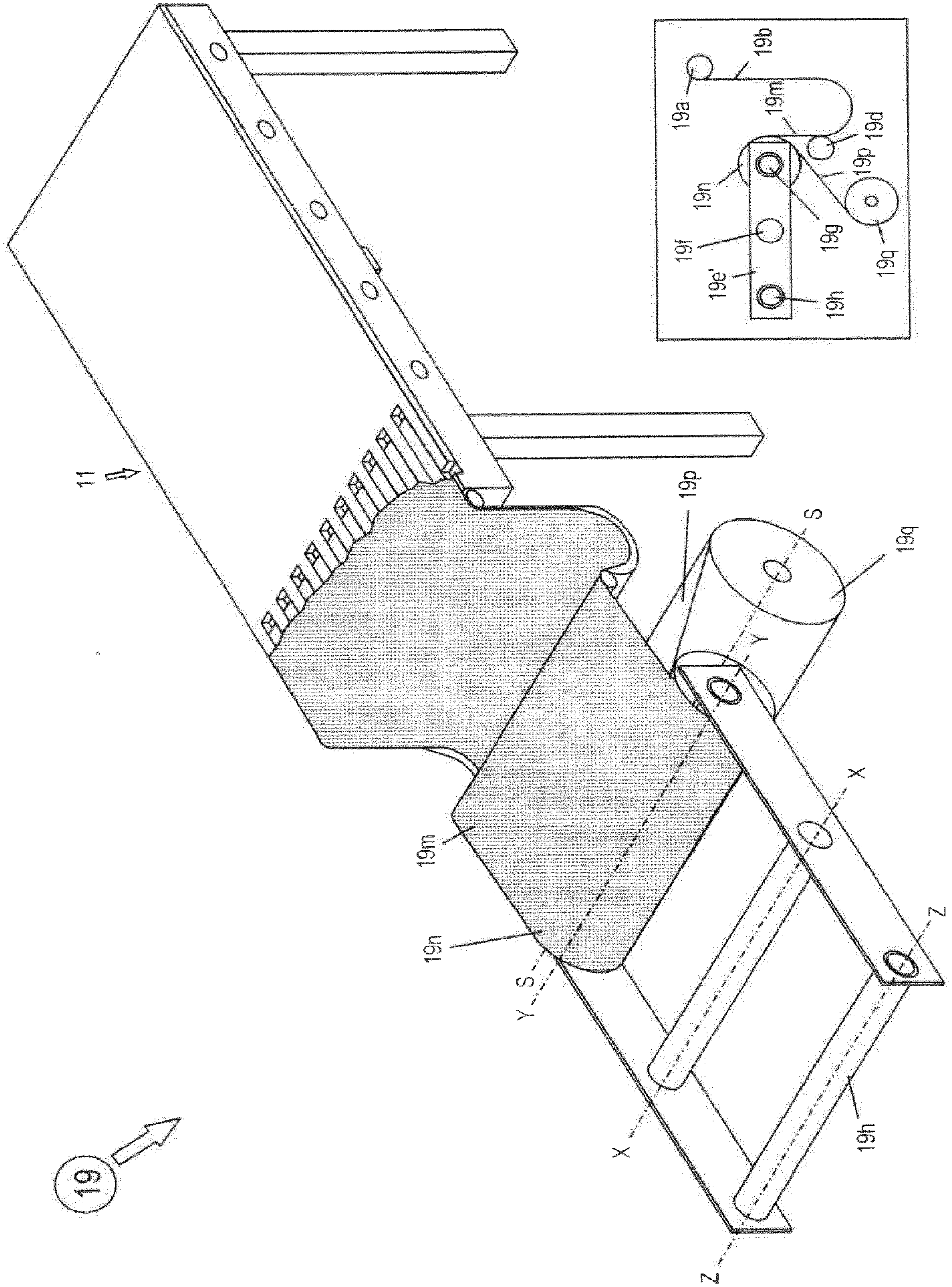

In FIG. 4 is shown the relative position of arrangement (19), which is located at the OFT winding side of arrangement (11). This arrangement (19), shown by way of example, winds up the produced OFT in a tensionless manner. FIG. 18*a* shows different parts of arrangement (19), which mainly comprises an exit guide roll (19*a*), a J-shaped tray (19*b*) and a winding shaft (19*g*). FIG. 18*b* shows the path followed by OFT (19*m*) between arrangement (11) and finished roll (19*n*).

The axis of exit roll (19*a*) is parallel to the winding side edge of arrangement (11). Also, it is preferably located below the top surface of bed (11*a*) so that the produced OFT can preferably pass tangentially over the exit roll (19*a*) from bed (11*a*).

A J-shaped tray (19*b*), which is suspended below exit roll (19*a*), as shown in FIG. 18*a*, extends parallel to the exit roll (19*a*). It is preferably produced using a suitable sheet metal. The top side of J-shaped tray (19*b*) is pivoted (not shown) at the front end of bed (11*a*) and can be tilted upwards and locked into a suitable angular position 8, as shown in the inset of FIG. 18*a*. The angle of tilt would depend on the stiffness and areal weight of the OFT being produced. Thus, a relatively pliable and lighter areal weight OFT will have a correspondingly different angular tilt. The exit side of J-shaped tray (19*d*) is either directly shaped into a suitable curve or fixed to a suitably curved member (such as a suitable tube) to provide a gentle and smooth exit to OFT (19*m*). Further, the depth of J-shaped tray (19*b*) can be varied according to the stiffness and areal weight of the OFT being produced.

The surface of J-shaped tray (19*b*) is preferably as smooth as possible and also preferably coated with a low-friction/anti-sticking material such as PTFE. Preferably two end plates (19*c* and 19*c*") are fixed to J-shaped tray (19*b*) to provide linear guidance to OFT (19*m*). The positions of these end plates (19*c* and 19*c*") can be altered according to the width of OFT being produced. This way the longitudinal edges of OFT will remain linearly guided in its path. If preferred, guide rings or the like can be also mounted on exit roll (19*a*) to control the path of OFT (19*m*). To exercise further control for keeping the OFT (19*m*) in a linear path, additional end plates could be included where preferred on the J-shaped tray (19*b*). Alternatively, J-shaped tray could be also made using perforated sheet metal to keep the OFT (19*m*) pressed on to its surface by applying suitable vacuum pressure from the other side.

While use of one J-shaped tray (19*b*) is considered sufficient, additional J-shaped trays could be also had in tandem if preferred for greater process control. In such a situation the OFT would pass from one tray to the next before being wound into a roll.

For winding up the produced OFT (19*m*), two factors are important to consider: (a) virtually no tension can be applied to OFT (19*m*) in its length and width directions, and (b) the OFT production process is, technically speaking, endless. In these circumstances, it is preferred to have a suitable system for winding the produced OFT (19*m*) in tensionless condition into rolls of specified lengths one after another.

Accordingly, as shown in FIG. 18*a*, a novel OFT winding system (19*s*) is provided, which comprises two arms (19*e* and 19*e*") fixed to middle shaft (19*f*) that can be turned around its axis (X). The ends of arms (19*e* and 19*e*") carry shafts (19*g*) and (19*h*) as shown in FIG. 18*a*. Each of these shafts (19*g*) and (19*h*), which can be rotated about their respective axes (Y) and (Z) through suitable driving arrangement (not shown), can be attached to and detached from the respective sides of the arms (19*e* and 19*e*"). Thus, the positions of shafts (19*g*) and (19*h*), relative to J-shaped tray (19*b*), can be inter-changed by turning the middle shaft (19*f*) about its axis (X) by 180°.

To start with, as shown in FIG. 18*b* (inset), preferably shaft (19*g*) is located over exit end (19*d*) of the J-shaped tray (19*b*) so that the produced OFT (19*m*) is more or less vertically tangential to shaft (19*g*). The leading end of OFT (19*m*) is adhered to the core sitting on shaft (19*g*), which in turn is incrementally rotated through suitable drive (not shown) in the appropriate direction. The turning of shaft (19*g*) is synchronized with the movement of OFT advancing arrangements (18*a*, 18*c* and 18*e*) and reciprocating plate (11*f*). As OFT (19*m*) gets wound over its core that sits on shaft (19*g*), the diameter of OFT roll (19*n*) increases. To maintain the produced OFT vertically tangential at all times to the roll being produced, winding unit (19*s*) is gradually moved away from the J-shaped tray (19*b*) in suitable increments. A suitable over-riding clutch (not shown) is incorporated in the drive to shaft (19*g*) to prevent any pulling of the produced OFT (19*m*). Such a winding arrangement (19*s*) eliminates sagging of the produced OFT (19*m*) under its own weight and thereby enables its tensionless winding.

Once a preset length of OFT (19*m*) is wound into a roll (19*n*), the production of OFT is either briefly slowed down or paused and shaft (19*g*) is turned through suitable drive to unwind some length of OFT (19*m*). The middle shaft (19*f*) is then turned 180° such that the just unwound OFT (19*m*) and interleaving film/foil (19*p*) extends from the position of axis (Z) to the winding position of axis (Y). The film/foil (19*p*) is cut off from its supply roll (19*q*) at a suitable place to expose the underside of OFT (19*m*) to the new core which lies touchingly under it. The new core sitting on shaft (19*h*), which presently occupies the earlier position of shaft (19*g*), adheres to the unwound OFT through a suitable adhesive that is applied over it before turning shaft (19*f*). OFT is then cut at a suitable place so that the produced roll can be taken off.

The film/foil (19*p*) is preferably passed through a positive feeding arrangement that constantly delivers preferred length of film/foil, corresponding with the length of OFT advanced forward, for tensionless winding of OFT. The film/foil (19*p*), coming from its supply (19*q*), is also affixed to the new core and the OFT production commenced again. By this procedure the production of OFT (19*m*) continues without tensioning and causing misalignment of OFT (19*m*) in any way. Also, by suitably slowing down tape laying and fabric advancing steps in relation to the described winding procedure, a continuity of OFT production can be achieved without having to halt the process for achieving relatively higher productivity.

To prevent the layers of OFT from getting stuck to each other in the OFT roll (19*n*) that is being produced, an interleaving film or foil (19*p*) of a suitable material is supplied from roll (19*q*). The film/foil (19*p*) can be passed between the nip of a pair of rolls (not shown) so that by turning these rolls the preferred measured length of film/foil (19*p*) can be correspondingly paid out. Through such an arrangement the take-up of OFT and film/foil (19*p*) is equal and no tension is imparted to the OFT (19*m*). Incorporation of interleaving film/foil (19*p*) between the OFT layers in the roll (19*n*) renders subsequent handling of OFT safer as the unrolled OFT also gets supported by the film/foil (19*p*).

Working of the Device and Fabric Production

The various systems of the OFT forming device described above work collectively in coordination according to the method comprising the Starting and Continuing Phases described earlier. The production of OFT, wherein the constituent tapes occur in a tensionless state and in angular orientation relative to the fabric-length and -width directions, will become apparent to the person skilled in the art from the following outline.

The working of the device outlined below is general and only by way of illustration. It can be modified in different ways according to the needs of a situation. The working that is described below, which can be run by using a suitable programme, relates to creation of OFT structure wherein the tapes intersect and overlap each other alternately. As the OFT forming device comprises two identical sets of working arrangements for laying the tapes from two directions, the description below will therefore have greater focus on one set of arrangements than the other, which may be considered as the left and right sets of arrangements. FIG. 4 represents the OFT forming device in general.

The width of the working bed (11) is prepared according to the width of OFT (19) preferred to be produced. The left and right side tape spools (12) are mounted on their respective shafts/chucks and positioned according to the desired angular orientation of the tapes to be incorporated in OFT (19). The leading ends of the tapes are drawn out from the two spools (12), guided over exit rolls and fed to respective holding clamps for positioning. Cutters (13) are positioned according to the desired angle of cut preferred in the tapes.

Starting Phase

Tape from the left spool is drawn out by arrangement (14). The gripper of arrangement (14) holds the drawn out tape. The tape laying arrangement (15) is moved into position such that its fingers grip the fore and aft ends of the drawn out tape, which is then cut by the cutter (13). The tape laying arrangement (15) is then moved in the direction of bed (11) carrying the tape. Upon reaching the defined end position, arrangement (15) releases and lays the tape on bed (11) whereby the tape occurs in a tensionless state. The laid tape's fore end that is closer to the right side spool, rests over the fore end displacing element of right side arrangement (16). Tape laying arrangement (15) is then retracted to its starting position. The described procedure is performed with the respective right side arrangements whereby the right side tape is laid above the previously laid left side tape on bed (11) such that its fore end which faces the left side spool rests over the fore end displacing element of left side arrangement (16).

The left side tape is subsequently laid adjacently parallel to the previously laid left side tape and above the laid right side tape. These laid tapes are suitably consolidated by arrangement (17) at the overlapping areas created by the upper and lower tapes and advanced forward by arrangements (11) and (18) jointly. With the laying of these three tapes the Starting Phase of the process is completed.

Continuing Phase

The first laid left side tape's fore end that is facing the right side tape spool is displaced in its thickness direction by arrangement (16) of the right side. The right side tape, which is by now drawn out from its spool and gripped by the fingers of the right side tape laying arrangement (15), is cut and moved towards bed (11) and laid in a tensionless condition adjacently parallel to previously laid right side tape whereby it associates with earlier laid tapes by partly occurring below the first laid left side tape and partly above the second laid left side tape. The remainder of the laid tape lies exposed on bed (11). The displaced fore end of the left side tape is reverted to its initial position on bed (11).

Next, the first laid right side tape's fore end that is facing the left side tape spool is displaced in its thickness direction by arrangement (16) of the left side. The left side tape, which is by now drawn out from its spool and gripped by the fingers of the left side tape laying arrangement (15), is cut and moved towards bed (11) and laid in a tensionless condition adjacently parallel to previously laid left side tape whereby it associates with earlier laid tapes by partly occurring below the first laid right side tape and partly above the second laid right side tape. The remainder of the laid tape lies exposed on bed (11). The displaced fore end of the right side tape is reverted to its initial position on bed (11).

These laid tapes are suitably consolidated by arrangement (17) at the overlapping areas and advanced forward by arrangements (11) and (18) jointly.

The produced OFT is advanced forward causing the tapes extending from the just produced OFT's body to new positions in reference to the tapes' fore end displacing elements of arrangement (16). Thus, the fore ends of the second laid left and right tapes would now rest over the fore end displacing elements of the left and right sides of arrangement (16) that displaced the previous tapes of the respective sides.

The fore ends of the laid left and right side tapes are alternately displaced and fresh tapes from the two respective sides are laid, consolidated and advanced forward as described earlier.

As more tapes are laid the body of OFT grows in both longitudinal and lateral directions until it reaches its desired maximum width whereupon the body of OFT would resemble a square with two of its opposite corners located in the longitudinal centre of OFT (i.e. pointing in OFT's length direction) and the other two opposite corners located at OFT longitudinal edges (i.e. pointing in OFT's width direction). Continuation of the process from this point on, in the described procedure, will make the body of OFT grow only longitudinally (not laterally or in width direction). Consequently, the shape of OFT body will change from square to hexagon-like wherein the two longitudinal edges of OFT will be the two parallel sides of the hexagon. The body of OFT is thus not rectangle-like at any instant.

The described process of OFT formation according to this invention can continue without end so long as tapes are made available for laying from two directions. While replenishing exhausting spools with fresh ones automatically in the OFT forming device is one option, the other could be, for example, storing continuously cut tapes of preferred length in a certain manner in a suitable magazine and automatically presenting the ends of each tape to the tape laying arrangement (15).

It will be obvious now to a person skilled in the art that the indicated steps involved in OFT forming device according to this invention can be suitably incorporated in a programme to run the process. The device uses no components that can be considered to be like those used in weaving, knitting, braiding and non-woven processes. Further, the OFT forming device has relatively very few and simple working components. The described OFT process and its production device can be modified in many different ways without deviating from the principle of this novel process and the procedures described above to make it efficient and productive. They can be also modified for versatility as described next.

Process and Device Alterations for Producing Different Fabric Structures

The description given above sets the fundamental outlines of the novel process, which can be employed to produce OFTs having alternating, and also any other, intersecting and overlapping pattern of the tapes of two directions that are incorporated in equal angles relative to the longitudinal sides of arrangement (11) in three styles:

a) The tapes mutually subtend acute angle between them (x°) as shown in FIG. 17*a*, or
b) The tapes mutually subtend 90° between them (y°) as shown in FIG. 17*b*, or
c) The tapes mutually subtend obtuse angle between them (z°) as shown in FIG. 17*c*.

Figure 19:
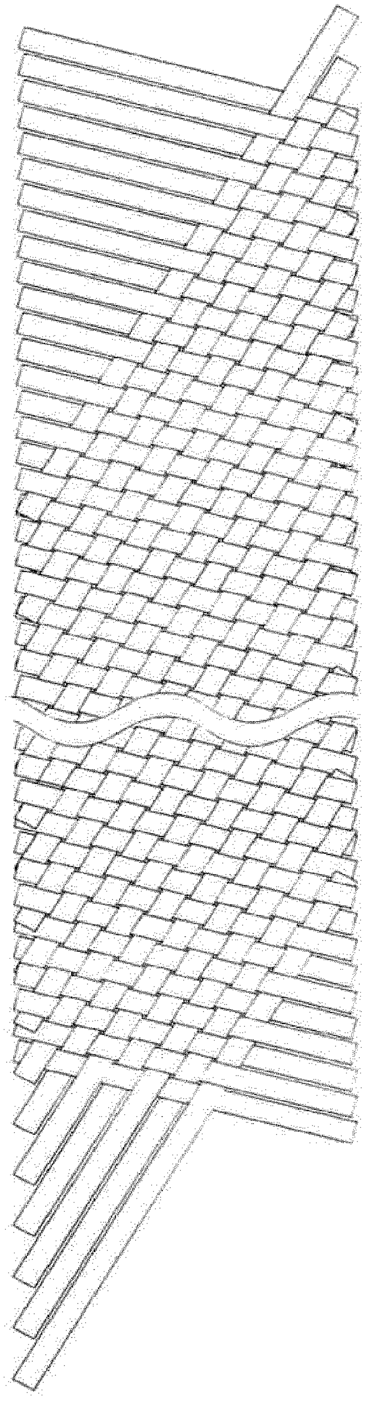
FIG. 19 exemplifies an OFT wherein the tapes are orientated in two unequal and opposite oblique directions relative to the fabric-length (or width) direction and the angle subtended mutually by the tapes is an obtuse angle.

By making the angles of the two supply tape's different in relation to the longitudinal side of arrangement (11), an OFT having alternating, as also any other, intersecting and overlapping of the tapes in unequal angles is producible as shown in FIG. 19. Such an 'unequal angle' OFT can be also produced in three different styles, as indicated above, wherein the tapes mutually subtend acute, right and obtuse angles respectively. Because the tapes are laid in unequal angles relative to the longitudinal side of arrangement (11), the length of tapes of two directions will also be unequal.

Within the working principle of the OFT forming process described above, and with certain modifications to the OFT forming device and operations to be described below, tapes can be folded to create entirely new OFT products directly. It is important to consider these aspects here for two reasons because through such a change: 1) a single tape is folded and simultaneously laid in two oblique directions, and 2) characteristically different OFT structures, compared with the ones described above, can be produced.

Figure 20A:
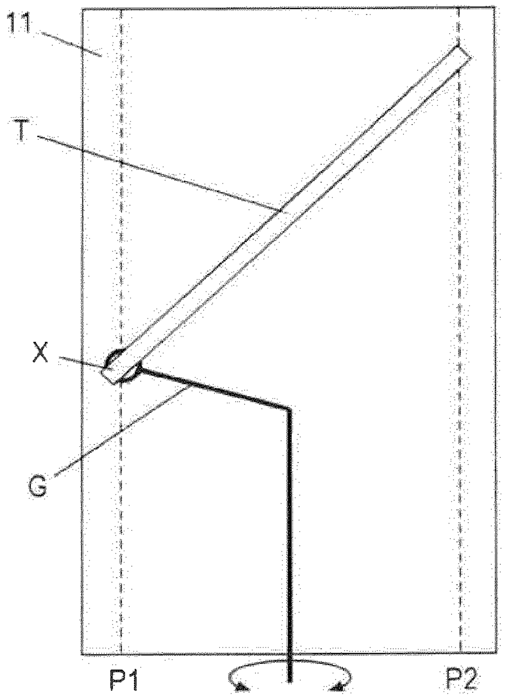
FIGS. 20*a-e* exemplify steps for folding tape to produce an OFT wherein a folded tape is orientated in two equal and opposite oblique directions relative to the fabric-length (or width) direction for producing OFT with one continuously closed longitudinal edge.
Figure 20B:
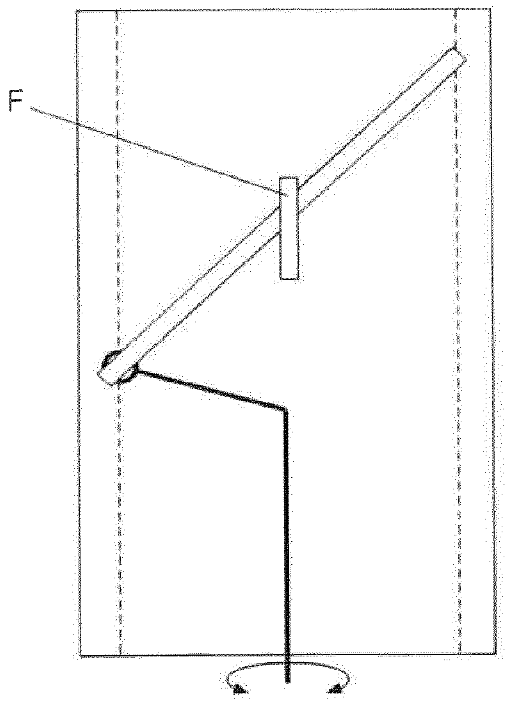
Figure 20C:
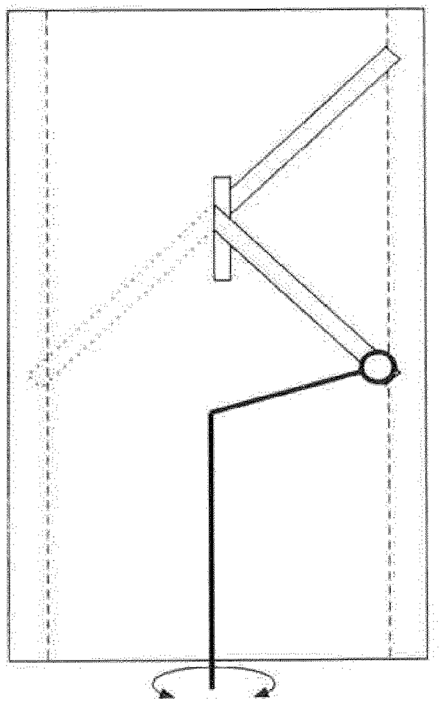
Figure 20D:
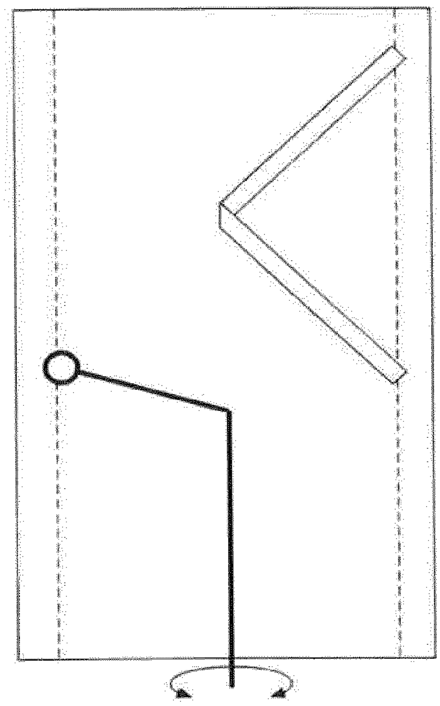

The particular operational and device changes concern essentially folding the tapes, either when they are being laid or preferably after they have been laid on arrangement (11). In accordance with the preferable way, a working principle for folding tapes is shown in FIGS. 20*a*-20*d*. First, as shown in FIG. 20*a*, a tape (T) which is laid straight on bed (11), has its lower and upper ends at reference sides P1 and P2 respectively. The lower end (X) of tape (T) is held by the gripper of the tape folding unit (G), which can be turned back and forth as indicated in the figures. If preferred, folding unit (G) can be also axially reciprocated (not indicated in FIGS. 20*a*-20*d*)) to compensate for any length changes of the tape during folding operation. More than one tape folding unit (G) can be employed in the process and from different directions if necessary. Next, as shown in FIG. 20*b*, a flat finger (F) is brought into position over tape (T) to press/hold it at the point where it is preferred to be folded. Finger (F) then presses and holds tape (T) on bed of arrangement (11) as shown in FIG. 20*b*. The tape folding unit (G) is then turned so as to transport the end (X) of tape (T) from reference side P1 to the opposite reference side P2 as shown in FIG. 20*c* whereby the tape (T) gets folded at the edge of flat finger (F). The gripper of folding unit (G) then releases the end (X) of tape (T). After the tape folding is completed, the flat finger (F) is removed from between the folded tape (T) as shown in FIG. 20*d* and the folding unit (G) reverted to its initial position at P1 for receiving the subsequent tape needing folding. The tape's fold is then pressed for creasing, if necessary. Thus, the same straight tape folds and extends straight in two opposite directions simultaneously and between the two longitudinal edges of OFT.

Alternatively, a simple conventional pick-and-place robot can be installed to fold the tape. Yet another way would be to modify the construction of the tape laying unit (15) such that in place of the left gripper (15*c*-15*d*) in reference to FIG. 13, a tape direction changing pin is fixed, say at 45° orientation (not shown). The gripper (15*c*-15*d*) can be fixed at the rear end of stem (15*b*) through an extending arm so as to hold the tape's rear/trailing end and maintain the tape parallel to stem (15*b*). When the front/leading end of the tape has been held by the right side gripper (15*c*"-15*d*") the tape gets turned at the direction changing pin as its rear/trailing end is held by the gripper (15*c*"-15*d*") which is located/fixed on an arm extending from stem (15*b*). This way the tape gripped between the two grippers will occur pre-folded at 90° and can be directly laid on bed of arrangement (11). Thus, the same tape will extend in two opposite directions simul-taneously and between the two longitudinal edges of OFT as described in the foregoing.

Figure 20E:
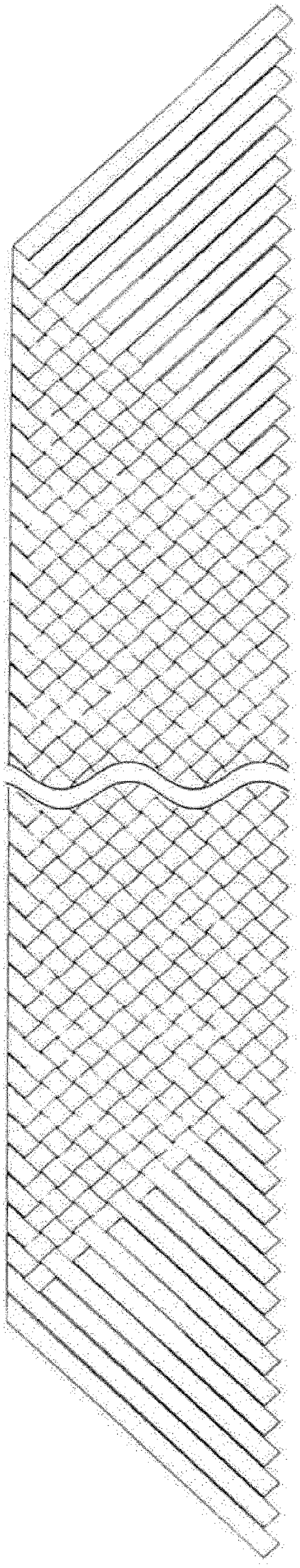
Figure 21A:
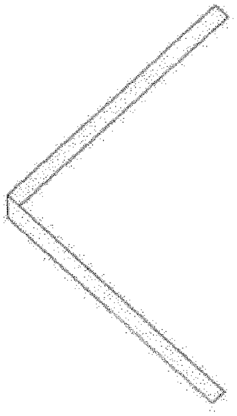
FIGS. 21*a-c* exemplify the steps for producing an OFT with one continuously closed longitudinal edge.
Figure 21B:
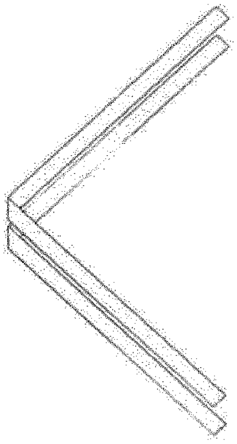
Figure 21C:
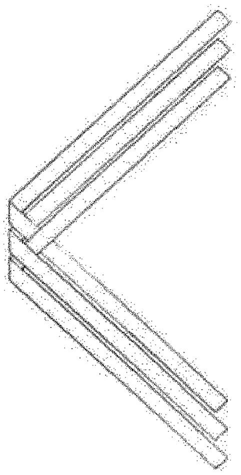
Figure 23A:
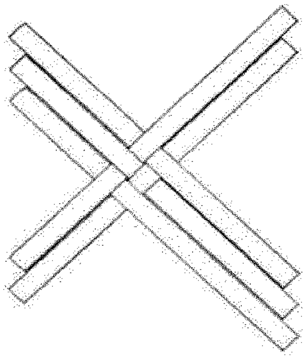
FIGS. 23*a-e* exemplify the production steps for obtaining an OFT with longitudinally oriented slits along the longitudinal axis of OFT.
Figure 23B:
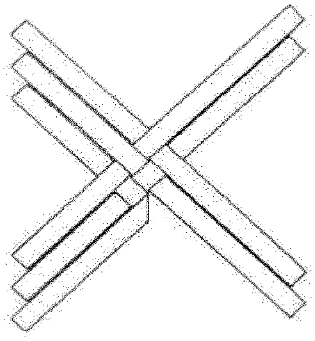

By including the tape folding step presented above, a characteristically different OFT structure shown in FIG. 20*e* is created. The OFT shown in FIG. 20*e* is unique in that its one longitudinal edge is completely closed/sealed. The main steps in the production of such an OFT is shown in FIG. 21*a-c*, which are self-explanatory. A tape of given length is laid and folded midway whereby it occurs in two different and opposite directions as shown in FIG. 21*a*. For explanation, the folded tape occurs such that half of it is up-sloping and the remainder half is down-sloping. The down-sloping/lower fore end of the first tape thus faces its supply spool and rests over the first element of the fore end displacing arrangement (not shown in FIG. 21*a*). The lower fore end of the first down-sloping tape is then displaced in tape's thickness direction and the next/second tape is laid parallel and adjacent to the up-sloping half of the first laid tape and folded such that its up-sloping half occurs under the first tape's down-sloping half. The folds of the two tapes form a straight longitudinal edge as shown in FIG. 21*b*. After consolidating the overlapping tapes the produced material is forwarded such that the down-sloping fore end of the laid second tape faces its supply spool and rests over the fore end displacing block/clamp of the fore end displacing arrangement (not shown in FIG. 21*b*). In the next cycle, the lower fore end of the second down-sloping tape is then displaced in tape's thickness direction and third tape is laid parallel and adjacent to the up-sloping half of the first laid tape and folded such that its up-sloping half occurs under the second tape's down-sloping half. The folds of the three tapes form a straight and closed/sealed longitudinal edge as shown in FIG. 21*c*. After consolidating the intersecting and overlapping tapes, the produced material is forwarded such that the down-sloping fore end of the laid third tape rests over the next fore end displacing block/clamp of arrangement (not shown in FIG. 21*c*).

By continuing the described procedure, the number of down-sloping tapes will increase in longitudinal direction of arrangement (11) and the body of OFT will also correspondingly increase until its preferred width is reached. The fore ends of the down-sloping tapes concerned will be displaced by the blocks/clamps of the arrangement (16) and new tapes laid and folded as described earlier. As can be inferred now, continuous repetition of the described steps will result in an OFT having one closed/sealed longitudinal edge as shown in FIG. 20*e*. It would be also apparent that the described OFT structure is produced by using only one source of tape supply and one set of certain working arrangements which would directly reduce the cost of the device considerably. Also, because the same tape lies folded in two directions at the same time, the production of OFT tends to increase considerably. An important feature of the produced OFT is that the thickness of folded tapes and that of the OFT body remains same.

Figure 22:
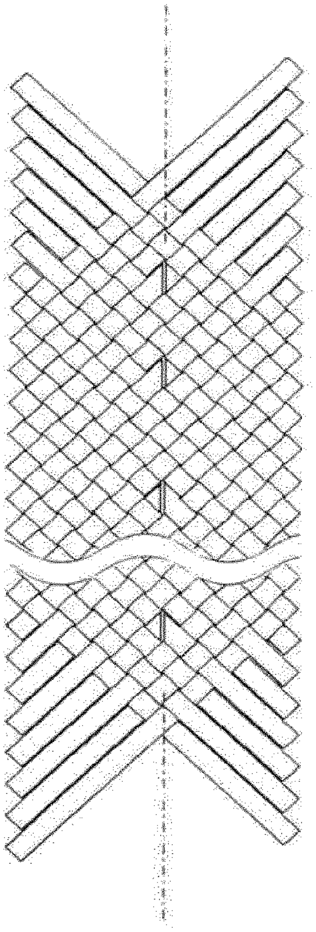
FIG. 22 exemplifies an OFT wherein longitudinally oriented slits are provided along the longitudinal axis of OFT.
Figure 23C:
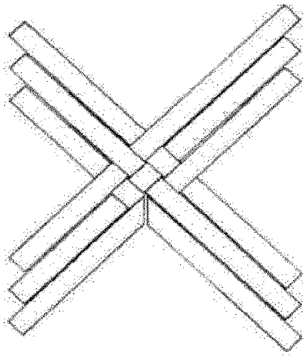
Figure 23D:
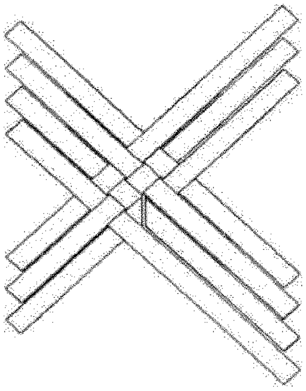
Figure 23E:
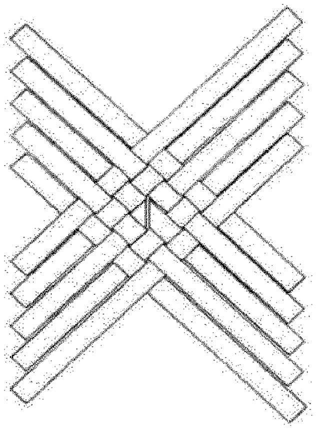
Figure 24:
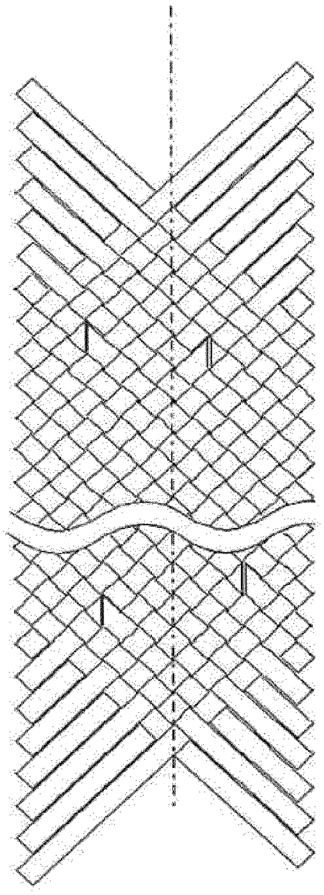
FIG. 24 exemplifies an OFT wherein longitudinally oriented slits are provided off set from the longitudinal axis of OFT.
Figure 27A:
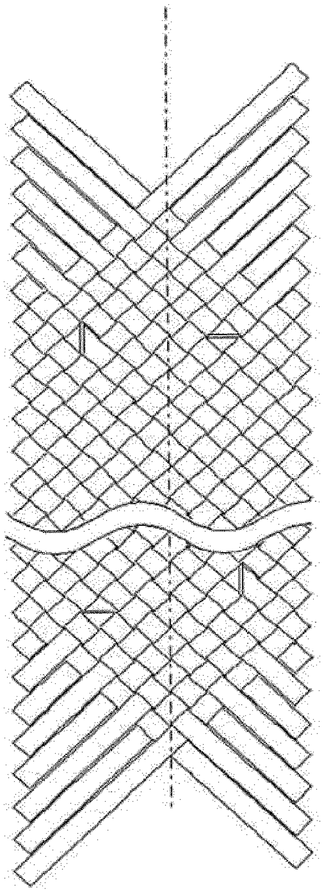
FIGS. 27*a-e* exemplify an OFT with longitudinally and laterally oriented slits, and various alternatives to incorporate additional bands/tapes through the slits.
Figure 25:
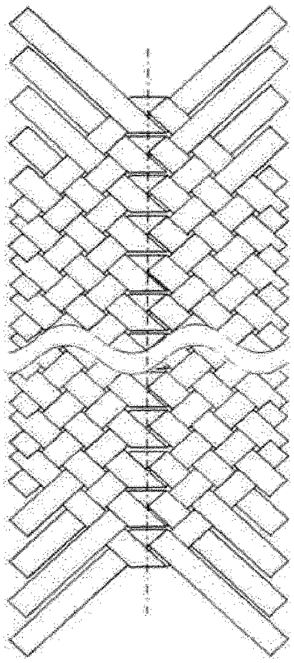
FIG. 25 exemplifies an OFT wherein laterally oriented slits are provided along the longitudinal axis of OFT.
Figure 26A:
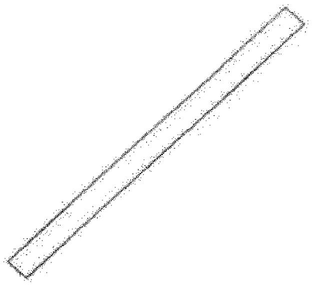
FIG. 26*a-j* exemplify the production steps for obtaining an OFT with laterally oriented slits along the longitudinal axis of OFT.
Figure 26B:
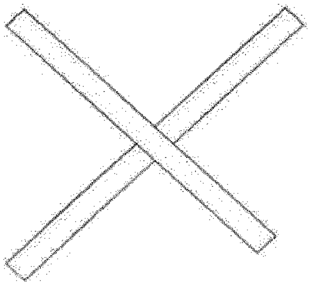
Figure 26C:
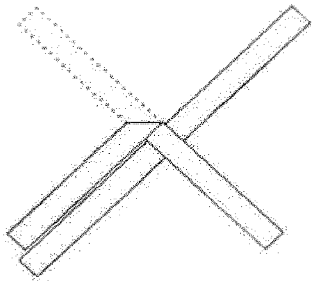
Figure 26D:
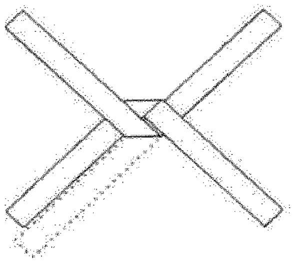
Figure 26E:
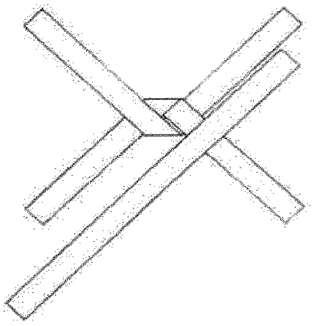
Figure 26F:
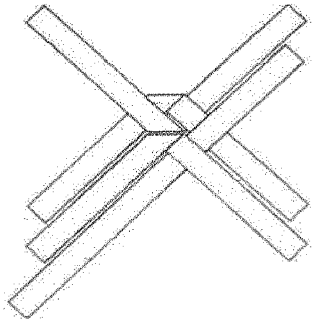
Figure 26G:
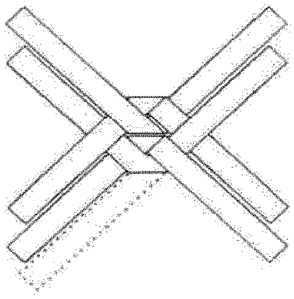
Figure 26H:
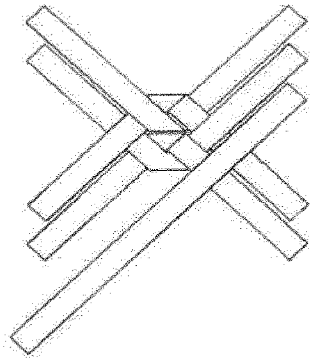
Figure 26I:
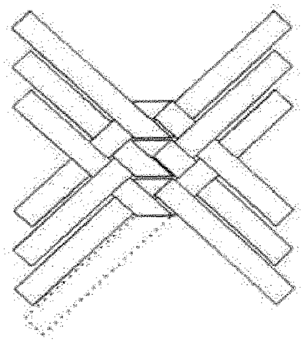
Figure 26J:
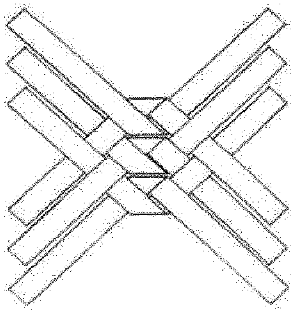
Figure 27B:
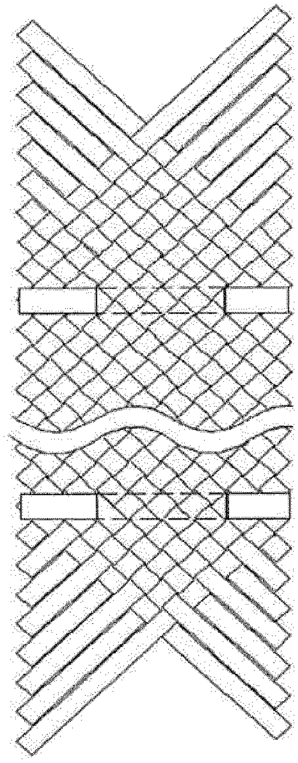
Figure 27C:
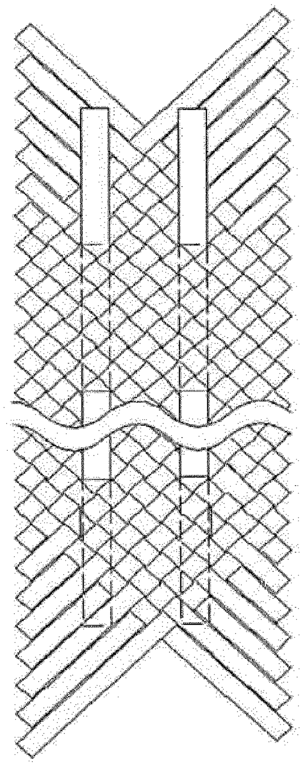
Figure 27D:
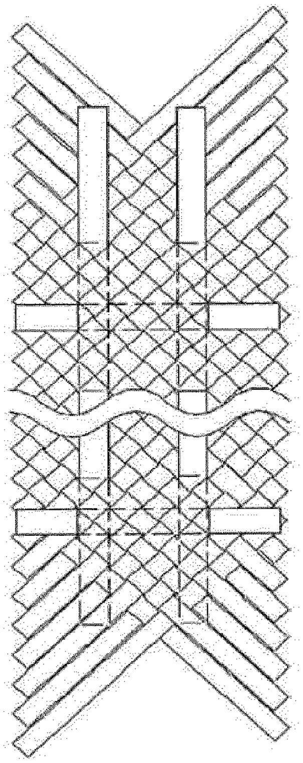
Figure 27E:
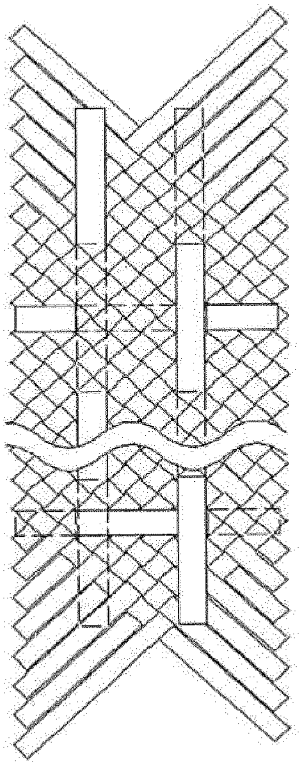

It will be apparent now to a skilled practitioner of the art that through the principle of folding operation described above and with further suitable modifications, if both left and right side tape supply sources and working arrangements are used, then by folding tapes in longitudinal and lateral directions of arrangement (11), as described in the foregoing, the following different OFT structures can be produced:

1) OFT incorporating two sets of folded tapes whereby slits/openings are created within the body of OFT such that:

a) The slits/openings are oriented in OFT's length direction ('vertical') and such slits occur along OFT's longitudinal axis as shown in FIG. 22, the main production steps of which are illustrated in reference to FIGS. 23*a* to 23*e*, which are self explanatory. Thus, after some full length tapes have been laid in the manner described earlier (FIG. 23*a*), the subsequent tapes are folded towards left side (FIG. 23*b*) and right side (FIG. 23*c*). Full length tapes are next laid for as many times as necessary from both sides (FIGS. 23*d* and 23*e*) whereby OFT with a vertical slit along longitudinal axis shown in FIG. 22 is produced.

b) The slits/openings are oriented in OFT's length direction ('vertical') and such slits occur offset from OFT's longitudinal axis as shown in FIG. 24 following steps similar to the ones described in the foregoing.

c) The slits/openings are oriented in OFT's width direction ('horizontal') as shown in FIG. 25. In producing this type of OFT, the laid tapes are folded in desired directions by incorporating the folding unit in preferred orientation. The sequential steps are illustrated in FIGS. 26*a* to 26*m* which are self explanatory and require no detailing other than indicating that certain tapes will occur temporarily partly over a previously laid tape of that orientation (if it is not directly supplied and inserted as folded tape) and then folded. As could be inferred from FIGS. 26*f* and 26*i*, the last laid tape is directly shown to be folded though it occurred temporarily partly over previously laid tape of that orientation before being folded as illustrated.

d) The slits/openings are oriented in both the fabric length (i.e. vertical) and width (i.e. horizontal) directions as shown in FIG. 27*a*.

The slits/openings may be used to mechanically connect the fabric to additional tapes/bands, of either fibrous or non-fibrous types, by passing the additional tapes/bands through the slits/openings. Examples of such arrangements are illustrated in FIGS. 27*b-e*. Such structures constitute a multiaxial structure.

Figure 28A:
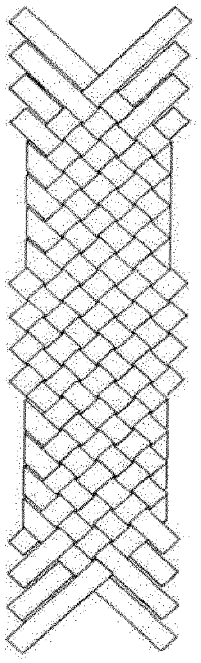
FIGS. 28*a-c* exemplify three different types of OFT wherein both longitudinal edges are partly closed and partly open.
Figure 28B:
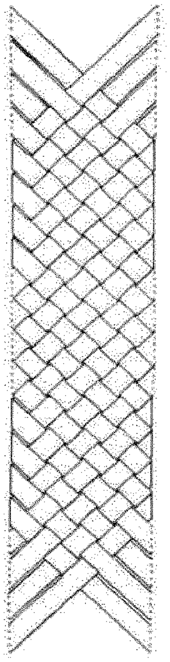
Figure 28C:
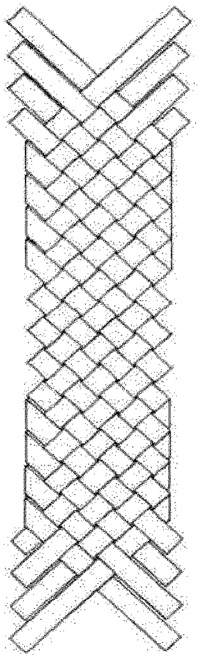
Figure 29A:
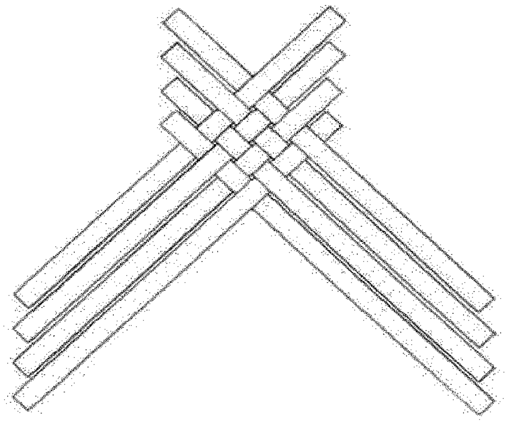
FIGS. 29*a-k* exemplify the production steps of one cycle for obtaining an OFT with both longitudinal edges partly closed and partly open.
Figure 29B:
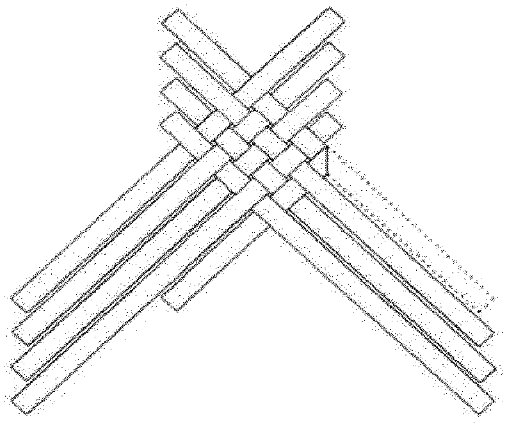
Figure 29C:
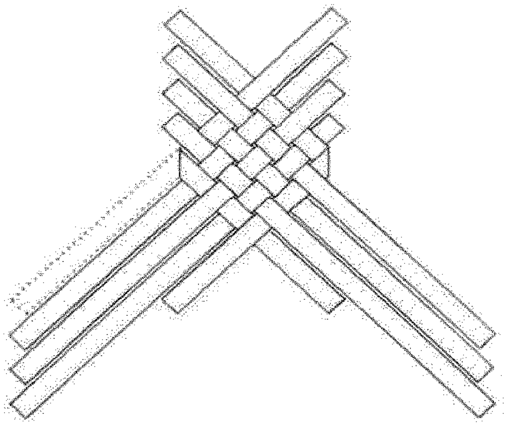
Figure 29D:
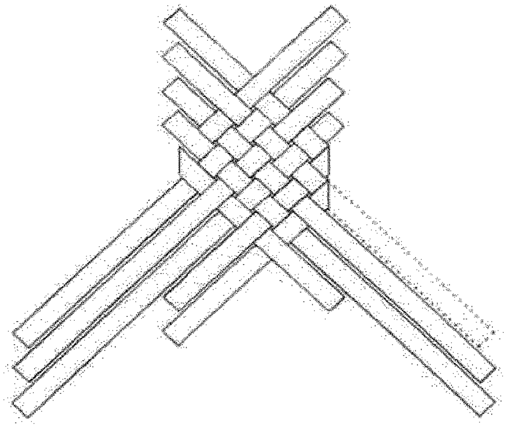
Figure 29E:
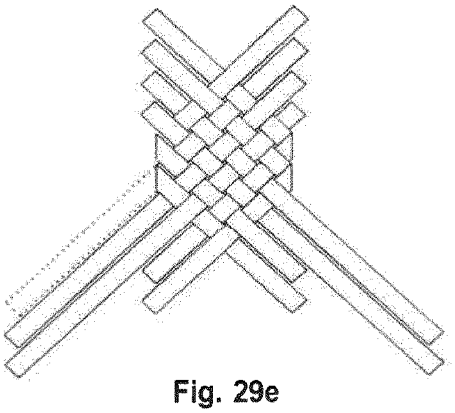
Figure 29F:
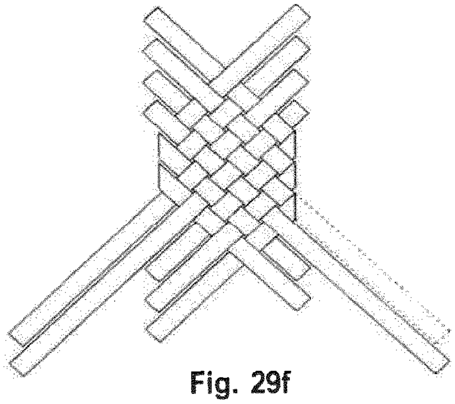
Figure 29G:
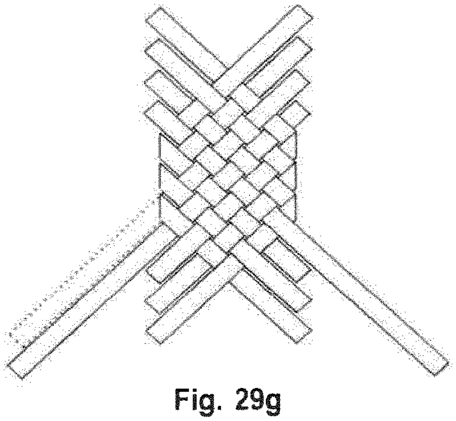
Figure 29H:
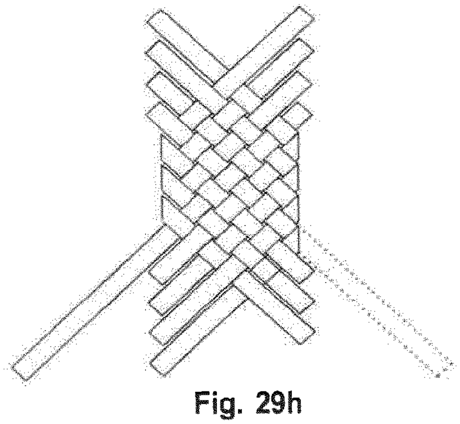
Figure 29I:
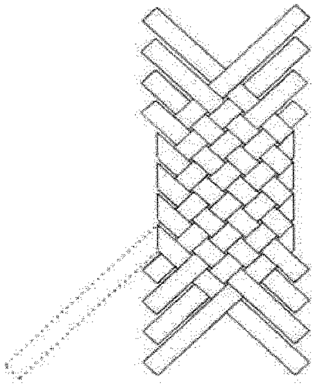
Figure 29J:
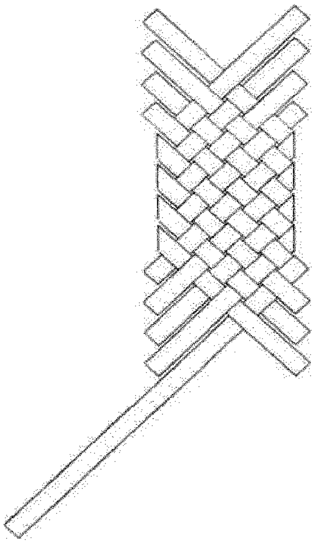
Figure 29K:
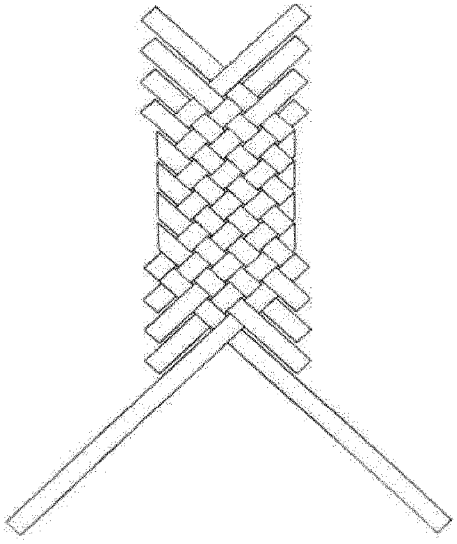

2) OFT incorporating two sets of folded tapes whereby the folds occur intermittently along both longitudinal edges in three different styles as shown in FIGS. 28*a* to 28*c*, the main production steps of which are illustrated in reference to FIGS. 29*a* to 29*k* which are self explanatory and not detailed further. These FIGS. 29*a-k* represent one cycle of producing both longitudinal edges partly sealed. FIGS. 28*a-c* show OFTs wherein the two longitudinal edges are partly closed and partly open. The OFT in FIG. 28*a* has its tapes' ends protruding out of the longitudinal edges. The OFT in FIG. 28*b* has its tapes ends cut in an angular manner such that the cut ends are in line with the OFT's longitudinal edges. The OFT in FIG. 28*c* has its tapes' ends within the longitudinal edge of OFT (i.e. the tapes' ends do not protrude out of the OFT's edges).

It may be pointed out here that the 'vertical' and 'horizontal' slits/openings in OFT mentioned above could occur in either series or parallel relative to either fabric length or width directions. Further, the frequency of such 'vertical' and 'horizontal' slits/openings could be had in either regular or irregular manner in a given length of fabric.

Possibilities of Producing OFTs Using Different Materials

It will be obvious now to those skilled in the art that the described method and device can be employed to produce OFTs comprising either one or more or combination of different materials of tapes from a selection of the following:

Fibrous material (textile ribbons/bands/nets, natural and polymeric/synthesized fibres, organic fibres/filaments and inorganic fibres/filaments, metallic fibres/filaments/wires, and including paper and paper based), (ii) Non-fibrous material (polymeric film/sheet, metal foils, veneer, materials responsive to heat, pressure, light and sound (e.g. to generate specific memory and electrical signals, audio and video storing media etc.) and combination of any two or more types etc., (iii) Construction type (opaque, translucent, transparent, coloured, smooth surface, textured, frictional surface, even edges, uneven edges, parallel edges, non-parallel edges, variable width, perforated, embossed, corrugated, either with or without chemical formulation in powder, coated and infused forms, including inclusion of nano carbon particles, adhesive bearing, stiff, pliable, hard, soft, electricity conducting/insulating, heat conducting/insulating, light conducting, dry, wet, sticky/tacky, and combination of any two or more types etc., single layer type, two or more layered type, with either regular or irregular orientations of fibres/fibrils, sandwich type either with or without layers comprising parallel, directionally oriented, randomly oriented fibres, suitably connected different materials, constructions and width combination types), and (iv) Tape-width (that is either equal in both oblique directions, or unequal in both oblique directions, or combination of these two types, uniform, variable, and combination of any two or more types etc.). Further, such tapes could be of single, two or more layered types, and of suitable different materials, constructions and width combination types indicated above.

Characteristic Technical Differences Between OFT Forming and Relevant Conventional Processes It will be obvious now to all the skilled practitioners of textiles, particularly those associated with weaving and braiding processes, that the OFT forming process described herein does not technically correspond with the established principles of weaving and braiding processes for reasons indicated earlier, and those given in the following.

In comparison to the main aspects of the weaving process, the OFT forming process differs in that:

There are no fundamental 'shedding followed by weft inserting' operations involved.

There are no defined sets of input materials, like warp and weft, and hence no such setting-up is performed.

There is no fixed relation between materials constituting the fabric as happens with weaving process wherein warp (90°) and weft (0°) have a permanent relationship.

There is no closed geometrical shape of tunnel or shed created in fabric-width direction.

- There is no incremental insertion of any weft-like material in any shed.
- There is no beating-up required.
- There is no linear fabric-fell between the longitudinal edges of OFT.
- There is no fabric width expansion required, such as through use of temples.
- There is no forward advancing of produced fabric for taking-up/winding in the laid tape's width direction.
- There is no tensioning of fabric involved in either its length and width directions or during its take-up.
- There is no continuous running of any constituent material in the fabric from start to finish, such as warps and braiding yarns.
- There is no jointing of materials necessary for producing any length of fabric.

In comparison to the main aspects of the flat braiding process, the OFT forming process differs in that:

- There is no simultaneous withdrawal of the two sets of input tapes.
- There is no traversal of any tape spools.
- There are no endless tracks/paths for traversing the spools.
- There is no continuity of tape between fabric and tape supply spools during production.
- There is no angular convergence of input tape materials at the fabric-forming zone from their supply spools.
- There is no alteration of distance between the planes of spools and fabric formation to change the angle of tape's incorporation.
- There is no linear fabric-fell between the longitudinal edges of OFT.
- There are no pressing rollers through which fabric passes to maintain its width and longitudinal alignment.
- There is no continuous tension to be maintained on the two input tapes.
- There is no continuous self-binding of the fabric edges.
- There is no continuous running of tapes constituting the fabric from start to finish.
- There is no jointing of materials necessary for producing any length of fabric.

The other novel features of the OFT forming process are:

- Fabric production involves laying of tapes with the Starting Phase followed by the Continuing Phase.
- About one half of each tape length that is laid forms the fabric while the remainder half extends freely from the body of the fabric and lies exposed (at full width of OFT body).
- The tapes within and extending from fabric body remain in a tensionless condition between fabric's opposite longitudinal edge sides.
- Free ends of desired tapes of one orientation that extend from OFT's body are displaced to receive newer tapes of other orientation to form OFT.
- Free ends of desired tapes can be folded to create novel functional OFTs.
- The body of OFT first grows longitudinally and laterally until the full width is reached and thereafter it grows only longitudinally.
- The body of produced fabric resembles either a stretched hexagon or a trapezoid (OFT having one longitudinal edge wholly sealed/closed) wherein the parallel longitudinal edges extend more than the other remaining sides.
- It can process any kind of material, from soft/delicate to stiff/rigid types, without requiring any change.
- OFTs of different constituent materials can be produced by simply changing to corresponding material spools without stopping process for a new production set up.
- OFT with either one continuously sealed edge, or two discontinuously sealed edges, or continuously open edges can be produced.
- OFT with either vertical or horizontal or combination slits can be produced.

Other Usefulness of the OFT Forming Process

Figure 30A:
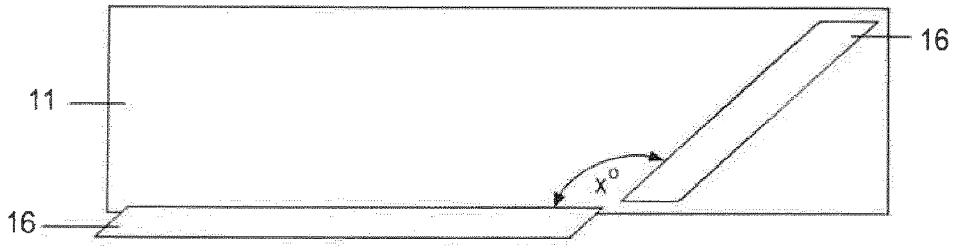
FIGS. 30*a-c* exemplify the plan views of an alternative arrangement for producing specific area OFTs of obtuse, right and acute angles wherein certain parts are in adjoining location.
Figure 30B:
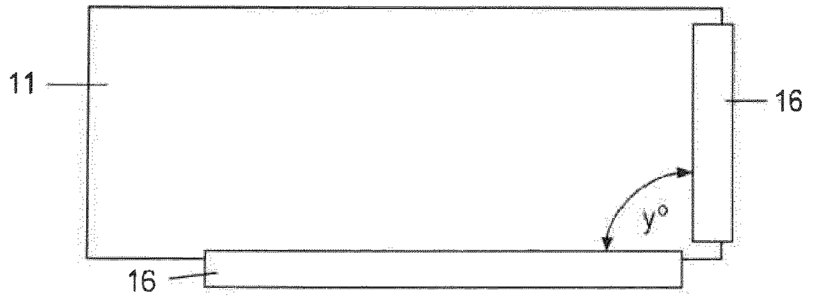
Figure 30C:
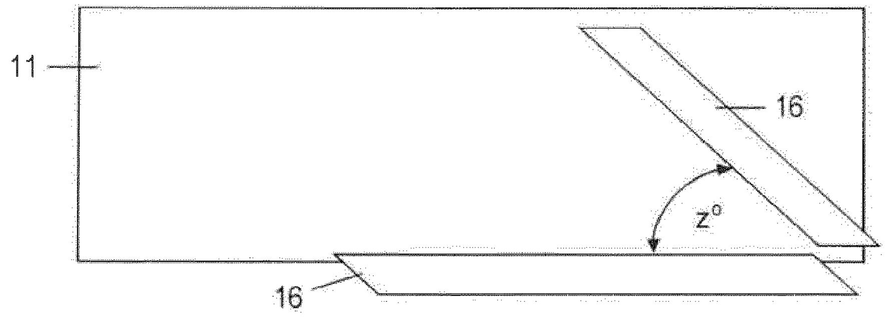

The OFT forming process described in the foregoing incorporates the tape's fore end displacing arrangement (16) in a mutually opposite configuration. They are located at the two longitudinal sides of arrangement (11) whereby they occur parallel to each other. However, they could be also arranged along two adjoining sides of arrangement (11), or preferably incorporated in bed of arrangement (11) itself, whereby they occur at an angle to each other. Such an angle could be either obtuse (x°) or right (y°) or acute (z°) as shown in FIGS. 30*a*-30*c*, which are the plan views. Through such repositioning and suitable modifications of certain arrangements of the OFT forming process a fabric of specific length and width comprising tapes at corresponding angles can be produced directly.

Such a modified OFT forming device can be highly useful in, for example, batch production of certain tapes of difficult-to-process materials such as brittle and fragile (e.g. boron, ceramic and metal coated fibres). These and other such fibre materials, due to their brittleness/fragility, are difficult to process by traditional routes into fabric materials. Furthermore, these fibre materials, which are not mass produced compared with other fibres such as carbon, glass, polymeric and metallic, are usually not available in large lengths normally needed for traditional textile processing. A modified OFT forming device can be thus useful in producing fabrics of specific areas using such special materials.

Purpose-made fabrics of materials such as boron, ceramic and metal coated fibres are needed for certain applications and in relatively very small quantities and application-specific dimensions (length and width) making their production by traditional processes impracticable, uneconomical and susceptible to damages. Further, because materials such as boron, ceramic and metal coated fibres are relatively highly expensive, their wastage should be significantly minimized, if not altogether eliminated during production.

Figure 31A:
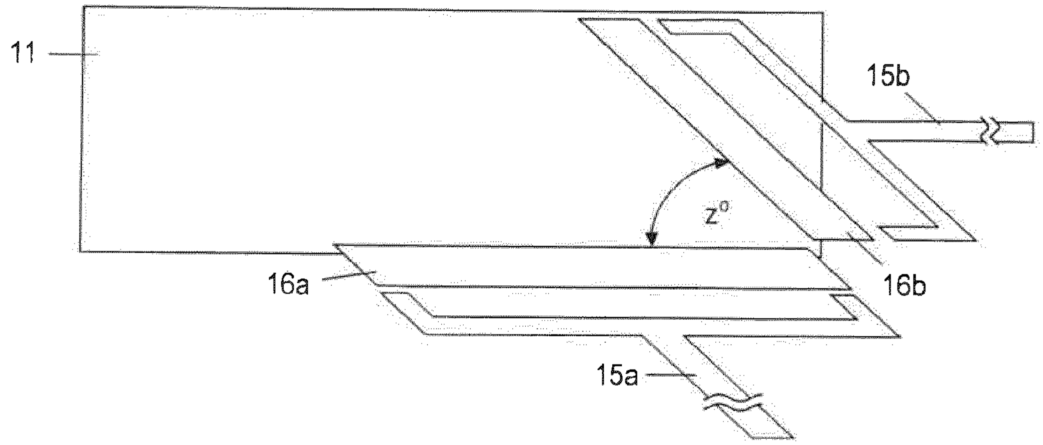
FIGS. 31*a-c* exemplify production steps for obtaining specific area acute angle OFT.
Figure 31B:
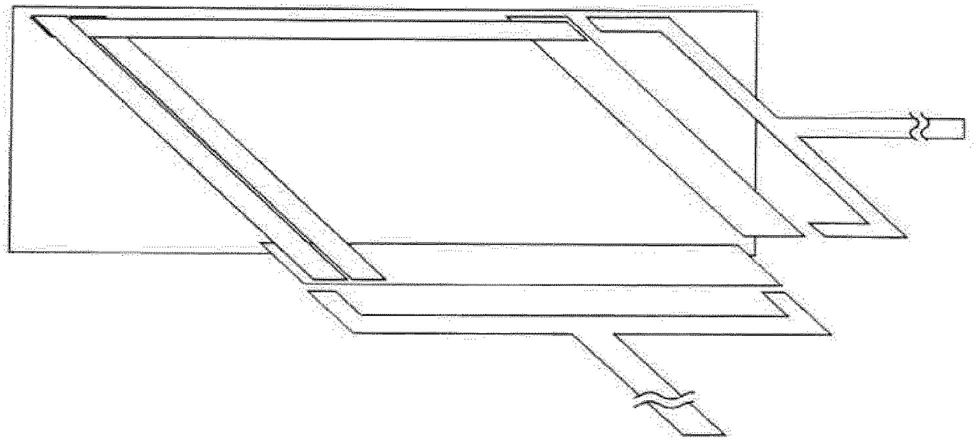
Figure 31C:
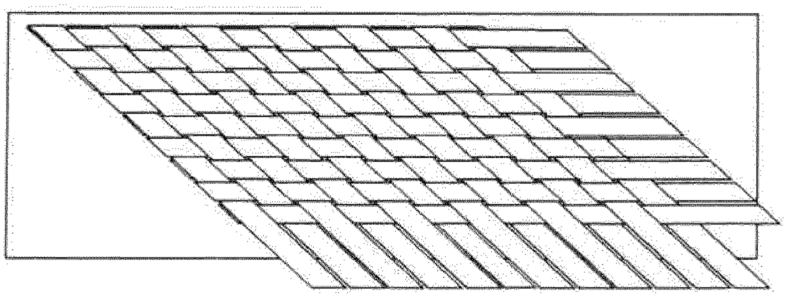

In the circumstances, the principle of OFT forming process can be advantageously employed. FIGS. 31*a-c* exemplify a modified arrangement for producing a fabric of specific area wherein the tape's fore end displacing arrangements (16*a* and 16*b*) are located in adjoining manner making an acute angle between them (FIG. 31*a*). As can be inferred from FIG. 31*b*, the first tapes from each direction are laid on arrangement (11) by the tape laying arrangement (15*a* and 15*b*) one by one, with the second (short) tape resting over the first (long) one. Next, the fore end of the first long tape is displaced by arrangement (16*b*) and a second short tape laid adjacent and parallel to the previously laid first short tape and partly under the first long tape. Subsequently, the fore end of the first short tape is displaced by arrangement (16*a*) and a second long tape laid adjacent and parallel to the previously laid first long tape and partly under the first short tape to result in fabric shown in FIG. 31*b*. Continuing with the process by displacing the fore ends of laid tapes in preferred manner and laying long and short tapes correspondingly, a specific area fabric material shown in FIG. 31*c* is thus directly produced.

Because the area of the desired fabric material to be produced is specific, there is no need to include the forward advancing and winding arrangements. The structure of the produced material can be held together, for example, by either a suitable consolidation method described earlier or by fixing a suitable adhesive tape at its four sides.

Figure 32A:
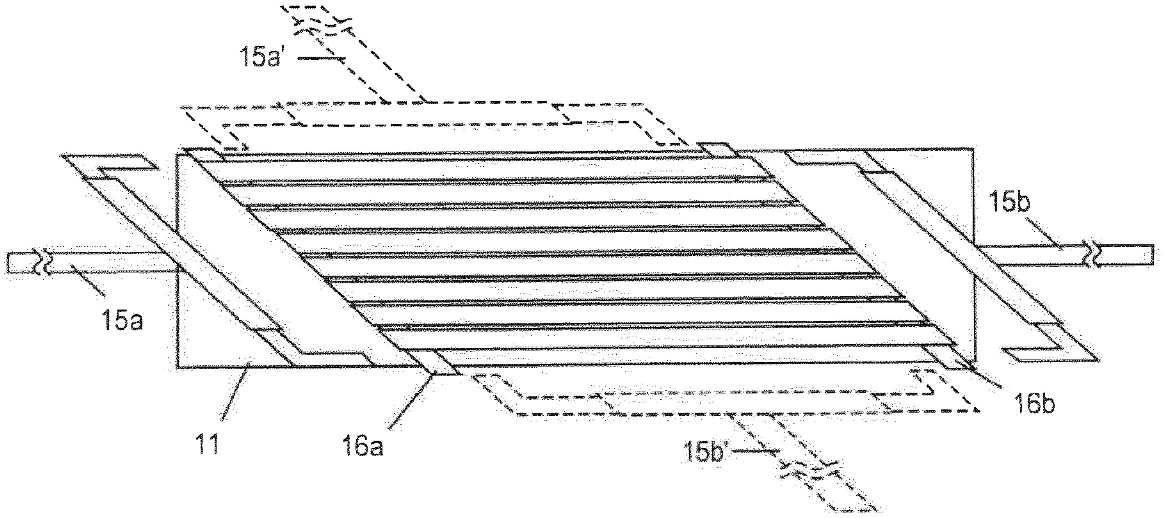
FIGS. 32*a-f* exemplify the plan view of alternative arrangements for producing a specific area OFT material in an alternative manner and the corresponding production steps.
Figure 32B:
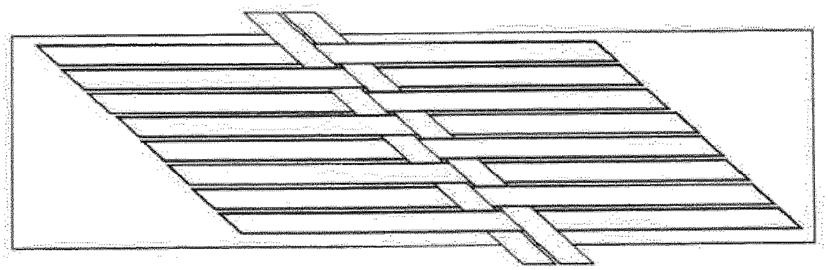

There is another possibility by which the described OFT forming process could be exploited to advantage. Through this possibility tapes can be laid from four directions of arrangement (11) by using either one or two pairs of mutually oppositely arranged arrangements for tape laying (15). Thus, when using one pair of mutually opposite arrangements for tape laying (15*a*" and 15*b*"), it could be first positioned, for example, parallel to the longitudinal sides of arrangement (11), as shown by the dashed lines in FIG. 32*a*, and made to lay and pre-organize tapes corresponding to the fabric's length direction on arrangement (11) so that they occur between oppositely placed tape fore end displacing arrangements (16*a* and 16*b*) as shown in FIG. 32*a*. Then, this pair of arrangement for tape laying (15*a*" and 15*b*") could be moved to the adjoining positions, shown as (15*a* and 15*b*) in FIG. 32*a*, to lay tapes from the end directions of arrangement (11). The fore ends of the odd numbered pre-organized tapes facing the left side tape laying arrangement (15*a*) and the fore ends of the even numbered pre-organized tapes facing the right side tape laying arrangement (15*b*) can be displaced simultaneously by arrangements (16*a* and 16*b*). A pair of cross direction tape, one from each side, can be then laid simultaneously into the created front-face openings, one from each of the opposite end sides and up to the middle of the pre-organized tapes as shown in FIG. 32*b*.

Figure 32C:
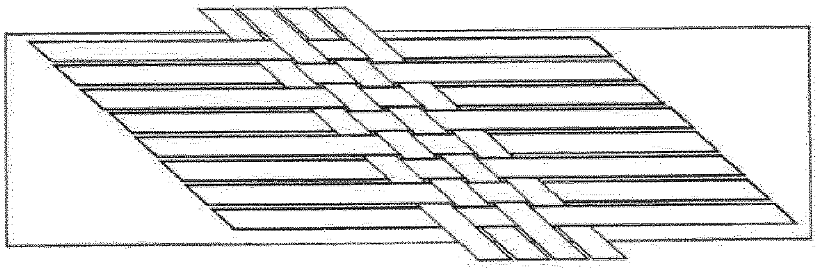

Next, the fore ends of the even numbered pre-organized tapes facing the left side tape laying arrangement (15*a*) and the fore ends of the odd numbered pre-organized tapes facing the right side tape laying arrangement (15*b*) can be displaced simultaneously by arrangements (16*a* and 16*b*). A pair of cross direction tapes, one from each side, can be then laid simultaneously into the created front-face openings one from each of the opposite sides and adjacent and parallel to the previously laid tapes as shown in FIG. 32*c*.

Figure 32D:
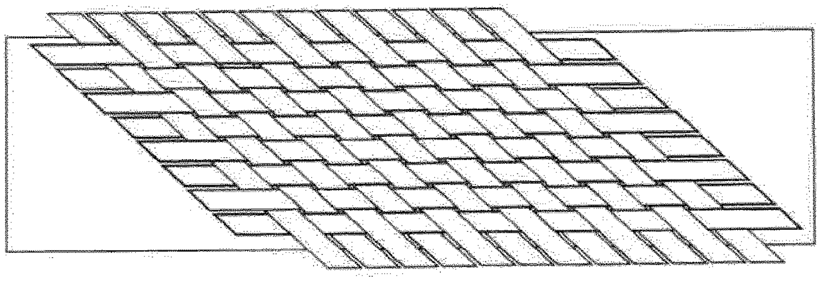

The described process can be repeated wherein the stroke length of tape laying arrangements (15*a* and 15*b*) is suitably shortened/reduced after each tape laying until the preferred specific area fabric material is produced as shown in FIG. 32*d*.

In another alternative possibility, an arrangement for tape laying (15) could be permanently arranged at each of the four sides of arrangement (11) and the specific area fabric produced on the above-described lines. Here, the arrangement for tape laying does not have to be moved to the adjoining position because one mutually opposite pair of arrangement for tape laying functions to lay and pre-organize tapes on arrangement (11) in one direction and the other pair subsequently performs tape laying-in from the other directions.

As can be inferred now, the production of the specific area fabric materials with the constituent tapes making either acute or right or obtuse angles between them can be accomplished in a relatively short time as a pair of cross direction tapes is laid simultaneously from opposite directions. Here again, there is no need to incorporate the forward advancing and winding arrangements. The structure of the obtained material can be held together, for example, by fixing a suitable adhesive tape at its four sides.

There also exists the possibility of producing OFT by laying a group of tapes of first direction and then displacing their fore ends to lay the tapes of the second direction successively while tapes of first directions of next group are laid simultaneously to lend some continuity to process to produce OFT of larger specific area.

The described OFT forming process could be also employed to produce trellis structures wherein the tapes of each angular direction are not laid adjacently close to each other, but separated by a desired distance. By suitably consolidating the overlapping areas of tapes of two directions a stable open OFT structure can be produced directly.

Further, the openings of the trellis structure can receive tapes/bands, of either fibrous or non-fibrous types, that are oriented in either one or both representative diagonal directions of any of the unit quadrilaterals that are created by overlapping and intersecting of tapes to result in a fabric that has tapes oriented in more than two directions. Such a structure constitutes a multiaxial structure.

Figure 32E:
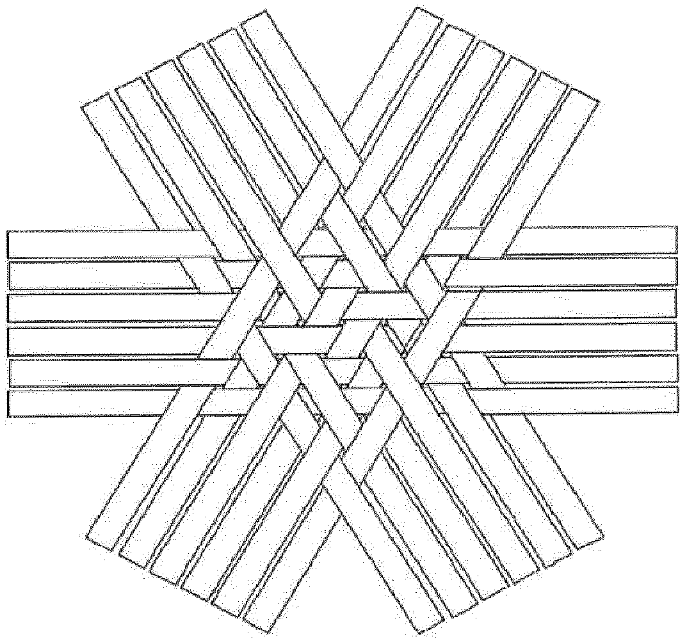
Figure 32F:
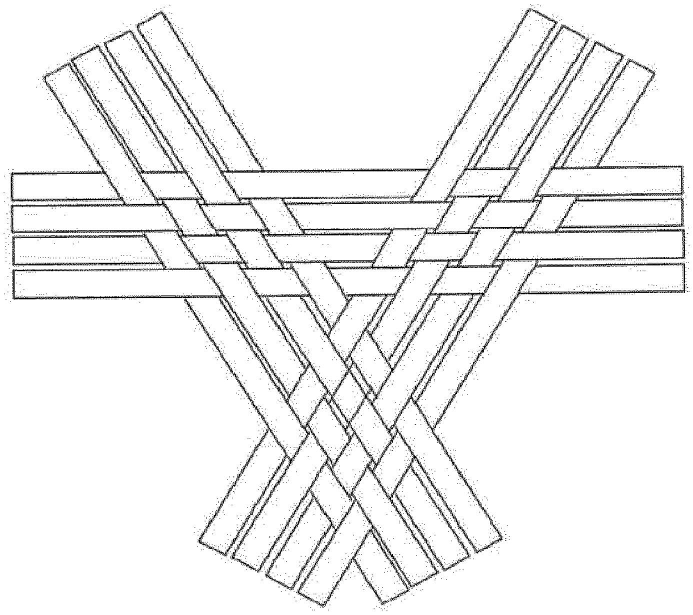

Following the described principle of the OFT process, a person skilled in the art could modify and exploit it advantageously further to produce fabrics comprising tapes in, for example, three orientations, such as those indicated in FIGS. 32*e* and 32*f*, which could be used, for example, in combination with other fabrics to improve mechanical performance, draping and shaping etc.

Modification Possibilities

The various arrangements described in the foregoing for producing OFT are by way of examples to illustrate the working principle. It will be obvious to the person skilled in the art that one or more of the described arrangements can be modified to suit a given situation for producing OFT. Given below are some examples to illustrate how certain arrangements can be changed/modified.

Figure 33A:
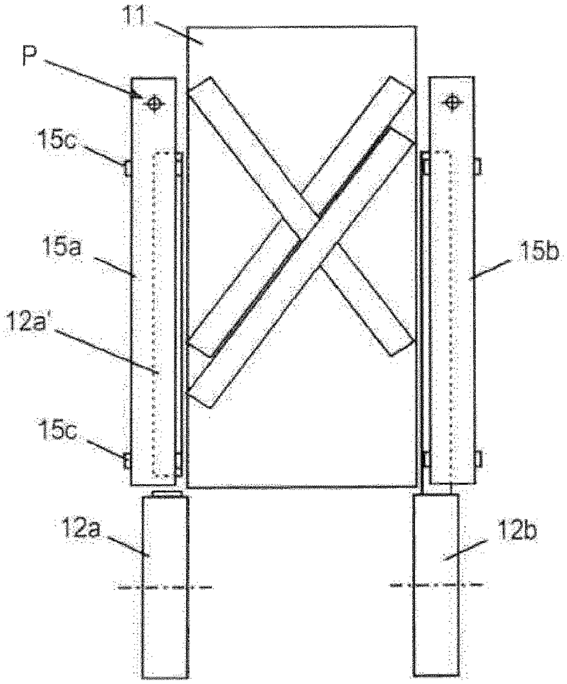
FIGS. 33*a-b* exemplify the plan views of an alternative OFT production method wherein the tape laying unit swivels in a horizontal plane.
Figure 33B:
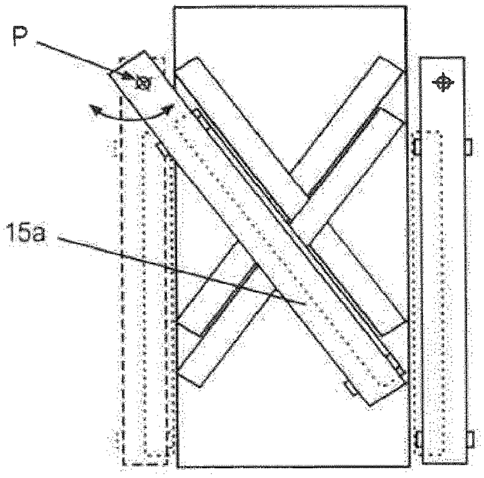

(a) Arrangement for laying tapes: Instead of the linearly reciprocating arrangement (15) shown in FIG. 13, an angularly reciprocating arrangement can be used. In the plan view shown in FIG. 33*a*, one end of arm (15*a*) is pivoted at point (P) such that the arm (15*a*) can be made to swing in a horizontal plane by a suitable driving arrangement (not shown). Arm (15*a*) is provided with a pair of suitable fingers (15*c*) at both its end sides to grip a tape (12*a*") drawn out from spool (12*a*). Thus, as shown in FIG. 33*b*, when arm (15*a*) is swung towards bed (11), the tape (12*a*") held between the pair of fingers (15*c*) can be laid on bed (11) in the preferred angular orientation relative to the length (or width) direction of bed (11). In the next cycle of the process, arm (15*b*) would receive tape from spool (12*b*) in its pair of fingers and swung in a horizontal plane towards bed (11) to lay the held tape in preferred angular orientation on bed (11).

Figure 34A:
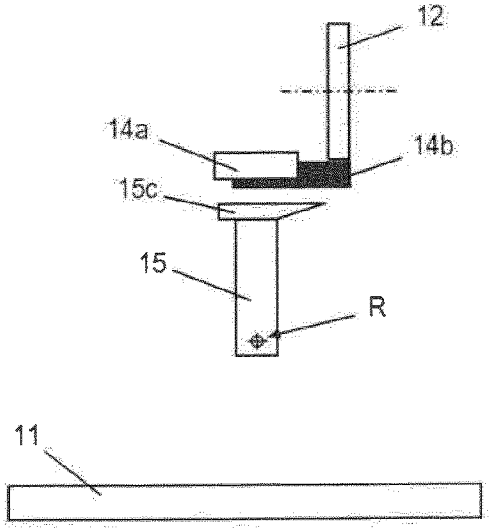
FIGS. 34*a-b* exemplify an end view of an alternative OFT production method wherein the tape laying unit swivels in a vertical plane.
Figure 34B:
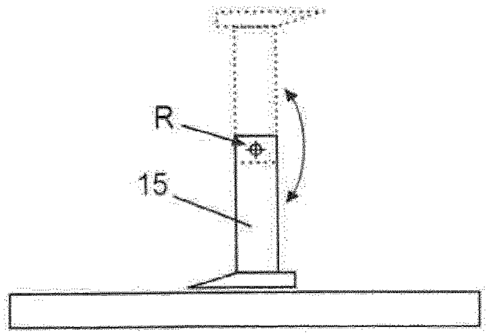

Likewise, another alternative way would be to have arms that can be swung in a vertical plane as shown in FIGS. 34*a* and 34*b*. A pair of arms (15) (only one arm is shown in FIGS. 34*a* and 34*b* in a side view), located above bed of arrangement (11), can be turned up and down about pivot point (R), as shown in FIG. 34*b*, to lay the tape held in its pair of fingers (15*c*) on bed of arrangement (11) (which is provided with suitable recesses (not shown) to prevent the pair of fingers (15*c*) hitting the bed of arrangement (11)). Whereas in the indicated FIGS. 34*a* and 34*b* the arrangement of arm (15) is shown to move 180°, it could be alternatively arranged to move, for example 90°, in which case the axis of spool (12) would be at right angle to bed of arrangement (11). This type of arrangement can be advantageous to save floor space as the spools (12) and the respective means for drawing out the tape (14*a*) with gripper (14*b*) can be suitably positioned above bed (11).

In another arrangement for laying tapes, either the arm (15*a*) could be supported in a fulcrum, whereby orientation of tapes being laid by it can be changed by altering the relative angular position of the arm, or the fingers (15c) supported on arm (15a) can be relatively displaced, e.g. in different/opposite directions, in relation to each other whereby orientation of the tapes being laid by them can be changed. In any case, the resulting OFT fabric will comprise tapes of at least one orientation direction incorporated in relatively differing angles.

Figure 35A:
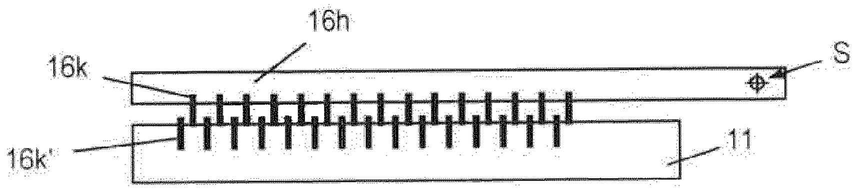
FIGS. 35*a-b* exemplify an alternative arrangement for angularly displacing the laid tapes' fore ends.
Figure 35B:
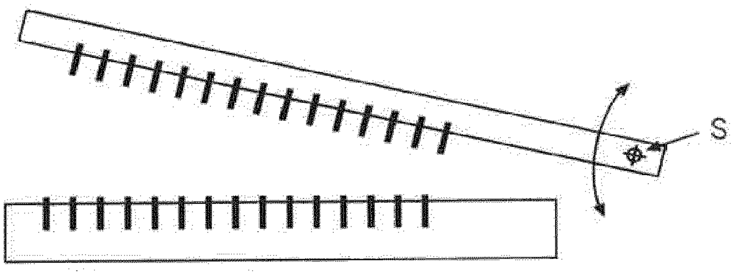

(b) Arrangement for displacing fore-ends of the laid tapes: Instead of displacing the fore ends of the laid tapes by blocks (16e)/clamps (16n) of arrangement (16m) linearly as shown in FIGS. 14b and 14f, an arm (16h) pivoted at point (S) can be used to angularly displace fore ends of tapes. As shown in FIG. 35a, a series of suitably spaced out clamps (16k) can be provided on arm (16h) to individually hold the corresponding select fore ends of the tapes occurring on bed (11). A series of suitably matching spaced out clamps (16k") are fixed to bed (11). Arm (16h), pivoted at point (S), can be swung in a vertical plane through a suitable driving arrangement (not shown). Thus, as shown in FIG. 35b, when arm (16h) bearing clamps (16k) is swung away from bed (11), the fore ends of tapes (not shown) can be displaced in its thickness direction and thereby create front-face opening with the tapes that are held by clamps (16k") which remain stationary as they are fixed to bed (11). As the clamp fixed nearer to the free end of swinging arm (16h) will be displaced more than the clamp fixed nearer to the pivoted end in reference to the top surface of arrangement (11), there will be corresponding varying displacements of the fore ends of the laid tapes. However, such varying displacements of fore ends of tapes will not cause any production difficulties because only a small front-face opening's clearance is sufficient for receiving the thickness of the tape being laid.

Another alternative would be to hold the preferred fore ends of laid tapes by a set of suitable clamping arrangements fixed to an arm that can be swung in a horizontal plane over bed (11) to bend/curve backwards the clamped tapes (i.e. towards OFT body's direction). Such backward bending/curving of tapes of each oblique direction can be done alternately up to the respective sides of the V-shaped fabric-fell position.

Yet another alternative would be to have a pair of shafts with plurality of clamps attached to each one of them. Each of these shafts can thus individually control the fore ends of the tapes occurring at each of the two longitudinal sides of arrangement (11). Each of these shafts, placed over arrangement (11), can be turned about its axis and thereby raise and lower the clamped fore ends of the tapes.

Yet another alternative would be to have the fore end displacing blocks/clamps arranged to traverse, for example on an endless chain/belt so that they move up to a point, as OFT is advance forward, remaining engaged with the fore ends of tapes until necessary for displacing the fore ends and then release them and traverse empty up to the opposite point to again engage with the new fore ends of the newly laid tapes.

(c) Arrangement for supplying tapes from spools: Instead of locating the spools (12a) and (12b) angularly at the sides of bed (11) shown in FIGS. 6 and 8, they could be also positioned at an end side of bed (11) as shown in FIG. 33a. By this arrangement the two spools (12a) and (12b) can be had with their axes at right angles to the longitudinal sides of bed (11). Thus, the tape drawn out from them will be parallel to the corresponding longitudinal sides of bed (11). This arrangement can be used, for example when the swinging arms (15a and 15b), described in point (a) above in this section and in reference to FIGS. 33a-b, is employed for laying tapes on bed (11). Through this arrangement the width of the OFT forming device can be made relatively smaller.

(d) Arrangement for supplying tapes from magazine: Instead of drawing out tapes of preferred length from spools, pre-cut tapes could be stored in a suitable magazine that makes available unendingly the tapes to the arrangement for tape laying (15). Such a magazine could be in the forms of, for example, either a rotary drum that has clamps at its end sides to hold and present pre-cut tapes to the tape laying arrangement (15), or a conveyor belt carrying pre-cut tapes in a defined order from which the tapes could be lifted by suitable means and presented to the tape laying arrangement (15), or suitable receptacle in which tapes are continuously stacked from one side and drawn out from the other side for presentation to the tape laying arrangement (15) by friction wheels etc. Through these and other arrangements of unending pre-cut tape supply, the OFT manufacturing process can technically produce OFT endlessly.

Figure 36:
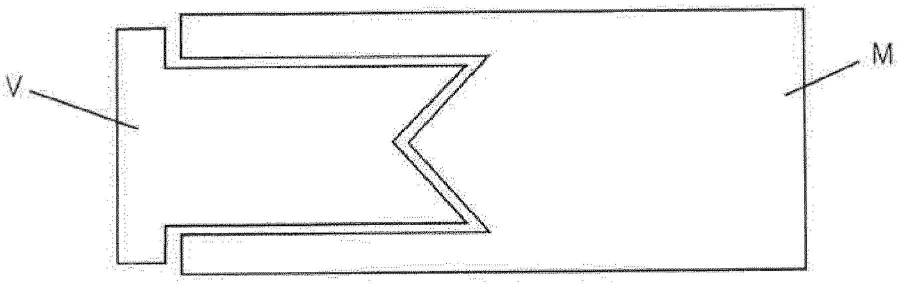
FIG. 36 exemplifies an alternative arrangement for advancing forward produced OFT.

(e) Arrangement for advancing OFT forward: The movable and stationary parts of arrangement (11), described earlier in reference to FIGS. 5a and 5b, can be modified as shown in FIG. 36. The body of OFT and the fore ends of tapes extending from the body of OFT occur over the movable part M. They can be pressed by correspondingly suitable pressing parts against movable part M for advancing the OFT forward. The stationary part V matches with the 'V' shaped part of movable part M. The angle of 'V' will preferably correspond with the angle subtended by tapes. In this arrangement the movable part M will be located closer to the winding side of arrangement (11) and the stationary part V closer to the feeding side. The movable and stationary parts, M and V respectively, can be suitably supported to form the working bed for commonly providing one plane/level surface for production and forward advancement of OFT.

Process Alteration Possibilities

It will be immediately obvious now to a practitioner of the art that the described OFT manufacturing process using tapes can be modified in certain different ways to produce an OFT using not only SFT and HDPT, but also other fibrous and non-fibrous materials such as yarns, tows, 'flat' yarns, strings, threads, twines etc. of natural, synthetic, organic, inorganic, metallic, polymeric etc. materials.

For example, instead of directly laying at once the preferred whole length of tape from the front-face opening and adjacently parallel to the previously laid tape as described earlier, an OFT could be alternatively produced by drawing the tapes, tows, 'flat' yarns etc. from one side of the opening to the opposite and then positioned closely parallel to the previously laid tapes, tows, 'flat' yarns etc.

Another way in which the described process can be altered is when producing OFT fabrics of specific area. All the tapes of one oblique direction could be initially laid adjacent to each other and then tapes of the other direction could be laid successively by carrying out preferred displacement of the fore ends of the initially laid tapes from only one side of bed (11) and their consolidation suitably performed.

Yet another way in which the process can be modified is folding the extended ends of a tape at the corresponding longitudinal edge side and joined (e.g. by thermal welding, gluing, adhering etc.) to another tape that lies in the same oblique orientation as the folded part of the tape. Such tape-to-tape joining can be performed within the body of OFT (i.e. at a preferred distance from the longitudinal edge). If such procedure of joining of tape ends is performed continuously nearer to both longitudinal edges, a fully closed longitudinal edge at both OFT sides can be created. However, there will be a discontinuity of the tapes in the OFT and also the OFT will be thicker at the tape joints.

Yet another way in which the process can be modified is inclusion of, for example, knitting needles at a suitable point between the arrangements (18) and (19), i.e. arrangements for advancing forward produced OFT material and for collecting produced OFT material in a roll. This way, OFT material will be loop-stitched by the knitting needles before being wound into a roll. Through use of such knitting needles the OFT material could be additionally loop-stitched in either its length or width, or both these directions, before being wound into a roll. Such loop-stitching could be done at, e.g interstices/openings created between four adjacent tapes, i.e. the opening surrounded by four tapes, whereby the yarns of the loop-stitch float at the fabric's surfaces.

Usage

It will be obvious now to the people skilled in the art that the novel OFTs described herein have unique constructional features and hence can be used either independently or in combination with other fabrics for realizing improved performance, material properties and aesthetics of their products. Therefore, products incorporating either one or more of the disclosed OFTs will exhibit corresponding unique enhancements than possible to achieve presently. For example, OFT can be used either individually or in combination with other materials, such as by plying, to obtain/impart strength in different directions, incorporating OFT on top of a ply for aesthetic looks, wrapping or covering an object for improved drape and performance etc.

Further, it will be also obvious now that the described method and means for producing OFT is not limited to processing only tapes. It could be suitably modified to process even certain types of tows, rovings, 'flat' yarns, 'tape' yarns etc. OFTs produced using such materials could be used in applications where performance requirements are relatively lower.

The described method and means is equally capable of producing OFTs using tapes of either similar or dissimilar materials whereby OFTs of differing properties can be directly manufactured.

Because OFT can be produced continuously by the described method and means, it becomes possible to combine production of OFT with, for example, a laminating or coating unit whereby the produced OFT can be directly processed and converted into its subsequent product. For example, an OFT can be coated with either an adhesive formulation or film or pattern etc. on either one or both faces continuously.

The described method and means is not limited to producing flat OFTs. It can be also employed for producing an OFT that has a contoured form such as that of 'umbrella'. To produce a particular contoured OFT, the bed of arrangement (11) can be correspondingly shaped and different lengths of tapes can be drawn and laid on the shaped-bed according to the described procedures to obtain directly an OFT of the preferred curved form. Availability of OFTs in ready forms will lend itself directly to quicker and cost-effective production of high-performance items.

As can be inferred from the foregoing description, the invention disclosed herein makes available several unique types of OFT comprising tapes, including SFT and HDPT types, for numerous applications and products. The various novel details can be altered in many different ways without departing from its spirit. These OFTs can be used either individually or in combination with other materials, for improving performance, material properties/functions and aesthetics. Therefore, the foregoing description only illustrates the basic idea of the invention and it does not limit the claims listed below.

What is claimed as new and desired to be protected by Letters Patent of the United States is:

1. A fabric of bias type comprising:

a fabric portion formed of a plurality of tapes;

wherein the fabric portion has a width, a thickness and a length, wherein the width extends from a first side of the fabric portion to a second side of the fabric portion, the first side being parallel to the second side along a length direction of the fabric portion, said fabric portion further comprising at least a middle part between the first side and the second side;

wherein the plurality of tapes comprises a first set of tapes of the plurality of tapes and a second set of tapes of the plurality of tapes;

wherein each tape of the plurality of tapes is a spread fiber tape that has fibers that are uniformly spread from parent tows and a substantially uniform thickness, wherein inherent internal crisscrossing or migration of fibers are eliminated in the spread fiber tape and the fibers of each spread fiber tape are parallel to each other and arranged linearly along a length of the tape, wherein the fibers of the spread fiber tape are arranged free from internal twists and crisscrossing of the fibers and free from inherent tension variations arising from internal twists, crisscrossing of fibers and uneven fiber distribution, wherein in the spread fiber tape more fibers are exposed relative to the parent tow wherein the thickness of the spread fiber tape is up to at least 50% lower than the parent tow, wherein the width of the spread fiber tape is up to at least 50% greater than the parent tow, and wherein the number of exposed fibers in the spread fiber tape is up to at least 50% greater than that of the parent tow;

wherein the first set of tapes are arranged in an intersecting and overlapping fashion with the second set of tapes;

wherein the first set of tapes and the second set of tapes are structurally linked with each other;

wherein each tape of the plurality of tapes is provided in a discrete length and arranged in oblique orientations in relation to the length direction of the fabric portion to produce the bias type fabric, the discrete length of each tape being longer than the width of the fabric portion and shorter than the length of the fabric portion, and wherein the plurality of the first and second sets of tapes are further arranged in a common, single sheet in straight or folded-straight form;

a plurality of connection points or connection areas to structurally link the first set of tapes and the second set of tapes, wherein the connection points or connection areas are formed at only the overlapping tape areas with a connection feature connecting at least some of the overlapping tapes of the first and second sets together, wherein the connection points or connection areas are arranged to maintain the fabric portion flat;

wherein the connection points or connection areas are absent from non-overlapping tape lengths; and wherein the connection points or connection areas are provided as discrete points or areas and are discontinuous between two overlapping areas of tapes though applied to the same fabric portion;

wherein the discrete connection points or connection areas resist formation of openings or gaps in the fabric portion;

wherein the spread fiber tapes have a thickness that is lower than the thickness of their parent fiber tows.

2. The fabric of claim 1, wherein the first set of tapes are arranged parallel to each other in a first oblique orientation in relation to the fabric portion's length direction, and wherein the second set of tapes are arranged parallel to each other in a second oblique orientation in relation to the fabric portion's length direction.

3. The fabric of claim 1, wherein the first set of tapes are arranged in a first oblique orientation in relation to the fabric portion's length direction, and the second set of tapes are arranged in a second oblique orientation in relation to the fabric portion's length direction, said first and second oblique orientations being non-perpendicular to each other, thereby forming either an acute or obtuse angle between said first and second orientations.

4. The fabric of claim 3, wherein the tapes of first and second oblique orientations mutually form an angle in the range 20-85 degrees or 95-160 degrees.

5. The fabric of claim 2, wherein the connection points or connection areas are provided at the overlapping tape areas by at least one of: spot needling, spot entangling, spot gluing, adhesion, fusing and spot welding.

6. The fabric of claim 2, wherein the connection points or connection areas are distributed evenly over the fabric portion.

7. The fabric of claim 2, wherein the connection points or connection areas are provided at all the overlapping tapes.

8. The fabric of claim 2, wherein the plurality of connection points or connection areas are arranged in one or several straight connection lines, each of said at least one straight connection lines comprising a plurality of connection points or connection areas.

9. The fabric of claim 8, wherein at least one of the straight connection line(s) extend in the length direction of the fabric portion.

10. The fabric of claim 8, wherein at least some of the connection lines extend in directions parallel to the tapes of the first and second sets of tapes.

11. The fabric of claim 1, wherein at least one tape is folded, said folded tape extending in at least two different oblique directions in relation to the length direction of the fabric portion.

12. The fabric of claim 11, wherein a folding of said at least one folded tape is arranged at one side of the fabric portion, thereby forming an at least partly closed longitudinal edge.

13. The fabric of claim 11, wherein foldings of at least two folded tapes are arranged at a distance from the sides of the fabric and form a slit opening in the fabric portion in at least one of a length or a width direction of the fabric portion, wherein the slit is an opening through the fabric portion between the folded tapes.

14. The fabric of claim 1, wherein the fabric is further provided with a surface coating on at least one side of at least some of the tapes, said surface coating making the fabric portion's face adherent.

15. The fabric of claim 1, wherein the connection points or connection areas are provided to overlapping tapes by at least one of: spot needling, spot entangling, spot gluing and spot welding.

16. The fabric of claim 1, wherein all the fibers of the spread fiber tapes are carbon fibers.

17. The fabric of claim 2, wherein each of the spread fiber tapes have a uniform thickness, and a uniform distribution of fibers within the tapes.

18. The fabric of claim 1, wherein the discrete length of each tape being longer than the width of the fabric portion and shorter than the length of the fabric portion forms an elongated hexagon like body of the fabric portion.

19. The fabric of claim 1, wherein the fabric portion forms at least a portion of a ballistic mitigation product.

20. A composite material comprising a fabric according to claim 1.

21. A fabric of bias type comprising:

a fabric portion formed of a plurality of tapes;

wherein the fabric portion has a width, a thickness and a length, wherein the width extends from a first side of the fabric portion to a second side of the fabric portion, the first side being parallel to the second side along a length direction of the fabric portion, said fabric portion further comprising at least a middle part between the first side and the second side;

wherein the plurality of tapes comprises a first set of tapes of the plurality of tapes and a second set of tapes of the plurality of tapes;

wherein each tape of the plurality of tapes is a highly drawn polymeric tape, wherein each highly drawn polymeric tape is drawn from a parent tape to a thickness lower than the thickness of the parent tape such that the highly drawn polymeric tape is translucent or transparent and comprising at least one of straightened, parallel, or uniformly distributed constituent molecular chains that form during the drawing process by sliding past each other laterally and become well-distributed and oriented in the length direction of the highly drawn polymeric tape;

wherein each tape is a spread fiber tape formed from highly drawn polymeric fibers of the highly drawn polymeric tape, wherein inherent internal crisscrossing or migration of fibers are eliminated and the fibers are arranged free from internal twists and crisscrossings and the fibers are free from inherent tension variations arising from internal twists, crisscrossing of fibers and uneven fiber distribution, and the fibers are arranged parallel to each other;

wherein the first set of tapes are arranged in an intersecting and overlapping fashion with the second set of tapes;

wherein the first set of tapes and the second set of tapes are structurally linked with each other;

wherein each tape of the plurality of tapes is provided in a discrete length and arranged in oblique orientations in relation to the length direction of the fabric portion of the fabric of bias type, the discrete length of each tape being longer than the width of the fabric portion and shorter than the length of the fabric portion, forming an elongated hexagon body of the fabric portion, and wherein the plurality of the first and second sets of tapes are further arranged in a common, single sheet in straight or folded-straight form;

a plurality of connection points or connection areas to structurally link the first set of tapes and the second set of tapes, wherein the connection points or connection areas are formed at only overlapping tape areas with a connection feature connecting at least some of the overlapping tapes of the first and second sets together, wherein the connection points or connection areas are arranged to maintain the fabric portion flat;

wherein the connection points or connection areas are absent from non-overlapping tape lengths, and wherein the connection points or connection areas are provided as discrete points or areas and are discontinuous between two overlapping areas of tapes though applied to the same fabric portion;

wherein the discrete connection points or connection areas resist formation of openings or gaps in the fabric portion;

wherein the fabric portion has a uniform thickness.

22. The fabric of claim 21, wherein the fabric portion forms at least a portion of a ballistic mitigation product.

23. A composite material comprising a fabric according to claim 21.

* * * * *